United States Patent
Hayashi et al.

(10) Patent No.: US 7,869,702 B2
(45) Date of Patent: Jan. 11, 2011

(54) IMAGE BLUR CORRECTING DEVICE AND CAMERA

(75) Inventors: Takayuki Hayashi, Kyoto (JP); Eiichi Nagaoka, Hyogo (JP); Keiji Sakamoto, Osaka (JP); Hideyuki Hashi, Osaka (JP); Kenichi Hayashi, Nara (JP); Daisuke Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 269 days.

(21) Appl. No.: 12/096,103

(22) PCT Filed: Nov. 20, 2006

(86) PCT No.: PCT/JP2006/323109

§ 371 (c)(1),
(2), (4) Date: Jun. 4, 2008

(87) PCT Pub. No.: WO2007/066499

PCT Pub. Date: Jun. 14, 2007

(65) Prior Publication Data

US 2009/0129764 A1     May 21, 2009

(30) Foreign Application Priority Data

Dec. 7, 2005    (JP)  .............................. 2005-352870

(51) Int. Cl.
    *G03B 17/00*      (2006.01)
    *G02B 27/64*      (2006.01)
    *G02B 7/02*      (2006.01)
    *H04N 5/228*      (2006.01)

(52) U.S. Cl. .................... 396/55; 348/208.11; 359/557; 359/814

(58) Field of Classification Search .................... 396/55; 348/208.99, 208.7, 208.11; 359/557, 814
See application file for complete search history.

(56) References Cited

U.S. PATENT DOCUMENTS 6,295,412 B1     9/2001    Katano et al.

(Continued)

FOREIGN PATENT DOCUMENTS

| CN | 1685266 | 10/2005 |
|---|---|---|
| JP | 10-247161 | 9/1998 |
| JP | 11-258678 | 9/1999 |

(Continued)

OTHER PUBLICATIONS

Chinese Office Action, with English Translation, issued in Chinese Patent Application No. CN 200680046190.4, dated Sep. 11, 2009.

*Primary Examiner*—Christopher E Mahoney
*Assistant Examiner*—Noam Reisner
(74) *Attorney, Agent, or Firm*—McDermott Will & Emery LLP

(57) ABSTRACT

It is an object of the present invention to provide an image blur correcting device having a dimension reduced in any one direction perpendicular to the optical axis of the incident light, and a camera equipped with this device. The image blur correcting device 300 includes a pitching movement frame 205, a pitching guide mechanism 304, a yawing guide mechanism 306, a pitching direction electromagnetic actuator 312, and a yawing direction electromagnetic actuator 314. The pitching movement frame 205 supports a third lens group G3 for performing image blur correction. The pitching guide mechanism 304 guides the pitching movement frame 205 in the pitching direction. The yawing guide mechanism 306 guides the pitching movement frame 205 in the yawing direction. The electromagnetic actuator 312 drives the pitching movement frame 205 in the pitching direction. The electromagnetic actuator 314 drives the pitching movement frame 205 in the yawing direction. The electromagnetic actuator 312 and the electromagnetic actuator 314 are provided substantially opposed to each other and with a second optical axis A2 interposed therebetween.

10 Claims, 33 Drawing Sheets

U.S. PATENT DOCUMENTS

| | | | |
|---|---|---|---|
| 7,206,139 B2 * | 4/2007 | Bito et al. | 359/690 |
| 7,268,336 B2 * | 9/2007 | Hsieh et al. | 250/208.1 |
| 7,308,195 B2 | 12/2007 | Yumiki et al. | |
| 7,440,688 B2 * | 10/2008 | Uehara et al. | 396/55 |
| 2001/0043809 A1 | 11/2001 | Sato et al. | |
| 2005/0206735 A1 | 9/2005 | Seo | |
| 2005/0259156 A1 | 11/2005 | Kosaka et al. | |
| 2006/0034594 A1 | 2/2006 | Yumiki et al. | |
| 2006/0285840 A1 * | 12/2006 | Takahashi | 396/55 |
| 2009/0116123 A1 * | 5/2009 | Hashi et al. | 359/704 |

FOREIGN PATENT DOCUMENTS

| | | |
|---|---|---|
| JP | 2000-75338 | 3/2000 |
| JP | 2001-343674 | 12/2001 |
| JP | 2003-169236 | 6/2003 |
| JP | 2004-102089 | 4/2004 |
| JP | 2004-126028 | 4/2004 |
| JP | 2005-266045 | 9/2005 |
| JP | 2005-308778 | 11/2005 |
| JP | 2005-331549 | 12/2005 |
| JP | 2006-98531 | 4/2006 |

* cited by examiner

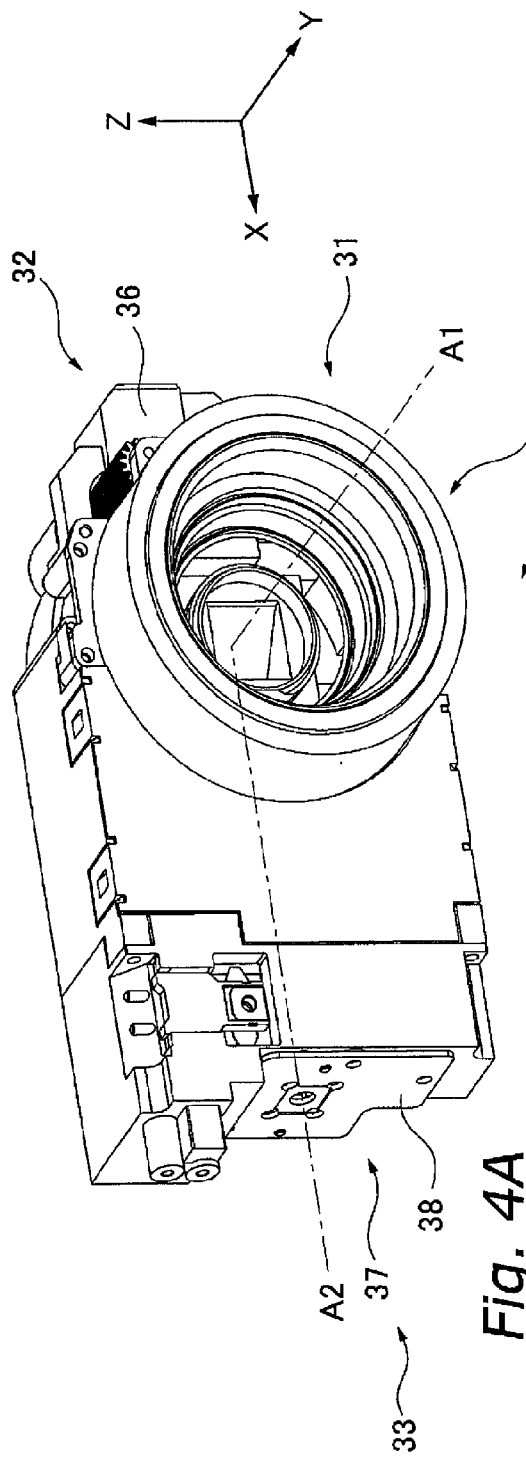
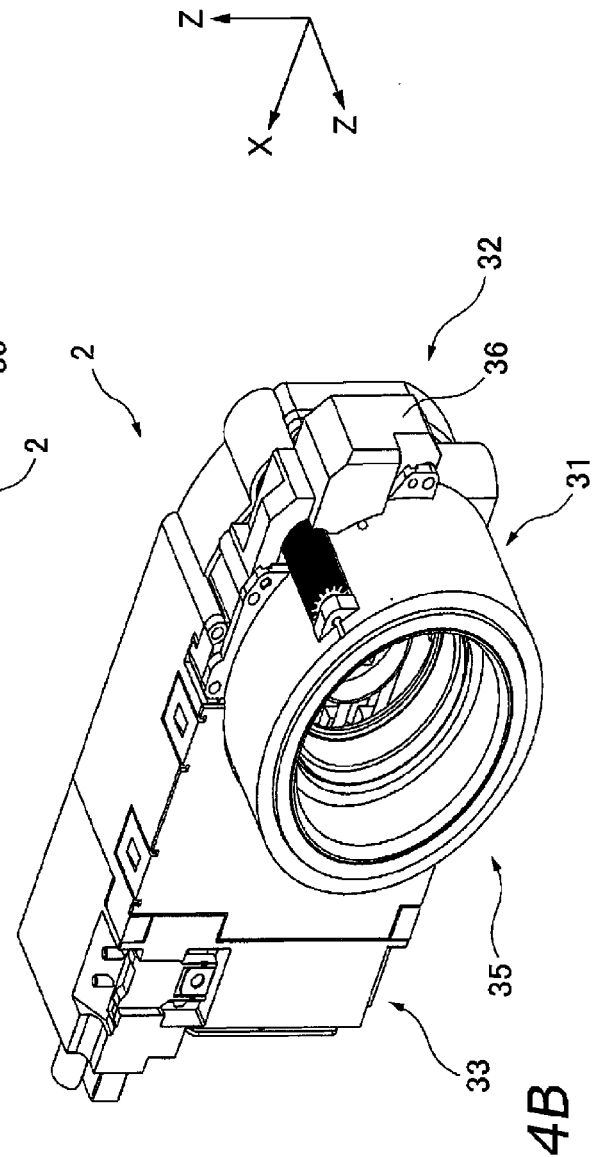
Fig. 4A
Fig. 4B

IMAGE BLUR CORRECTING DEVICE AND CAMERA

RELATED APPLICATIONS

This application is the U.S. National Phase under 35 U.S.C. §371 of International Application No. PCT/JP2006/323109, filed on Nov. 20, 2006, which in turn claims the benefit of Japanese Patent Application No. 2005-352870, filed on Dec. 7, 2005, the disclosures of which Applications are incorporated by reference herein.

TECHNICAL FIELD

The present invention relates to an image blur correcting device and a camera, and more particularly relates to an image blur correcting device that drives a correction lens and performs image correction, and to a camera equipped with this image blur correcting device.

BACKGROUND ART

Recent years have witnessed the growing popularity of digital cameras, which make use of image pickup elements such as a CCD (Charge Coupled Device) or CMOS (Complementary Metal Oxide Semiconductor) sensor to convert an optical image into an electrical signal, and digitize and record this electrical signal. With such digital cameras, there is a need not only to increase the number of pixels of the CCD or CMOS sensor, but also to improve the performance of the lens barrel that forms the optical image on these image sensors. More specifically, there is a need for a lens barrel equipped with a high-power zoom lens system.

Meanwhile, the housing of a digital camera needs to be made more compact in order to make the camera more portable. Therefore, there is a need for a reduced size image pickup device equipped with a lens barrel and image pickup elements, which is believed to contribute greatly to reducing the size of the body. In these efforts to obtain a smaller image pickup device, what is known as a bending optical system has been proposed, in which the size of the device is reduced by bending the zoom lens system on its optical path, without changing the optical length.

For instance, Patent Document 1 discloses a bending optical system in which a reflecting mirror is used to bend the optical path. More specifically, the lens barrel disclosed in Patent Document 1 is equipped with a first lens group and a second lens group, in order from the subject side, on the subject side of the reflecting mirror, and is equipped with a third lens group and a fourth lens group, in order from the reflecting mirror side, on the image pickup element side of the reflecting mirror. The first lens group is fixed. The second lens group and third lens group are each capable of moving in the optical axis direction, and a zoom lens system is constituted by the joint movements of these lens groups. The fourth lens group is used for focal adjustment.

Also, Patent Document 2 discloses a bending optical system in which a prism is used to bend the optical path. More specifically, the lens barrel disclosed in Patent Document 2 is equipped with a lens group on the subject side of the prism. The lens group is capable of moving in the optical axial direction between a usage position and a stowed position. The prism is also capable of moving so as to ensure enough room for storage when the lens group is in the stowed position.

Patent Document 3 discloses a constitution of a lens group used in a bending optical system.

However, further improvement will be required before the need for a high-power zoom lens system and the need for a small size can both be achieved at the same time.

More specifically, with the constitutions disclosed in Patent Documents 1 and 2, it is difficult to obtain a high-power zoom lens system while at the same time reducing the size of the device. Furthermore, even if the lens configuration disclosed in Patent Document 3 is employed, no constitution for reducing the size of the device is disclosed, and the specific device constitution is unclear.

Meanwhile, when an image pickup device is reduced in size, or is equipped with a high-power zoom lens system, it is generally necessary to prevent blur of the captured image, the main cause of which is camera shake and so forth.

FIG. 33 is an exploded perspective view of an image blur correcting device in an example of prior art (see Patent Document 4). With the image blur correcting device shown in FIG. 33, a second lens group 101 is supported by a lens frame 102, and the lens support frame 102 is movably supported by a guide shaft 103 that guides movement in the pitch and yawing directions. Also, the lens frame 102 is provided with coils 104a and 104b for driving the lens frame 102 in the pitch and yawing directions. Magnets 106a and 106b are provided for a stationary base 105, opposite to the coils 104a and 104b, respectively. When power is applied to the coils 104a and 104b, drive force is generated in each direction, and the second lens group 101 is driven in the pitch and yaw directions. The amount of blur of the lens barrel is sensed by angular velocity sensors 107a and 107b, power is applied to the coils 104a and 104b according to the sensing signal, and image blur is corrected.

Patent Document 1: Japanese Laid-Open Patent Application H11-258678

Patent Document 2: Japanese Laid-Open Patent Application 2003-169236

Patent Document 3: Japanese Laid-Open Patent Application 2004-102089

Patent Document 4: Japanese Laid-Open Patent Application 2000-75338 (FIG. 4)

DISCLOSURE OF INVENTION

The need for a reduced size image pickup device exists, even with an image pickup device in which an image blur correcting device is installed. To meet this need, there have been attempts with conventional image blur correcting devices installed in an image pickup device at reducing the size in the optical axis direction of the light incident on the image blur correcting device.

Meanwhile, there is a growing need for installing image blur correcting devices in various kinds of image pickup device. In this case, to afford greater latitude in the design of the image pickup device, not only reducing the size of the image blur correcting device in the optical axis direction, but also reducing the size in any one direction perpendicular to the optical axis. For example, when the above-mentioned image blur correcting device is installed in an image pickup device having a bending optical system, if a conventional image blur correcting device is installed on the exit side of the light of the reflecting mirror or prism, then the size of the image pickup device increases in a direction perpendicular to the optical axis of the light incident on the image blur correcting device. Specifically, the size (thickness) of the image pickup device increases in the optical axis direction of the light incident on the reflecting mirror or prism. This is because with a conventional image blur correcting device, two drive component for driving the correction lens used to correct image blur in the pitch and yawing directions are disposed 90 degrees apart and centering around the correction lens.

Also, reducing the size in any one direction of an image pickup device by installing an image blur correcting device in which the size has been reduced in any one direction perpendicular to the optical axis serves to enhance the consumer appeal of the image pickup device, and not peculiar to an image pickup device having a bending optical system.

In view of this, it is an object of the present invention to provide an image blur correcting device that is smaller in size in any one direction perpendicular to the optical axis of incident light, and a camera equipped with this device.

The image blur correcting device according to a first aspect of the invention includes a correction lens frame, a first guide component, a second guide component, a first drive component, and a second drive component. The correction lens frame supports a correction lens that performs image blur correction. The first guide component guides the correction lens frame in a first direction perpendicular to the optical axis of light incident on the correction lens. The second guide component guides the correction lens frame in a second direction intersecting with the optical axis and with the first direction. The first drive component drives the correction lens frame in the first direction. The second drive component drives the correction lens frame in the second direction. The first drive component and the second drive component are provided substantially opposed to each other in the first direction and with the optical axis interposed therebetween.

The phrase "provided substantially opposed to each other" here means, for example, that the first drive component and the second drive component are disposed 180 degrees apart, centering around the correction lens.

With the image blur correcting device of the present invention, the first drive component and the second drive component are provided substantially opposed to each other in the first direction, with the optical axis interposed therebetween. Therefore, the size in the second direction perpendicular to the first direction is smaller than with a conventional image blur correcting device. Furthermore, the size in the second direction of a camera or the like equipped with this image blur correcting device is less subject to restriction by the size of the image blur correcting device, there is greater latitude in design related to the layout or the like of the constituent elements of the camera, or the size in the second direction can be reduced.

The image blur correcting device according to a second aspect of the invention is the device according to the first invention, wherein the second drive component has a second magnet magnetized in the second direction, and a second coil opposite to the second magnet and relative position thereof in the second direction with respect to the correction lens frame is substantially fixed. The second coil is constituted by a plurality of coils aligned in the second direction.

The phrase "magnetized in the second direction" here means that the two magnetic poles (the N and S poles) of the second magnet are arrayed in the second direction.

With the image blur correcting device of the present invention, the second drive component has a plurality of coils lined up in the second direction. Accordingly, compared to when the second drive component consists of just one coil, the first direction size of the coil can be shortened with the same drive force obtained. Additionally, shortening the first direction size of the coil allows the first direction size of the substrate or the like to which the coil is fixed to be shortened as well, and the resonance frequency can be higher. It is therefore possible to provide an image blur correcting device that is easier to control.

In general, when drive force is obtained in a specific direction by electromagnetic action between a magnet and a coil, the coil is formed in a rectangular shape in which this specific direction coincides with the short-side direction. Therefore, when, for example, the image blur correcting device has a first drive component that performs drive in a first direction and that is separate from a second drive component, the size of the image blur correcting device in the second direction will be limited mainly by the lengthwise size of the first coil in the first drive component. Accordingly, when a plurality of coils are aligned in the second direction so that the short-side direction coincides with the second direction, as in the present invention, this will have little effect on the size of the image blur correcting device in the second direction, and the size will not become larger in the second direction.

The image blur correcting device according to a third aspect of the invention is the device according to the second invention, wherein the second coil is constituted by two coils aligned in the second direction, and the second magnet has been magnetized at least with tripole magnetization in the second direction.

The second magnet is magnetized so that both poles thereof repel two coils of the second coil. For instance, when the second magnet has undergone tripole magnetization in the second direction, the second magnet has an N pole (or S pole) magnetized at both ends in the second direction and an S pole (or N pole) magnetized at the middle, and the S pole (or N pole) magnetized at the middle is opposite to two coils. When tripole magnetization is thus performed, it is possible to obtain a high magnetic force at the middle, and it is also possible to obtain a higher drive force.

The image blur correcting device according to a fourth aspect of the invention is the device according to the second invention, further comprising second position detection component for detecting the position of the correction lens frame in the second direction. The second coil has two adjacent coils in the second direction and the lengths thereof differs from that in the first direction. The second position detection component is provided at a position opposite to the longer of the two coils in the second direction, and opposite to the shorter coil in the first direction.

The "position detection component" here may be, for example, a magnetic sensor that utilizes the Hall effect (Hall element).

With the image blur correcting device of the present invention, it is possible to prevent the size of the image blur correcting device (the size in the first or second direction) from being increased by disposing the second position detection component. That is, the second position detection component is disposed, for example, overlapping at least part, and preferably all, of an imaginary rectangular region surrounding the two coils of the second coil, and the size of the image blur correcting device can be prevented from being increased by the effect of the size in the first or second direction of the second position detection component. Also, disposing the second position detection component at this position makes it possible for the second position detection component to be opposite to the second magnet. Accordingly, when the second position detection component is a magnetic sensor or the like, the second magnet can be utilized in position detection.

The image blur correcting device according to a fifth aspect of the invention is the device according to any one of the first to fourth inventions, further comprising a first support frame and a second support frame. The first support frame supports the correction lens frame movably in the first direction via the first guide component. The second support frame supports the first support frame movably in the second direction via the second guide component.

The image blur correcting device of the present invention has a structure in which the correction lens frame, the first support frame, and the second support frame overlap each other, and the correction lens frame is supported so as to be capable of relative movement in the first and second directions with respect to the second support frame.

The camera according to a sixth aspect of the invention includes a first lens group, a bending component, a second lens group, an image blur correcting device, imaging component, a lens barrel, and a casing. The first lens group obtains a light flux incident along a first optical axis. The bending component bends the light flux incident along the first optical axis, in the direction of a second optical axis that intersects the first optical axis. The second lens group includes a correction lens for correcting image blur, and obtains light bent by the bending component. The image blur correcting device is the image blur correcting device according to any one of the first to fifth inventions. The imaging component receives the light flux that has passed through the second lens group. In the lens barrel are disposed the first lens group, the bending component, the second lens group, the image blur correcting device, and the imaging component. The casing supports the lens barrel.

The phrase "along a first optical axis" here means, for example, parallel to the first optical axis. The phrase "along a second optical axis" here means, for example, parallel to the second optical axis. The bending component may include, for example, a member having a reflecting surface, and more specifically, may include a prism, mirror, or the like. The image pickup unit may, for example, be a CCD, CMOS, or the like that receives light electrically, but is not limited to these, and may instead be a film or the like.

Because the camera of the present invention is equipped with the image blur correcting device according to any one of the first to fifth inventions, the same effect can be obtained as with the first to fifth inventions. Specifically, with the first to fifth inventions, since the size in the second direction perpendicular to the first direction can be made smaller than in a conventional image blur correcting device, the size in the second direction is less likely to be limited by the size of the image blur correcting device with the camera of the present invention. Therefore, greater latitude in design related to the layout or the like of the constituent elements of the camera is afforded or the size in the second direction is reduced.

The camera according to a seventh aspect of the invention is the camera according to the sixth invention, wherein the second direction is substantially parallel to a direction along the first optical axis.

With the camera of the present invention, the size can be reduced along the first optical axis of the camera. In particular, with the camera of the present invention, a bending optical system is employed and an image blur correcting device whose size is smaller in the second direction is provided which makes it possible to reduce the size of the camera in a direction along the first optical axis (the thickness of the camera).

The camera according to a eighth aspect of the invention is the camera according to the sixth or seventh invention, further comprising at least one lens group that supports the first lens group and that relatively moves the bending component and the first lens group in a direction along the first optical axis.

With the camera of the present invention, the relative positions of the first lens group and the bending component are changed with the lens frame. That is, the relative positions of the first lens group and the imaging component along the optical path change according to the lens frame. When the lens frame is provided in multiple stages, a higher-power zoom lens system can be configured.

The camera according to a ninth aspect of the invention is the camera according to any one of the sixth to eighth inventions, further comprising third drive component for supporting at least some of the lenses of the second lens group and moving the lenses in a direction along the second optical axis. In contrast to the second drive component, the third drive component is disposed at a position opposite in a direction along the second optical axis.

With the camera of the present invention, the size of the camera in the first or second direction can be prevented from being affected by the third drive component protruding in the radial direction of the second optical axis and centering around the lenses.

BRIEF DESCRIPTION OF DRAWINGS

FIGS. 4A and 4B are perspective views of the assembly of the imaging device;

DESCRIPTION OF REFERENCE NUMERALS

Figure 1:
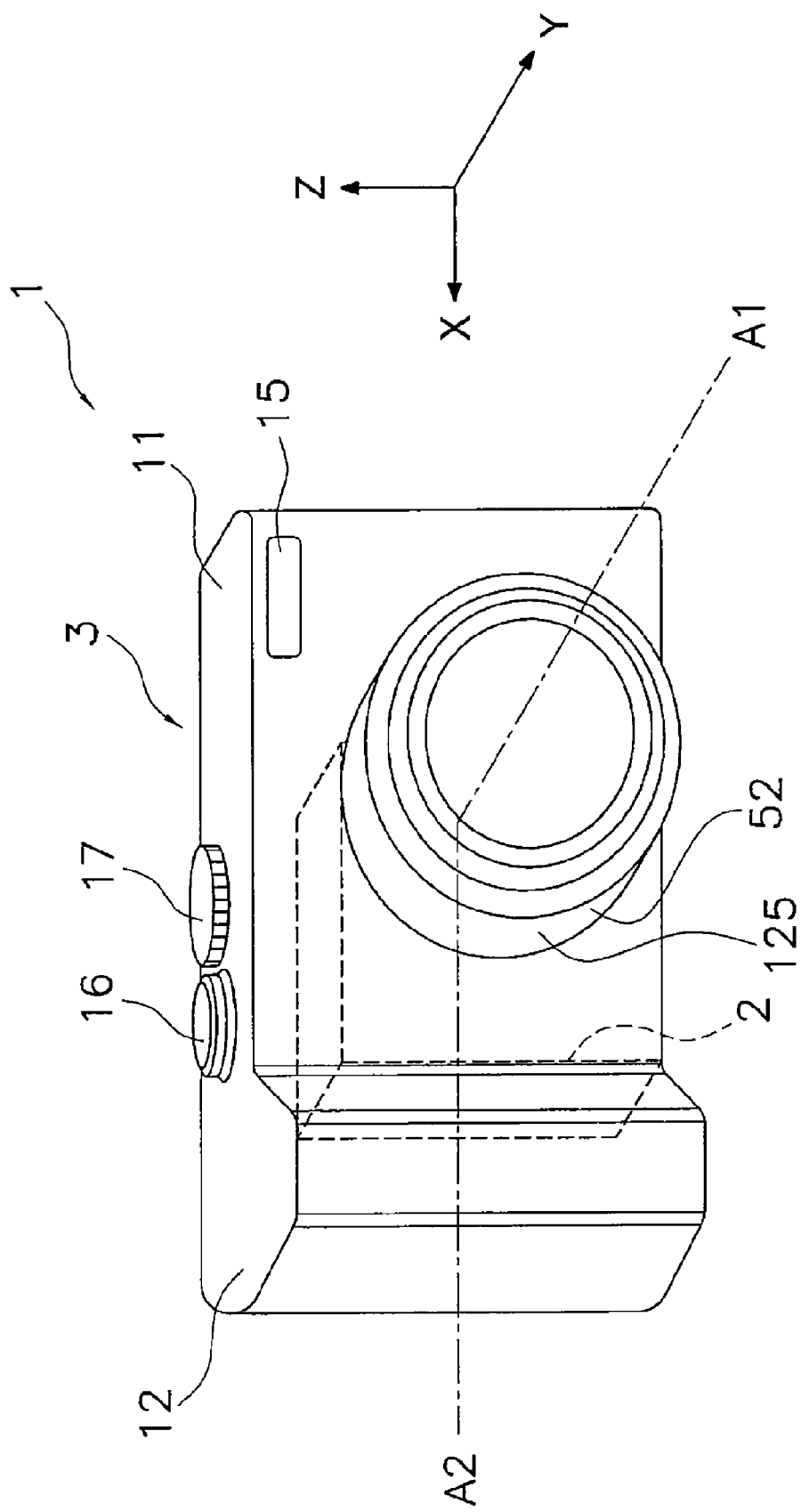
FIG. 1 is a perspective view showing the outside of a digital camera.

1 Digital camera
2 Imaging device
11 Outer case
18 Image display unit
31 Lens barrel
32 CCD unit
41 First group frame unit
42 Second group frame unit
G1 First lens group
G3 Third lens group
A1 First optical axis
A2 Second optical axis
205 Pitching movement frame
208 Yawing movement frame
300 Image blur correcting device
304 Pitching guide mechanism
306 Yawing guide mechanism
312 Pitching direction electromagnetic actuator
314 Yawing direction electromagnetic actuator

BEST MODE FOR CARRYING OUT THE INVENTION

1: Summary

An embodiment of the present invention will be described through reference to FIGS. 1 to 32.

The digital camera of the present invention employs a bending optical system as its optical system, and the lens barrel on the subject side is formed so that the lens barrel can be deployed in stages. This affords a high-power zoom lens system and also makes the device smaller.

Also, one of the main characteristics of the digital camera of the present invention is that it is equipped with an image blur correcting device that allows the main body to be thinner in the thickness direction. This will be discussed in detail in "4.4: Third Group Frame Unit."

Furthermore, one of the main characteristics of the digital camera of the present invention is the layout of the actuator (linear motor) used for focal adjustment operation. This will be described in detail in "4.4: Fourth Group Frame Unit."

2: Digital Camera

The digital camera in a first embodiment of the present invention will be described with reference to FIGS. 1 to 3.

2.1: Configuration of the Digital Camera

FIG. 1 is a perspective view showing the exterior outside of a digital camera 1 in the first embodiment of the present invention.

The digital camera 1 includes an imaging device 2 and a main body 3. The imaging device 2 has a bending optical system bending the light flux incident along the first optical axis A1 to a direction along a second optical axis A2 perpendicular to the first optical axis A1 and leading the light flux to an image sensor. The main body 3 accommodates the imaging device 2, and performs control or the like on the imaging device 2.

First, before describing detailed configuration of the imaging device 2, the configuration of the main body 3 will be described.

In addition, in the following description, the six faces of the digital camera 1 will be defined as follows.

The side facing the subject during image capture with the digital camera 1 is termed the front side, while the opposite side is termed the rear side. When image capture is performed so that the vertical top and bottom of the subject coincide with the top and bottom in the short side direction of the rectangular image captured with the digital camera 1 (the aspect ratio (ratio of long side to short side) is generally, 3:2, 4:3, 16:9, etc.), the side facing upward in the vertical direction is termed the top side. The side opposite to the top side is termed the bottom side. Furthermore, when image capture is performed so that the vertical top and bottom of the subject coincide with the top and bottom in the short side direction of the rectangular image captured with the digital camera 1, the side on the left when viewed from the subject side is termed the left side, and the opposite side is termed the right side. The above definitions do not limit the orientation in which the digital camera 1 is used.

According to the above definitions, FIG. 1 is a perspective view showing the front side, top side, and left side.

In addition, to the six sides of the digital camera 1, the six sides of the various constituent components disposed in the digital camera 1 are also defined likewise. In other words, the above definitions are applied to the six sides of the various constituent components in a state of being disposed in digital camera 1.

Furthermore, as shown in FIG. 1, the three dimensional perpendicular coordinate system (right-handed system) having a Y axis parallel to the first optical axis A1 and an X axis parallel to the second optical axis A2 will be defined. According to this definition, the Y axis positive direction is the direction from the rear side to the front side along the first optical axis A1, the X axis positive direction is the direction from the right side to the left side along the second optical axis A2, and the Z axis positive direction is the direction from the bottom side to the upper side along the perpendicular axis perpendicular to the first optical axis A1 and the second optical axis A2.

A description will be made below based on this XYZ coordinate system in each figure. In other words, the X axis positive direction, Y axis positive direction, and Z axis positive direction in each figure are each showing the same direction.

2.2: Configuration of the Main Body

The configuration of the main body 3 will be described with reference to FIG. 1, FIG. 2, and FIGS. 3A to 3C.

Figure 2:
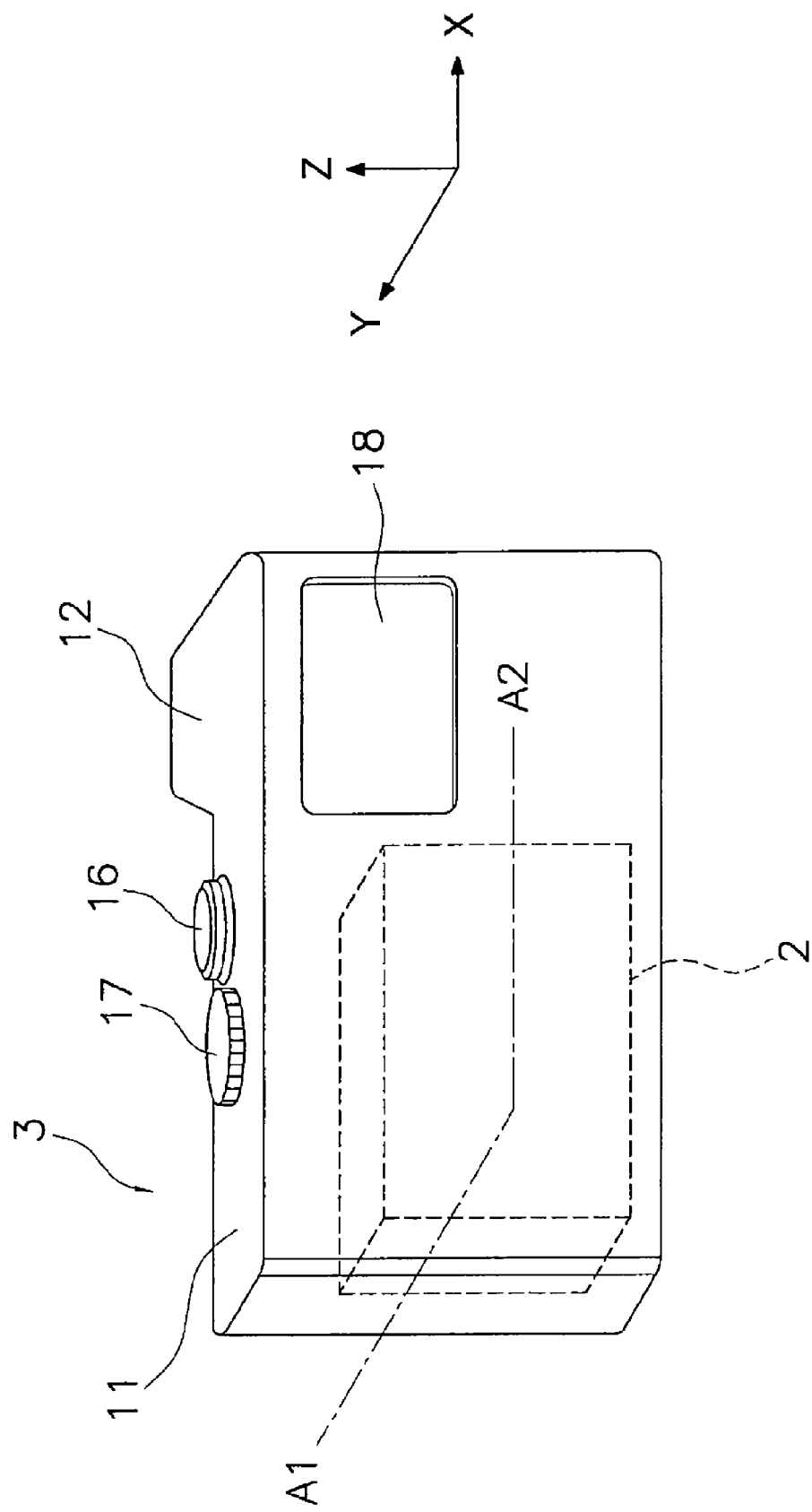
FIG. 2 is a perspective view showing the outside of a digital camera.

FIG. 2 is a perspective view showing the exterior outside of the rear side, upper side, and right side of the digital camera 1.

Figure 3A:
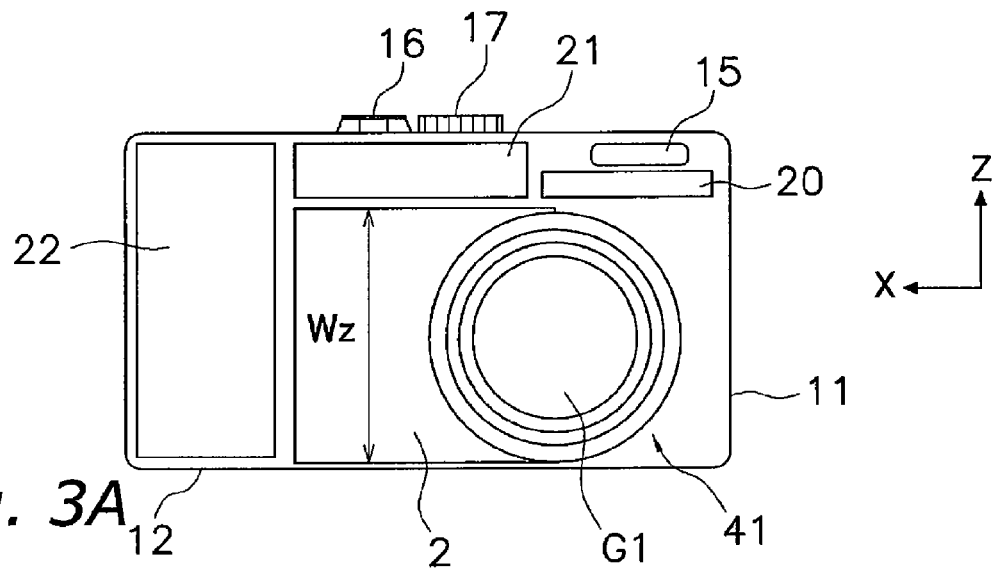
FIGS. 3A to 3C are perspective plans showing the general configuration of the main body.
Figure 3B:
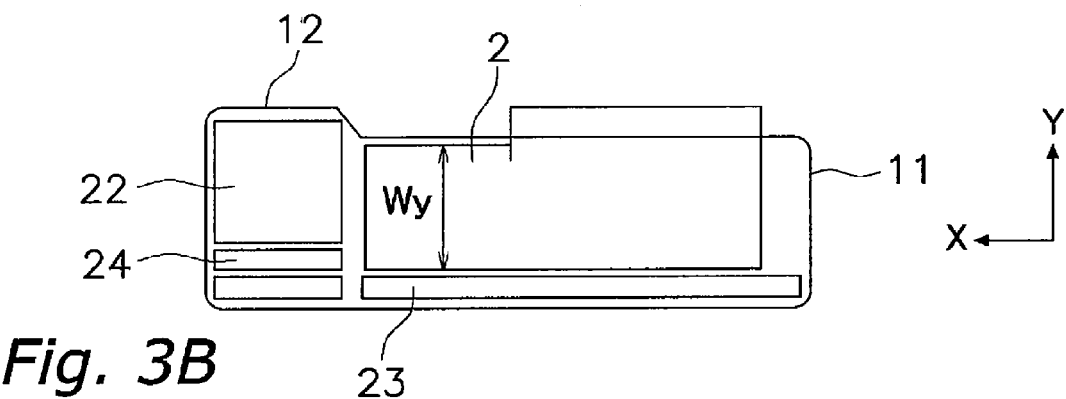
Figure 3C:
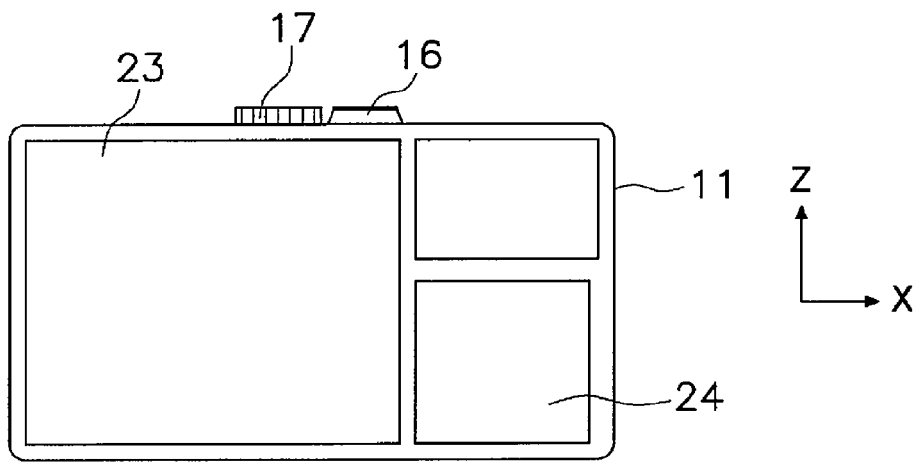

FIGS. 3A to 3C are perspective plans roughly showing the configuration of the main body 3. FIG. 3A is a perspective plan showing the configuration of a member disposed on the Y axis direction positive side (front side). FIG. 3B is a perspective plan showing the configuration of a member disposed on the Z axis direction negative side (bottom side). FIG. 3C is a perspective plan showing the configuration of a member disposed on the Y axis direction negative side (rear side).

As shown in FIGS. 1 to 3C, the main body 3 mainly includes an outer case 11 and a grip portion 12 forming the chassis for storing the imaging device 2, a flash lamp 15 disposed on the surface of the outer case 11, a release button 16, an operation dial 17 and an image display unit 18, a main condenser 20 disposed inside the chassis formed by the outer case 11 and the grip portion 12, a sub-substrate 21, a battery 22, a main substrate 23 and a memory card 24.

As shown in FIG. 1, the outer case 11 is a housing which is substantially in a rectangular parallelepiped shape, long in the second optical axis A2 direction. On the X axis direction positive side, the grip portion 12 is disposed to protrude out in the Y axis direction from the outer case 11 so that the user can hold on to it when photographing. This makes the outer case 11 and the grip portion 12 form a hollow chassis which is substantially in an L-shape. From the outer case 11, a stationary frame 52 (refer to FIG. 9) of the imaging device 2, which will be described later makes a portion of the cylindrical portion 125 thereof (refer to FIG. 10) protrude to the Y axis direction positive side. In addition, on the front side of the outer case 11, the flash lamp 15 is disposed. The flash lamp 15 flashes when necessary such as when the object is dark, and irradiates the object to aid the exposure thereof. In addition, on the upper side of the outer case 11 on the side of the grip portion 12, the release button 16 and the operation dial 17 are disposed. The release button 16 is pressed down toward the Z axis direction negative side when executing a photographing operation. The operation dial 17 is used to set various settings such as the setting for the photographing operation.

Furthermore, as shown in FIG. 2, on the rear side of the outer case 11, the image display unit 18 is provided as a visual unit for a user or the like to view the image captured by the imaging device 2. The image display unit 18 has a rectangular outer shape such as, for example, an aspect ratio (ratio of long side to narrow side) of 3:2, 4:3, 16:9 or the like, and is provided so that the long side direction thereof is substantially parallel to the direction along the second optical axis A2 (X axis direction).

Note that, FIG. 1 and FIG. 2 show only the main members disposed on the surface of the outer case 11, and members other than the above described members may be provided.

Next, the interior configuration of the main body 3 will be described with reference to FIG. 3.

As shown in FIG. 3A, on the Y axis direction positive side inside the main body 3, the imaging device 2 which is long in the second optical axis A2 direction (X axis direction positive side) is disposed so that the longitudinal direction thereof follows along the longitudinal direction of the outer case 11. The imaging device 2 is disposed in the main body 3 so that a first group frame unit 41 retaining a first lens group G1 facing the object is located on the X axis direction negative side of the imaging device 2. By doing so, the distance in the X axis direction from the first lens group G1 to the grip portion 12 is secured.

Furthermore, on the Z axis direction positive side of the imaging device 2, the flash lamp 15, the main condenser 20, and the sub-substrate 21 are disposed. The main condenser 20 provides flash light energy to the flash lamp 15, through the electric charge from a battery 22 which will be described later. The sub-substrate 21 transforms voltage when necessary of the electric power from the battery 22 which will be described later, and controls the flash lamp 15. In addition, on the Y axis direction positive side inside the grip portion 12, the battery 22 is disposed as the electric power supply for operating the digital camera 1.

Furthermore, as shown in FIGS. 3B and 3C, a main substrate 23 is disposed on the Y axis direction negative side of the imaging device 2. An image processing circuit which processes image signals from the imaging device 2, a control circuit for controlling the imaging device 2, or the like are implemented in the main substrate 23. In addition, a memory card 24 is disposed on the Y axis direction negative side of the battery 22. The memory card 24 records image signals from the imaging device 2.

In addition, as shown in FIGS. 3A and 3B, the imaging device 2 is formed to have a width in the Z axis direction thereof (Wz) which is greater than the width in the Y axis direction (Wy).

3: Imaging Device

3.1: Configuration of the Imaging Device

The configuration of the imaging device 2 attached in the digital camera 1 will be described with reference to FIGS. 4A and 4B.

FIGS. 4A and 4B are perspective views of the assembly of the imaging device 2. FIG. 4A_is a perspective view showing the front side, upper side, and the left side of the imaging device 2, and FIG. 4B is a perspective view showing the front side, upper side, and the right side of the imaging device 2.

The imaging device 2 includes a lens barrel 31 having an optical system 35, a motor unit 32 having a zoom motor 36 which drives the lens barrel 31, and a CCD unit 33 having a CCD 37 as an imaging unit receiving the light flux passing through the lens barrel 31.

The lens barrel 31 is mechanistically characterized in that it includes a multistage retractable lens frame which is retractable and extendable in multistage in the first optical axis A1 direction, and is optically characterized in which it includes an optical system 35 which includes the bending optical system. The optical system 35 includes 5 groups including 12 pieces of optical elements (lens and prisms) which realize a high magnification zoom which is beyond 3 times optical zoom (for example, in the range of 6 times to 12 times optical zoom). With this configuration, the lens barrel 31 takes in the light flux incident along the first optical axis A1, and bends the light flux incident along the first optical axis A1 in a direction along the second optical axis A2 intersecting with the first optical axis A1, and furthermore, leads the light flux bent in the direction along the second optical axis A2 to CCD 37.

The motor unit 32 mainly includes, for example, a zoom motor 36 such as a DC motor, a flexible printed circuit board (FPC) (not shown in the figure) electrically connecting the zoom motor 36 to the main substrate 23 (refer to FIG. 3), and a photo sensor (not shown in the figure) provided to measure the position from the original point of the lens in the lens barrel 31 by the measurement of the motor rotation frequency of the zoom motor 36. The zoom motor 36 drives the lens barrel 31, and moves the optical system 35 between the wide angle end and the telephoto end. By doing so, the optical system 35 included in the lens barrel 31 operates as a zoom lens system to change the imaging magnification of the light flux in CCD 37. The photo sensor operates as follows. The photo sensor is a pair of transmission type photo sensor provided entering from the outside of the motor box (gear box). The photo sensor has a square U-shape, and a pair of light emitting element and light receiving element are provided on the opposite ends of the photo sensor. It is so configured that a gear directly coupled to the zoom motor 36 passes through between the light emitting element and the light receiving element, and by counting the number of times which the gear interrupts the space between this light emitting element and light receiving element per unit time, and therefore it is possible to count the number of rotations of the zoom motor without contact.

The CCD unit 33 is mainly made up of the CCD 37 which converts the received light flux passing through the lens barrel 31 into an electrical signal, a CCD plate 38 for fixing CCD 37 to the lens barrel 31, and an FPC (not shown in the figure) electrically connecting CCD 37 to the main substrate 23 (refer to FIG. 3).

3.2: Optical System
3.2.1: Configuration of Optical System

Before describing in detail the configuration of the imaging device 2, the configuration of the optical system 35 included in the lens barrel 31 will be described with reference to FIGS. 5 to 8.

Figure 5:
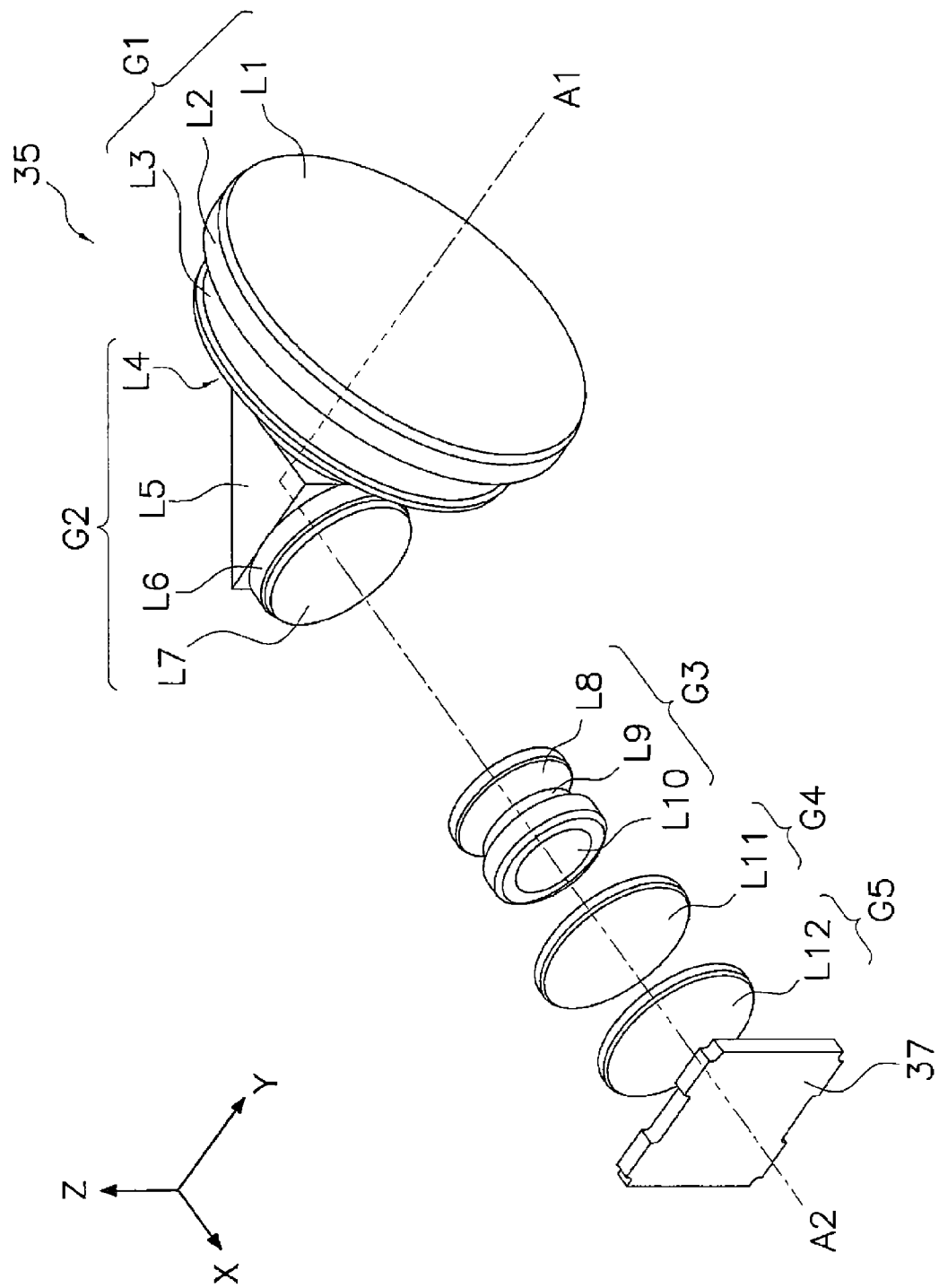
FIG. 5 is an illustration showing the configuration of the optical system (wide angle end)
Figure 6:
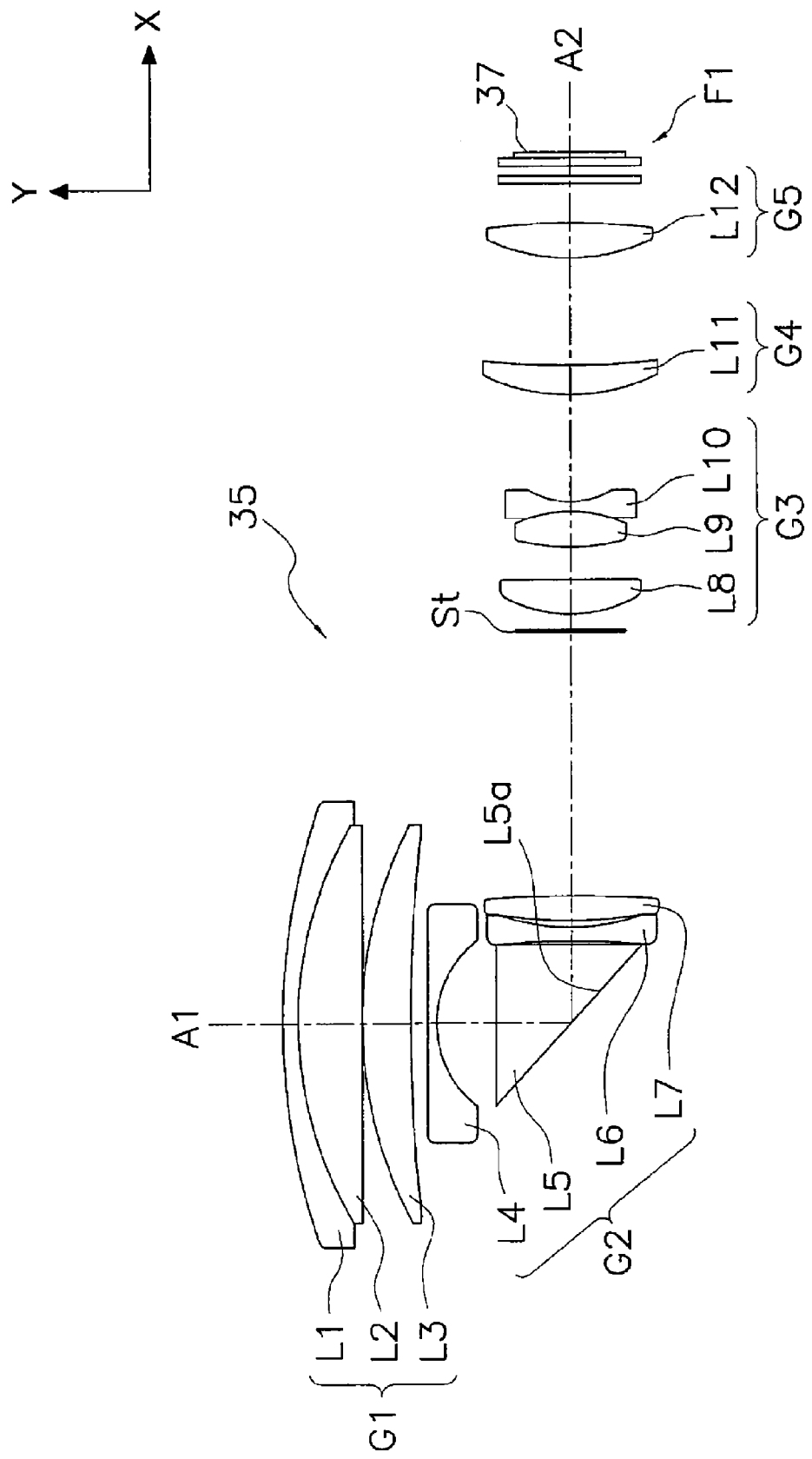
FIG. 6 is an illustration showing the configuration of the optical system (wide angle end)
Figure 7:
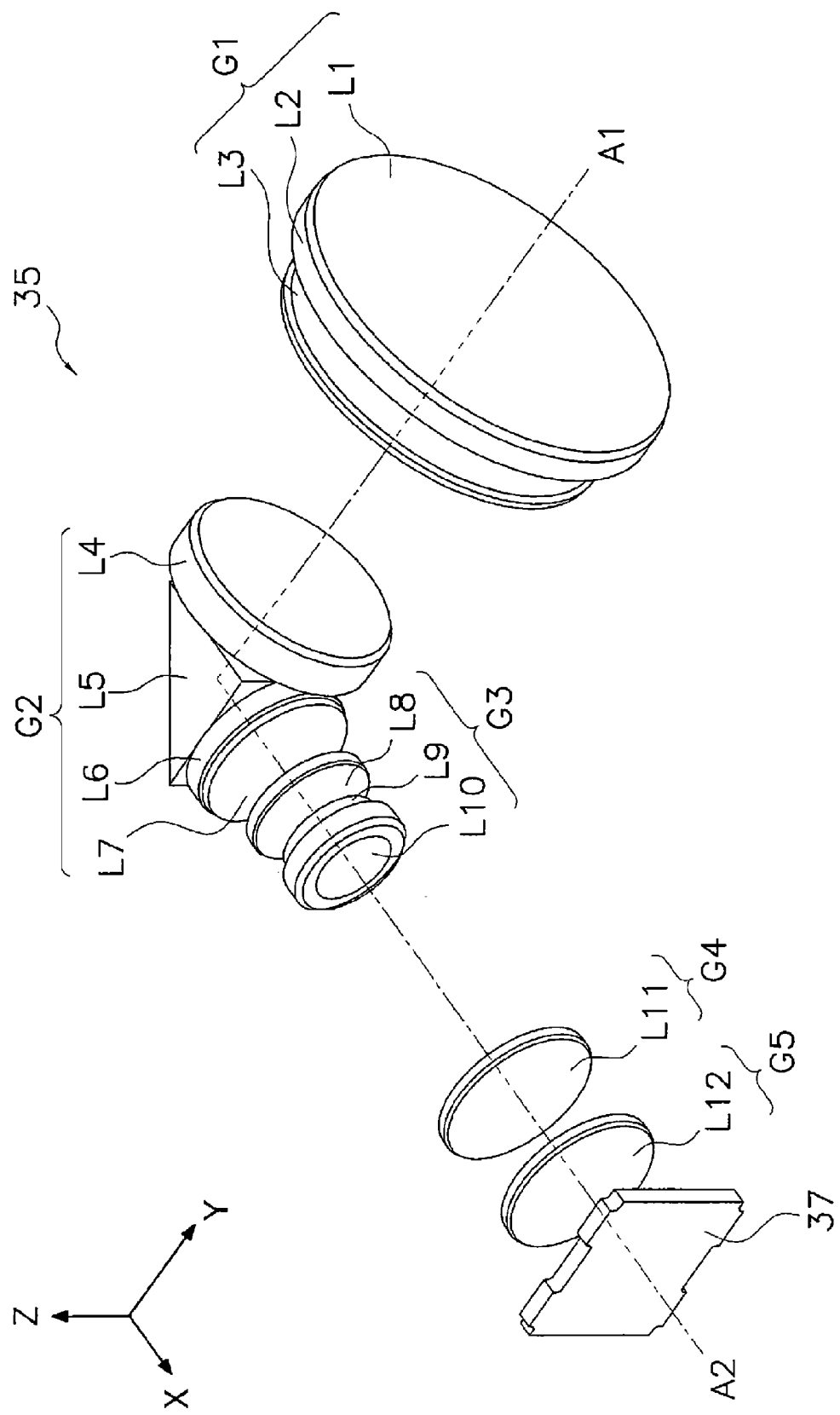
FIG. 7 is an illustration showing the configuration of the optical system (telephoto end)
Figure 8:
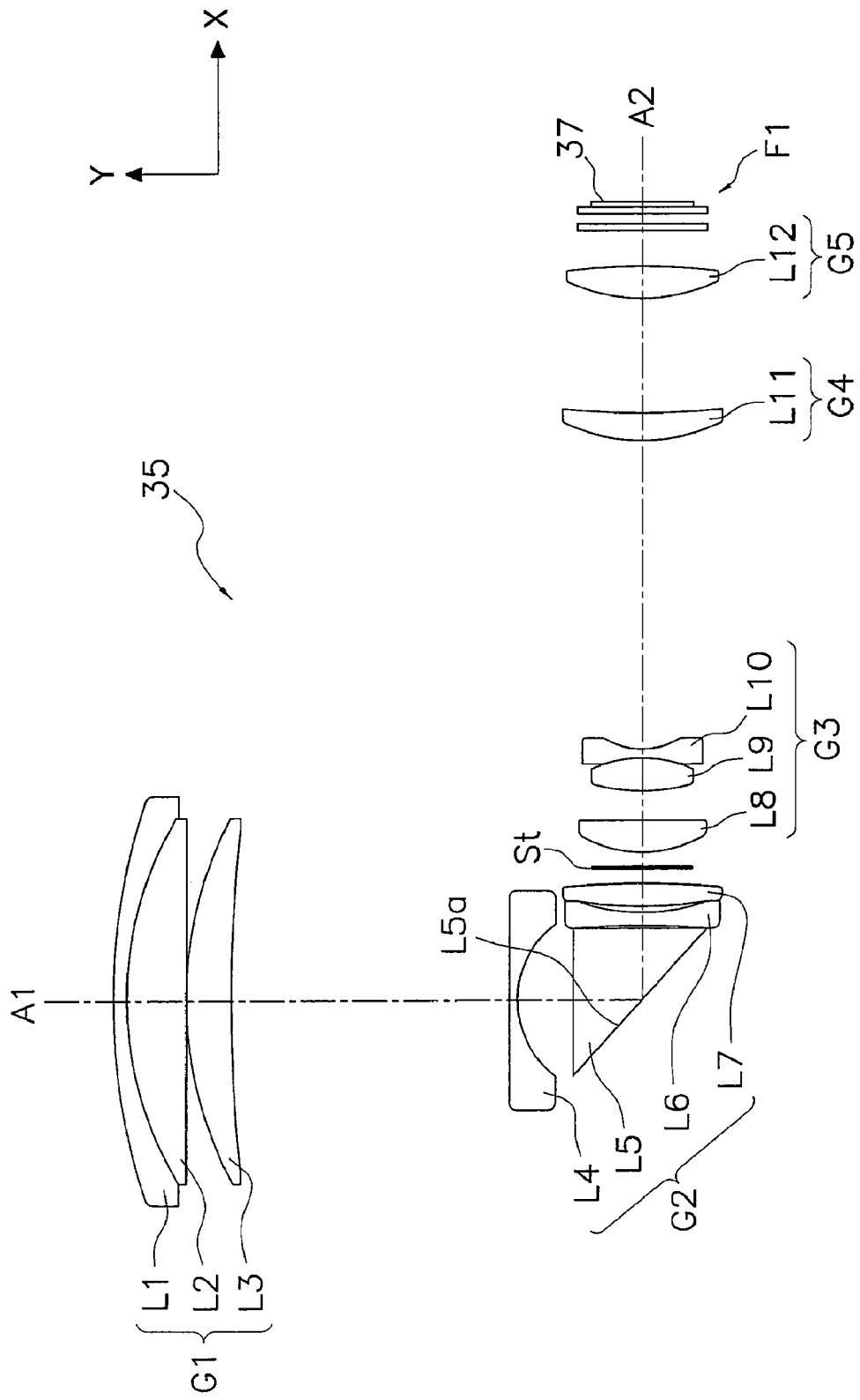
FIG. 8 is an illustration showing the configuration of the optical system (telephoto end)

FIGS. 5 to 8 show the configuration of the optical system 35 included in the lens barrel 31. FIGS. 5 and 6 show the arrangement of the optical system 35 when the optical system 35 is located at the wide angle end. FIGS. 7 and 8 show the arrangement of the optical system 35 when the optical system 35 is located at the telephoto end. FIGS. 5 and 7 show the arrangement of the optical system 35 when viewed from the same point as in FIGS. 4A and 4B. FIGS. 6 and 8 are sectional views in a plane including the optical axes of the optical system 35 shown in FIGS. 5 and 7.

As shown in FIGS. 5 to 8, the optical system 35 is made up of a first lens group G1, a second lens group G2, an exposure-adjustment member St (refer to FIG. 6 or FIG. 8), a third lens group G3, a fourth lens group G4, a fifth lens group G5 and an IR filter F1 (refer to FIG. 6 or FIG. 8) in order from the side of the object, and the optical system 35 is so configured that the light flux incident from the first lens group G1 passes through each of the lens groups G1 through G5 and the IR filter F1, and is conducted to the CCD 37. In addition, each of the lens groups G1 to G5 configures the zoom lens system by changing the distance between each of the lens groups.

The first lens group G1 has positive optical power as a whole, and includes a first lens L1, a second lens L2 and a third lens L3 disposed in order from the side of the object on the first optical axis A1.

The first lens L1 is a concave meniscus lens having the convex surface facing to the side of the object. The second lens L2 is a plane-convex lens having the convex surface facing to the side of the object. The third lens L3 is a convex meniscus lens having the convex surface facing to the side of the object.

The second lens group G2 has negative optical power as a whole, and includes a fourth lens L4 disposed on the first optical axis A1, a prism L5 bending the light flux incident along the first optical axis A1 to a direction along the second optical axis A2 which is substantially perpendicular to the first optical axis A1, a sixth lens L6 disposed on the second optical axis A2, and a seventh lens L7.

The fourth lens L4 is a concave meniscus lens with the convex surface facing the side of the object. The prism L5 includes a reflecting surface L5a (refer to FIG. 6 or FIG. 8) which reflects the light flux incident along the first optical axis A1 to a direction along the second optical axis A2 which is substantially perpendicular to the first optical axis A1. In addition, although a prism L5, in particular, an internal reflection prism is here used, any of a surface reflection prism, an internal reflection mirror and a surface reflection mirror with the same functions may be adopted. The sixth lens L6 is a biconcave lens. The seventh lens L7 is a biconvex lens.

The exposure-adjustment member St (refer to FIG. 6 or FIG. 8) is disposed on the second optical axis A2, and is a member such as an aperture or a shutter adjusting the amount of light incident into the CCD 37 along the second optical axis A2.

The third lens group G3 has positive optical power as a whole, and includes an eighth lens L8, a ninth lens L9 and a tenth lens L10.

The eighth lens L8 is a plane-convex lens having the convex surface facing to the side of the prism L5. The ninth lens L9 is a biconvex lens. The tenth lens L10 is a biconcave lens.

The fourth lens group G4 is used for focusing, and includes an eleventh lens L11 disposed on the second optical axis A2. The eleventh lens L11 is a convex meniscus lens having the convex surface facing to the side of the prism L5.

The fifth lens group G5 includes a twelfth lens L12 disposed on the second optical axis A2. The twelfth lens L12 is a biconvex lens.

The IR filter F1 (refer to FIG. 6 or FIG. 8) is a filter blocking off invisible light in the infrared region incident into the CCD 37. In addition, in the optical system 35, an optical lowpass filter may be disposed in the second optical axis A2 direction of the IR filter F1 (X axis direction positive side). The optical lowpass filter is a filter for removing the high spatial frequency component of the light flux incident into the CCD 37, and it is a filter for eliminating false color.

In addition, the configurations of the lenses including each of the lens groups G1 to G5 are not limited to those described above. It is possible to adopt another lens configuration, as long as the configuration has the same optical effects.

3.2.2: Operation of the Optical System

With Reference to FIGS. 6 and 8, the operation of the optical system 35 will be described.

As described above, FIG. 6 shows the arrangement of each of the lens groups G1 to G5 when the optical system 35 is located at the wide angle end. FIG. 8 shows the arrangement of each of the lens groups G1 to G5 when the optical system 35 is located at the telephoto end.

The first lens group G1 is movable in the first optical axis A1 direction. When the optical system 35 is located at the wide angle end, it is located at a place nearest to the second lens group G2 (refer to FIG. 6) within the movable range. When the optical system 35 is located at the telephoto end, it is located at a place farthest away from the second lens group G2 (refer to FIG. 8) within the movable range.

The second lens group G2, as shown in FIGS. 6 and 8, is relatively stationary with respect to the CCD 37, at the time of zooming of the optical system 35 from the wide angle end to the telephoto end.

The third lens group G3 is movable with the exposure-adjustment member St in the second optical axis A2 direction. When the optical system 35 is located at the wide angle end, the third lens group G3 is located at a place farthest away from the second lens group G2 (refer to FIG. 6) within the movable range. When the optical system 35 is located at the telephoto end, the third lens group G3 is located at a place nearest to the second lens group G2 (refer to FIG. 8) within the movable range.

The fourth lens group G4 is movable in the second optical axis A2 direction. The fourth lens group G4 performs the focusing operation, and corrects the out-of-focus state caused by the changes in imaging magnification due to the movement of first lens group G1 and the third lens group G3.

As shown in FIGS. 6 and 8, the fifth lens group G5 and the IR filter F1 are relatively stationary with respect to the CCD 37, when zooming with the optical system 35 from the wide angle end to the telephoto end.

Each of the lens groups G1 to G5 operates as described above. In particular, the first lens group G1 and the third lens group G3 moves in cooperation with each other, and changes the imaging magnification in the CCD 37.

In addition, in the lens barrel 31, the location of each of the lens groups G1 to G5 when the multistage retractable lens frame is retracted corresponds to the location of each of the lens groups G1 to G5 when the optical system 35 is located at the wide angle end.

4: Lens barrel 4.1: Configuration of the Lens barrel

The configuration of the imaging device 2, mainly the configuration of the lens barrel 31 will be described with reference to FIG. 9.

Figure 9:
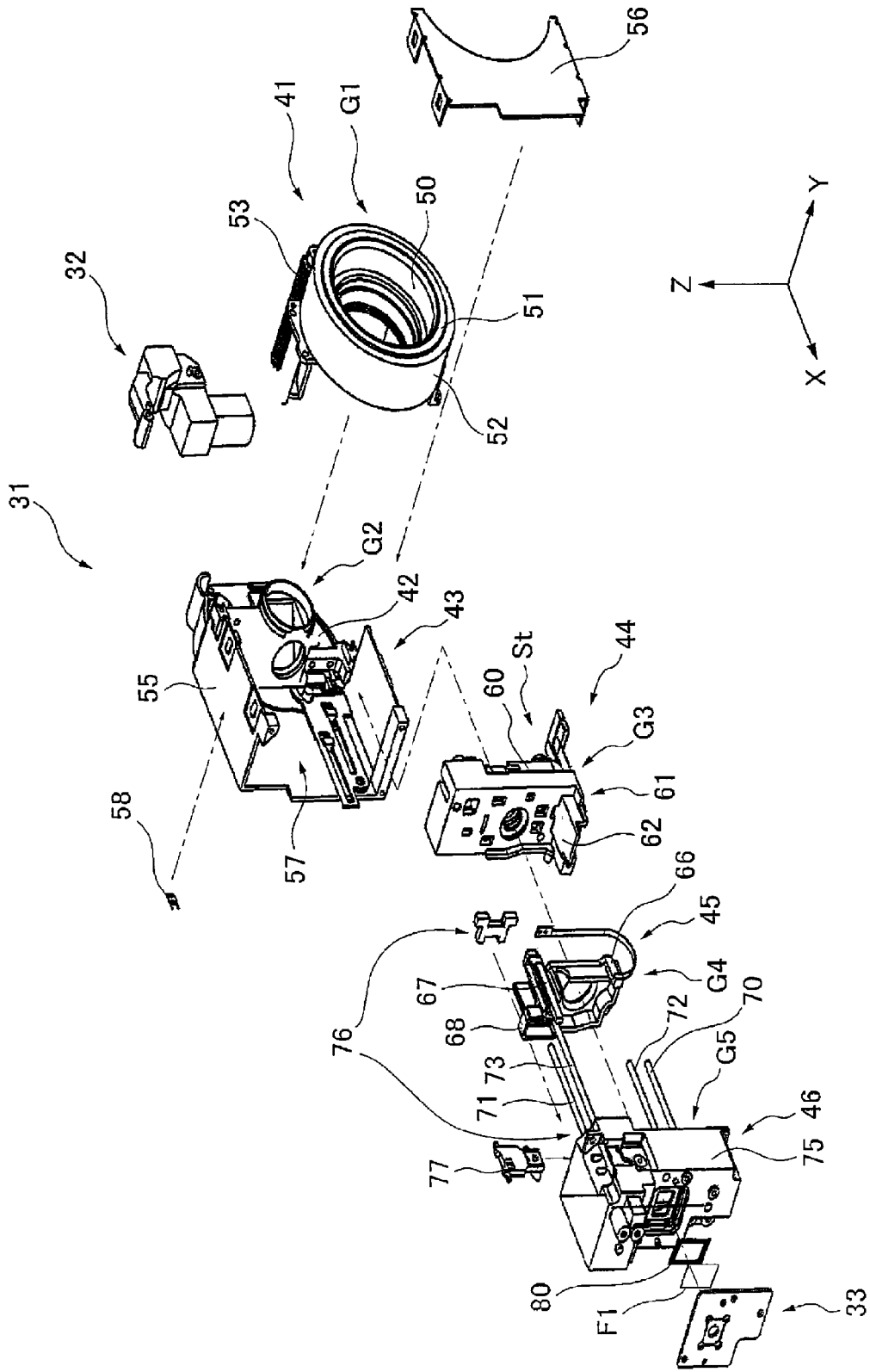
FIG. 9 is an exploded perspective view of the imaging device.

FIG. 9 is an exploded perspective view of the imaging device 2 when viewed from the same point as in FIG. 4A.

The lens barrel 31 is made up of a first group frame unit 41 retaining the first lens group G1, a base unit 43 to which a second group frame unit 42 retaining the second lens group G2 is fixed, a third group frame unit 44 retaining the exposure-adjustment member St and the third lens group G3, a fourth group frame unit 45 retaining the fourth lens group G4, and a master flange unit 46 retaining the fifth lens group G5.

The first group frame unit 41 is mainly made up of the first lens group G1 disposed on the first optical axis A1, a first group frame 50 retaining the first lens group G1, a driving frame 51 supporting the first group frame 50 to be movable in the first optical axis A1 direction (Y axis direction), a stationary frame 52 supporting the driving frame 51 to be movable in the first optical axis A1 direction (Y axis direction), and a driving gear 53 disposed to be rotatable along the Y axis direction between the stationary frame 52 and the base unit 43 and transmitting the driving force of the motor unit 32 to the driving frame 51.

The stationary frame 52 is fixed to the second group frame unit 42 retaining the second lens group G2. When the stationary frame 52 is fixed, the positions in the Z axis direction and X axis direction are determined so that the optical axis of the first lens group G1 and the optical axis of the fourth lens L4 of the second lens group G2 coincide with each other.

The base unit 43 is mainly made up of a base 55 making up the chassis of the lens barrel 31, a cover 56 making up the chassis with the base 55 and covering the front side of the base 55, the second group frame unit 42 fixed to the base 55, a third group movement mechanism 57 moving the third group frame unit 44 accommodated inside the chassis made up of the base 55 and the cover 56 along the second optical axis A2 direction (X axis direction), and a photo sensor 58 detecting the X axis direction position of the third group frame unit 44.

A motor unit 32 driving the driving gear 53 to rotate is attached on the X axis direction negative side of the base unit 43. The driving force of the motor unit 32 is transmitted to the third group movement mechanism 57 via the driving gear 53. The master flange unit 46 covering the X axis direction positive side of the base unit 43 is fixed on the X axis direction positive side of the base unit 43.

The third group frame unit 44 is mainly made up of a shutter unit 60 provided on the second optical axis A2 and including the exposure-adjustment member St performing the shutter operation and the aperture operation, the third lens group G3, an image blur correcting mechanism 61 retaining the third lens group G3 to be movable in the Y axis direction and the Z axis direction, and a third group frame 62 supporting the shutter unit 60 and the image blur correcting mechanism 61.

The third group frame 62 is fixed to the third group movement mechanism 57 of the base unit 43, and is driven to the X axis direction. When the third group frame 62 is fixed, the positions in the Y axis direction and the Z axis direction are determined so that the optical axis when the third lens group G3 is located at the center in the movable range coincides with the optical axes of the sixth lens L6 and the seventh lens L7 of the second lens group G2. Furthermore, the third group frame 62 is slidably fitted to third group guide poles 70, 71 extending on the X axis direction negative side from the master flange unit 46 which will be described later. This allows the third group frame unit 44 to move only in the X axis direction, that is, the second optical axis A2 direction.

The fourth group frame unit 45 is mainly made up of the fourth lens group G4, the fourth group frame 66 retaining the fourth lens group G4, a sensor magnet 67 and a coil 68 fixed to the fourth group frame 66.

The fourth group frame 66 is slidably fitted to the fourth group guide poles 72, 73 extending on the X axis direction negative side from the master flange unit 46 which will be described later. As a result, the fourth group frame 66 is positioned in the Y axis direction and the Z axis direction so that the optical axis of the fourth lens group G4 coincides with the optical axes of the sixth lens L6 and the seventh lens L7 of the second lens group G2, and is movable only in the X axis direction, that is, the second optical axis A2 direction.

The master flange unit 46 is mainly made up of the fifth lens group G5, a master flange 75 retaining the fifth lens group G5, the third group guide poles 70, 71 and the fourth group guide poles 72, 73 extending on the X axis direction negative side and fixed to the master flange 75, the IR filter F1 attached from the X axis direction positive side via a cushion rubber 80, a magnetic member 76 driving the fourth group frame unit 45 in cooperation with the coil 68, and an MR sensor 77 detecting the magnetism of the sensor magnet 67 and senses the X direction position of the fourth group frame unit 45.

The master flange 75 is fixed on the X axis direction positive side of the base 55. When the master flange 75 is fixed, the positions in the Y axis direction and the Z axis direction are determined so that the optical axis of the fifth lens group G5 coincides with the optical axes of the sixth lens L6 and the seventh lens L7 of the second lens group G2. Furthermore, a CCD unit 33 is fixed on the X axis direction positive side of the master flange unit 46.

The components included in the lens barrel 31 will be described in detail below.

4.2: First Group Frame Unit 4.2.1: Configuration of the First Group Frame Unit

The configuration of the first group frame unit 41 will be described in detail with reference to FIG. 10.

Figure 10:
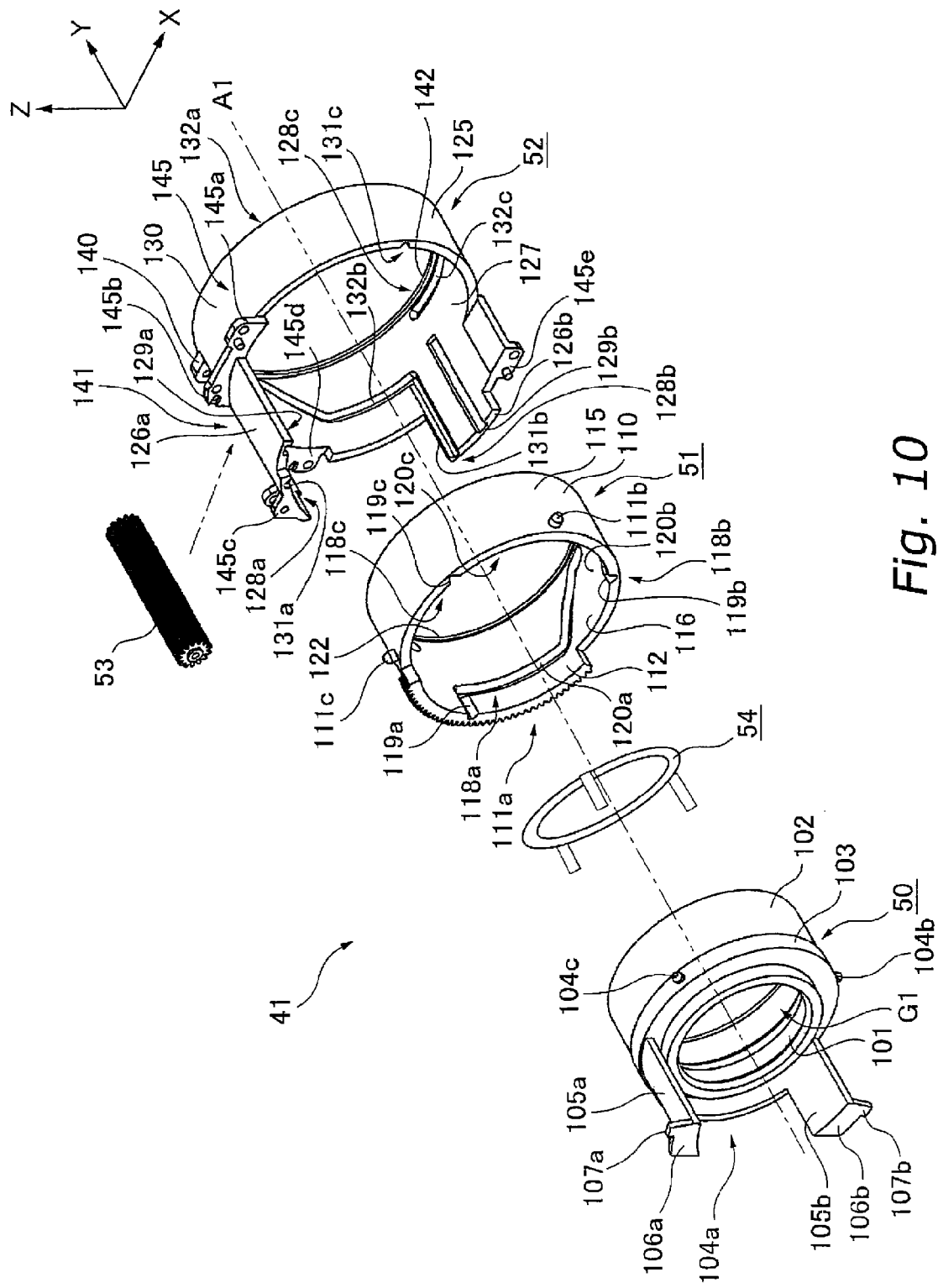
FIG. 10 is an exploded perspective view of the first group frame unit.

FIG. 10 is an exploded perspective view of the first group frame unit 41. The first group frame unit 41 supports the first lens group G1 with the multistage retractable frame body.

As shown in FIG. 10, the first group frame unit 41 is made up of the first lens group G1, the first group frame 50 retaining the first lens group, a first group DR (design ring) 54 attached to the first group frame 50, the driving frame 51 supporting the first group frame 50 to be movable, the stationary frame 52 supporting the driving frame 51 to be movable, and the driving gear 53 transmitting the driving from the motor unit 32 (refer to FIG. 9) to the driving frame 51.

The first lens group G1 is fixed to the inner peripheral surface 101 of the first group frame 50 by adhesive bonding or thermal caulking. Furthermore, on the inner peripheral surface 101 of the first group frame 50, the first group DR 54 is attached on the Y axis direction positive side of the first lens group G1. As a result, unwanted light is prevented from entering in the first lens group G1. In addition, by mounting the first group DR 54, the fixation mark (adhesion mark) of the first lens group G1 on the first group frame 50 is covered, and the quality of the exterior outside is ensured.

The first group frame 50 includes a cylindrical portion 102, a flange portion 103, cam pins 104a to 104c, extension portions 105a, 105b, and engagement portions 106a, 106b.

The cylindrical portion 102 has the circular inner peripheral surface 101 on which the first lens group G1 is attached. The flange portion 103 has an outer peripheral surface formed on the edge of the cylindrical portion 102 on the Y axis direction negative side and having a diameter greater than that of the cylindrical portion 102. The cam pins 104a to 104c are provided to be spaced at a predetermined angle (for example, 120 degrees) away in the circumferential direction at a plurality of circumferential positions on the outer peripheral surface of the flange portion 103 (for example, three locations: for example, three o'clock, seven o'clock and eleven o'clock positions when viewed from the Y axis direction positive side), and protrude out in the radiation direction of the first optical axis A1. The extension portions 105a and 105b are arc-shaped members extending toward the Y axis direction negative side and formed with a predetermined circumferential width (for example, 30 degrees) with two circumferential points (for example, one o'clock and five o'clock positions when viewed from the Y axis direction positive side) at the edge of the flange portion 103 on the Y axis direction negative side as the centers. The engagement portions 106a and 106b are formed to extend in the radiation direction of the first optical axis A1 on the tips of each of the extension portions 105a and 105b, and end portions 107a and 107b are formed with a circumferential width narrower than the other portions at the ends of the engagement portions 106a and 106b in the radiation direction and at the ends thereof on the X axis direction positive side.

The driving frame 51 has a cylindrical portion 110, cam pins 111a to 111c, and a ring gear 112.

The cam pins 111a to 111c are provided to be spaced at a predetermined circumferential angle (for example, 120 degrees) at a plurality of circumferential positions on the outer surface 115 of the cylindrical portion 110 (for example, three positions, one o'clock, five o'clock and nine o'clock positions when viewed from the Y axis direction positive side), and protrude out in the radiation direction of the first optical axis A1. The ring gear 112 is formed integrally with the cylindrical portion 110 at a circumferential portion of the edge of the cylindrical portion 110 on the Y axis direction negative side (for example, from one o'clock position to five o'clock position when viewed from the Y axis direction positive side) so that the tooth tips protrude in the radiation direction of the first optical axis A1 compared to the outer surface 115. The radius of an imaginary circle which connects the tips of the cam pins 111a to 111c is formed larger than the radius of an imaginary circle which connects the tooth tips of the ring gear 112.

The circular inner surface 116 of the cylindrical portion 110 and the ring gear 112 has a radius larger than the radius of the flange portion 103 of the first group frame 50, and has a radius smaller than the radius of the imaginary circle which connects the tips of the cam pins 104a to 104c of the first group frame 50. Therefore, by engaging cam pins 104a to 104c with cam grooves 118a to 118c formed on the inner surface 116, it becomes possible to arrange the first group frame 50 inside the driving frame 51.

In addition, a circular flange portion 122 extending inward in the radiation direction of the first optical axis A1 is formed at the edge portion of the cylindrical portion 110 on the Y axis direction positive side. The radius of the inner surface of the flange portion 122 is formed to be substantially the same size as the radius of the outer peripheral surface of the cylindrical portion 102 of the first group frame 50. As a result, unwanted light is prevented from entering into the interior of the lens barrel 31 through the gap formed between the first group frame 50 and the driving frame 51 in the radiation direction of the first optical axis A1.

Cam grooves 118a to 118c are formed in the inner surface 116 to be spaced at a predetermined circumferential angle (for example, 120 degrees). The cam grooves 118a to 118c have conducting ends opening at three positions (for example, three o'clock, seven o'clock and eleven o'clock positions) on the end portion of the inner surface 116 on the Y axis direction negative side for conducting cam pins 104a to 104c to the cam grooves 118a to 118c. In addition, the cam grooves 118a to 118c have conducting grooves 119a to 119c extending to the Y axis direction positive side from the conducting ends, and sloped grooves 120a to 120c respectively continuing from the conducting grooves 119a to 119c and extending toward the Y axis direction positive side and clockwise when viewed from the Y axis direction positive side. In addition, the conducting groove 119a of the cam groove 118a with the conducting end formed on the side of the ring gear 112 on the inner surface 116 has the length in the Y axis direction longer by the width size in the Y axis direction of the ring gear 112 compared to the other conducting grooves 119b and 119c.

The stationary frame 52 includes a cylindrical portion 125, and extension portions 126a, 126b. On the inner surface 127 of the cylindrical portion 125 and the extension portions 126a and 126b, cam grooves 128a to 128c and straight-movement grooves 129a and 129b are formed.

On a predetermined position in the circumferential direction of the outer surface 130 of the cylindrical portion 125 (for example, two o'clock position when viewed from the Y axis direction positive side), a protrusion portion 140 protruding in the radiation direction of the first optical axis A1, and a penetration groove 141 extending from the Y axis direction negative side of the protrusion portion 140 and passing through the cylindrical portion 125 in the radiation direction of the first optical axis A1 are formed. The protrusion portion 140 rotatably supports the end portion of the driving shaft of the driving gear 53 on the Y axis direction positive side. Furthermore, the end portion of the driving shaft of the driving gear 53 on the Y axis direction negative side is rotatably supported by a fixing portion 145c which will be described later. By doing so, the both ends of the driving gear 53 are rotatably supported on the stationary frame 52, and are disposed along the Y axis direction with the same level of accuracy as the processing accuracy of the stationary frame 52. In the penetration groove 141, the driving gear 53 is disposed along the Y axis direction. The tooth tips of the driving gear 53 enter into the inner side of the cylindrical portion 125 and mesh with the ring gear 112 of the driving frame 51 disposed inside the stationary frame 52.

In addition, on the edge portion of the cylindrical portion 125 on the Y axis direction positive side, a circular flange portion 142 extending inward in the radiation direction of the first optical axis A1 is formed. The radius of the inner surface of the flange portion 142 is formed to be substantially the same size as the radius of the outer surface 115 of the cylindrical portion 110 of the driving frame 51. As a result, unwanted light is prevented from entering into the interior of the lens barrel 31 through the gap in the radiation direction of the first optical axis A1 between the driving frame 51 and the stationary frame 52.

On the edge portion of the cylindrical portion 125 on the Y axis direction negative side, a flange 145 extending outward in the radiation direction of the first optical axis A1 is formed on a portion in the circumferential direction. Fixing portions 145*a* and 145*b* are formed on the flange 145. The fixing portion 145*a* is positioned on a fixing portion 164*c* of the second group frame unit 42 which will be described later, and is fixed to the fixing portion 164*c* by screws or the like. The fixing portion 145*b* is positioned on an arm portion formed integrally with the motor unit 32, and is fixed thereto by screws or the like.

Extension portions 126*a*, 126*b* are arc-shaped members extending toward the Y axis direction negative side and formed with a predetermined circumferential width with two circumferential positions at the edge portion of the cylindrical portion 125 on the Y axis direction negative side. More specifically, the extension portions 126*a* and 126*b* each has an end portion on the X axis direction positive side at twelve o'clock position and six o'clock position when viewed from the Y axis direction positive side, and are formed with a predetermined circumferential width. Here, the predetermined width is a width which is sufficient to form each of the conducting grooves 131*a* and 131*b* and straight-movement grooves 129*a* and 129*b* of the cam grooves 128*a* and 128*b* which will be described later, on the inner surface 127 of the extension portions 126*a* and 126*b*.

On the end portion of the extension portion 126*a* on the Y axis direction negative side, a fixing portion 145*c* extending outward in the radiation direction of the first optical axis A1 is formed. The fixing portion 145*c* rotatably supports the end portion of the driving shaft of the driving gear 53 on the Y axis direction negative side, and is accommodated in a driving shaft accommodating portion 175 of the base 55 which will be described later. A fixing portion 145*d* extending outward in the radiation direction of the first optical axis A1 is formed between the extension portion 126*a* and extension portion 126*b* in the circumferential direction to be adjacent to the extension portion 126*a*. The fixing portion 145*d* is positioned with respect to the front side of the motor unit 32 and fixed thereto by a screw or the like. Furthermore, a fixing portion 145*e* extending outward in the radiation direction of the first optical axis A1 is formed to be adjacent to the extension portion 126*b* in the circumferential direction. The fixing portion 145*e* is positioned with respect to a fixing portion 165*d* of the second group frame unit 42 which will be described later, and fixed by a screw or the like.

The circular inner surface 127 of the cylindrical portion 125 and the extension portions 126*a* and 126*b* has a radius larger than the radius of the imaginary circle which connects the ends of the ring gear 112 of the driving frame 51, and has a radius smaller than the radius of the imaginary circle which connects the ends of the cam pins 111*a* to 111*c* of the driving frame 51. For this reason, it becomes possible to arrange the driving frame 51 inside the driving frame 51, by engaging the cam pins 111*a* to 111*c* with the cam grooves 128*a* to 128*c* which are formed on the inner surface 127.

The cam grooves 128*a* to 128*c* are formed in the inner surface 127 to be spaced at a predetermined circumferential angle (for example, 120 degrees). The cam grooves 128*a* to 128*c* have conducting ends opening at three positions (for example, one o'clock, five o'clock and nine o'clock positions) on the end portion of the inner surface 127 on the Y axis direction negative side for conducting the cam pins 111*a* to 111*c* to the cam grooves 128*a* to 128*c*. In addition, the cam grooves 128*a* to 128*c* have conducting grooves 131*a* to 131*c* extending to the Y axis direction positive side from the conducting ends, and has sloped groove 132*a* to 132*c* respectively continuing from the conducting grooves 131*a* to 131*c* and extending toward the Y axis direction positive side in the and counterclockwise when viewed from the Y axis direction positive side. In addition, the conducting grooves 131*a* and 131*b* of the cam grooves 128*a* and 128*b* with the conducting ends formed on the end of the extension portions 126*a* and 126*b* on the Y axis direction negative side have the length in the Y axis direction longer by the length of the extension portions 126*a* and 126*b* in the Y axis direction compared to the other conducting groove 131*c*.

The straight-movement grooves 129*a* and 129*b* engage with the end portions 107*a* and 107*b* of the first group frame 50, guide the first group frame 50 to move in the first optical axis A1 direction, and prevent the first group frame 50 from relatively rotating with respect to the stationary frame 52.

4.2.2: Operation of the First Group Frame Unit

The operation of the first group frame unit 41 having the above described configuration will be described.

First, when the optical system 35 is located at the wide angle end (refer to FIG. 5 or FIG. 6), the first group frame 50 is disposed inside the driving frame 51, in a state where the cam pins 104*a* to 104*c* engage with the end portion of the conducting grooves 119*a* to 119*c* of the driving frame 51 on the Y axis direction positive side. Furthermore, the driving frame 51 is disposed inside the stationary frame 52, in a state where the cam pins 111*a* to 111*c* engage with the end portion of the conducting grooves 131*a* to 131*c* of the stationary frame 52 on the Y axis direction positive side. In proximity to the end portion of the straight-movement grooves 129*a* and 129*b* of the stationary frame 52 on the Y axis direction negative side, end portions 107*a* and 107*b* of the first group frame 50 are engaged.

At this time, the Y axis direction position of the end portions of each of the cylindrical portion 102 of the first group frame 50 on the Y axis direction positive side, the cylindrical portion 110 of the driving frame 51, and the cylindrical portion 125 of the stationary frame 52 substantially coincides with each other, and the arrangement of each configuration of the first group frame unit 41 is the same as the arrangement (retracting state) of the first group frame unit 41 when not using the imaging device 2.

Next, when the driving gear 53 is driven to rotate in the clockwise direction when viewed from the Y axis direction positive side in the by the motor unit 32 (refer to FIG. 9), the driving in the counterclockwise direction when viewed from the Y axis direction positive side is transmitted to the driving frame 51 via the ring gear 112 meshing with the driving gear 53. A cylinder cam mechanism is formed between the driving frame 51 and the stationary frame 52. For this reason, when the driving frame 51 is driven to rotate, the driving frame 51 rotates around the first optical axis A1 with respect to the stationary frame 52, and moves in the direction along the first optical axis A1 (the Y axis direction positive side). In addition, a cylinder cam mechanism is formed between the driving frame 51 and the first group frame 50. Furthermore, the relative rotation of the first group frame 50 around the first optical axis A1 with respect to the stationary frame 52 is restricted by the engagement between the first group frame 50 and the stationary frame 52. As a result, when the driving frame 51 is driven to rotate, the first group frame 50 relatively moves in the first optical axis A1 direction (the Y axis direction positive side) with respect to the driving frame 51.

Finally, when the optical system 35 is located at the telephoto end, most part of the cylindrical portion 102 of the first group frame 50 extends to the Y axis direction positive side compared to the cylindrical portion 110 of the driving frame 51, under the state where the cam pins 104a to 104c engage with the end portions of the sloped grooves 120a to 120c of the driving frame 51 on the Y axis direction positive side. Furthermore, most part of the cylindrical portion 110 of the driving frame 51 extends to the Y axis direction positive side compared to the cylindrical portion 125 of the stationary frame 52, under the state where the cam pins 111a to 111c engages with the end portion of the sloped grooves 132a to 132c of the stationary frame 52 on the Y axis direction positive side. In other words, compared to the case which the optical system 35 is located at the wide angle end, when the optical system 35 is located at the telephoto end, the first lens group G1 moves to the Y axis direction positive side by the sum of the moving distance of the cylinder cam mechanism provided between the first group frame 50 and the driving frame 51 and the moving distance of the cylinder cam mechanism provided between the driving frame 51 and the stationary frame 52. Furthermore, in this state, the end portions 107a and 107b of the first group frame 50 are located in proximity to the end portion of the straight-movement grooves 129a and 129b on the Y axis direction positive side. In other words, the first lens group G1 moves in the first optical axis A1 direction substantially by the length of the straight-movement grooves 129a and 129b in the Y axis direction, compared to the case which the optical system 35 is located at the wide angle end.

In addition, while the above described first group frame unit 41 moves from the wide angle end to the telephoto end, a space is secured on the Y axis direction negative side of the cylindrical portion 125 of the stationary frame 52 and on the X axis direction positive side of the extension portions 126a and 126b, because each member of the first group frame unit 41 does not enter. For this reason, the third group frame unit 44 which will be described later can enter into this space.

4.3: Base Unit
4.3.1: Configuration of the Base Unit

The configuration of the base unit 43 will be described with reference to FIG. 11.

Figure 11:
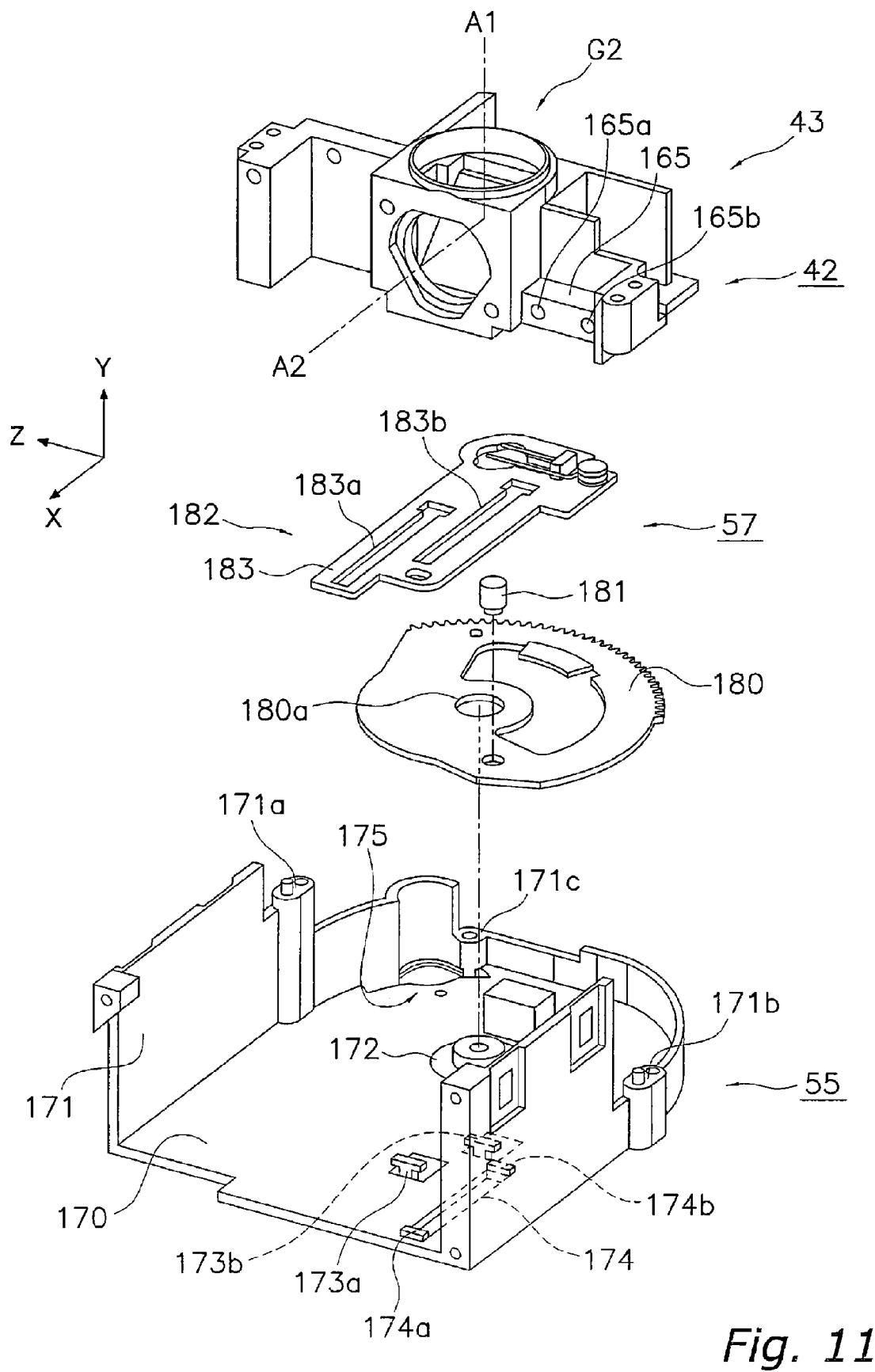
FIG. 11 is an exploded perspective view of the base unit.

FIG. 11 is an exploded perspective view of the base unit 43. The base unit 43 retains the second lens group G2 bending the light flux incident along the first optical axis A1 to the direction along the second optical axis perpendicular to the first optical axis A1. In addition, the base unit 43 includes a mechanism for moving the third lens group G3 (refer to FIGS. 5 to 8) making up the zoom lens system together with the first lens group G1 in the second optical axis A2 direction.

FIG. 11 shows the second group frame unit 42, the base 55 fixedly supporting the second group frame unit 42 from the Y axis direction negative side, and the third group movement mechanism 57 attached to the base 55 and disposed between the second group frame unit 42 and the base 55 in the Y axis direction, among the configurations of the base unit 43 described with reference to FIG. 9.

Detailed configurations of the second group frame unit 42, the base 55, and the third group movement mechanism 57 will be described below.

4.3.2: Configuration of the Second Group Frame Unit

The configuration of the second group frame unit 42 will be described with reference to FIGS. 11 to 13.

Figure 12:
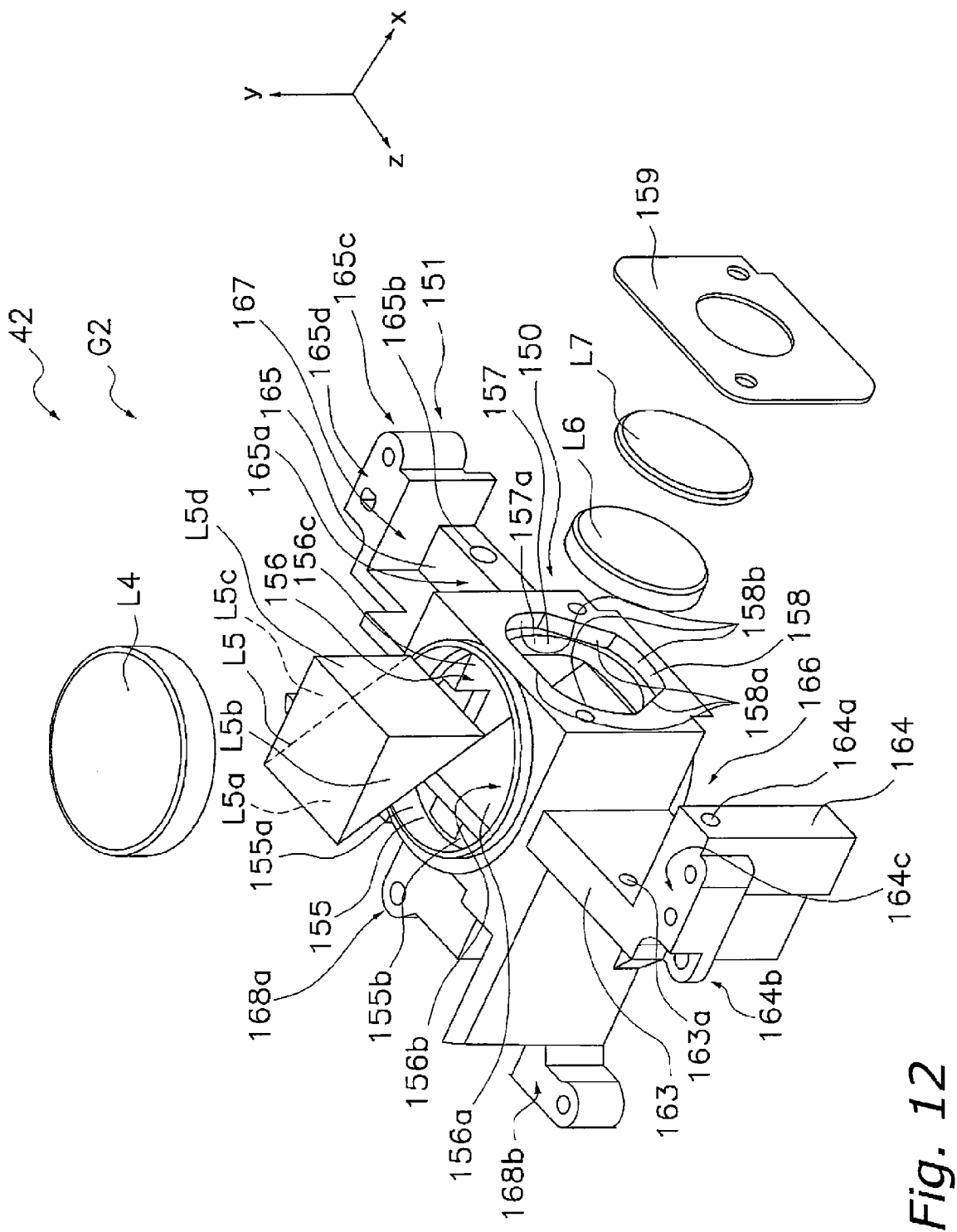
FIG. 12 is an exploded perspective view of the second group frame unit.

FIG. 12 is an exploded perspective view of the second group frame unit 42.

Figure 13:
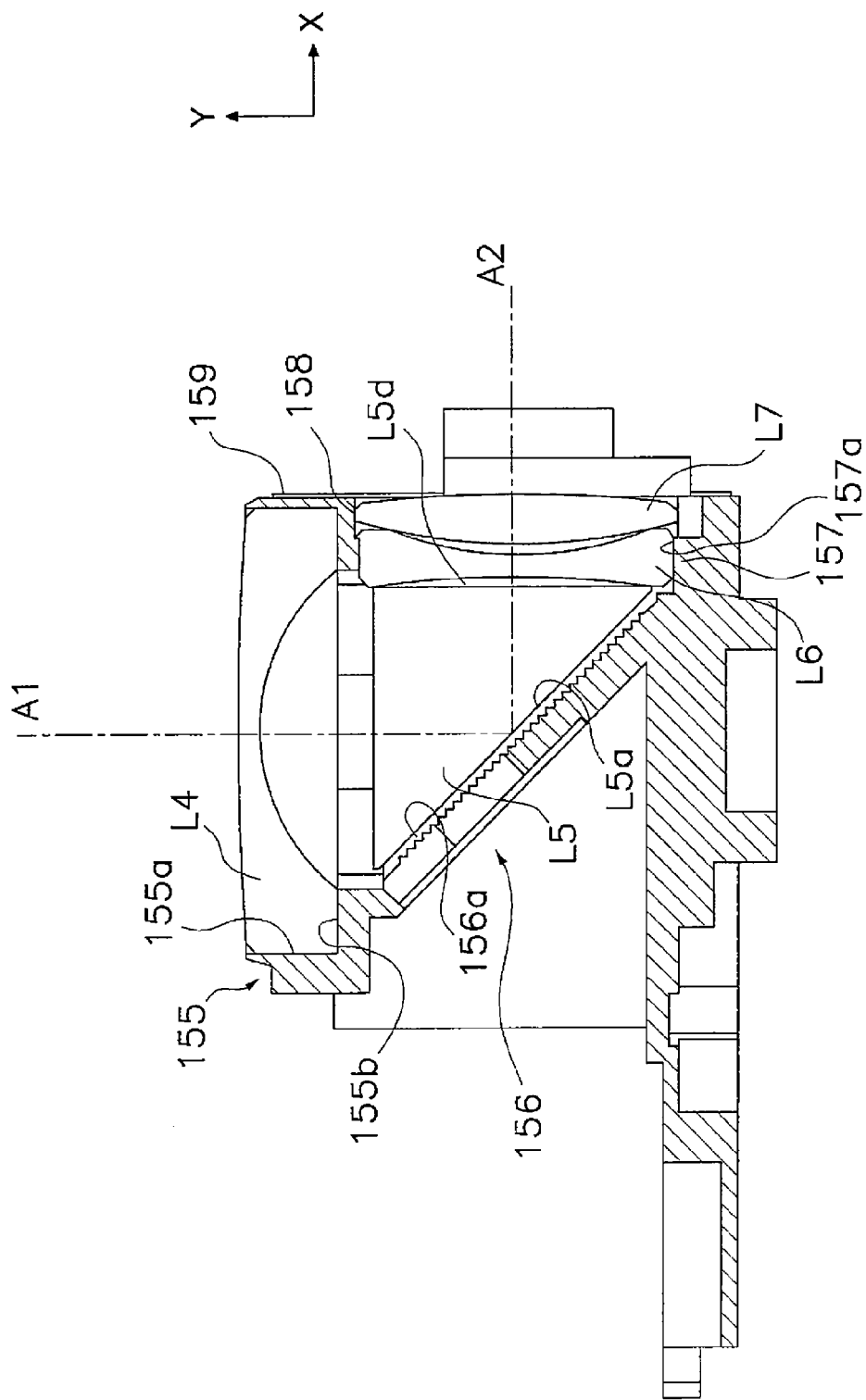
FIG. 13 is a sectional view of the second group frame unit.

FIG. 13 is a sectional view of the second group frame unit 42 in a plan including the first optical axis A1 and the second optical axis A2.

As shown in FIG. 12, the second group frame unit 42 includes the second lens group G2, the second group frame 150 retaining the second lens group G2, and a support portion 151 supporting the second group frame 150 and attached to the base 55.

Since details on the second lens group G2 have been described with reference to FIGS. 5 to 8, a description thereof will be omitted here.

The second group frame 150 is mainly made up of a fourth lens retaining frame 155 retaining the fourth lens L4, a prism retaining frame 156 retaining the prism L5, a sixth lens retaining frame 157 retaining the sixth lens L6, and a seventh lens retaining frame 158 retaining the seventh lens L7.

The fourth lens retaining frame 155 has a radius substantially coincides with the radius of the fourth lens L4, and has a circular inner peripheral surface 155a extending in the Y axis direction. The fourth lens L4 is disposed to fit in the inner peripheral surface 155a, and fixed by an adhesive or the like. In addition, on the inner peripheral side of the end portion of the inner peripheral surface 155a on the Y axis direction negative side, a support surface 155b (refer to FIG. 13) which is perpendicular to the Y axis and supports the fourth lens L4 toward the Y axis direction positive side is formed. The fourth lens L4 is disposed so that the surface thereof on the Y axis direction negative side contacts with this support surface 155b, and is positioned in the Y axis direction (first optical axis A1 direction).

The prism retaining frame 156 is a frame body interiorly accommodating the prism L5 and opening in the first optical axis A1 direction and the second optical axis A2 direction, and is formed integrally with the fourth lens retaining frame 155 on the Y axis direction negative side thereof. Inside the prism retaining frame 156, a sloped surface 156a (refer to FIG. 13) disposed to be opposite to the reflecting surface L5a (refer to FIG. 13) of the prism L5 and downward inclined at forty five degrees toward the X axis direction positive side, and opposed surfaces 156b and 156c extending to perpendicularly intersect with the Z axis from the both ends of the sloped surface 156a in the Z axis direction and disposed to be opposite to the upper surface L5b and the bottom side L5c of the prism L5 respectively are formed. The prism L5 is accommodated and fixed by an adhesive or the like in the space formed in the prism retaining frame 156 by the sloped surface 156a and the opposed surfaces 156b and 156c.

The sixth lens retaining frame 157 is formed integrally with the prism retaining frame 156 on the X axis direction positive side of the prism retaining frame 156. The sixth lens retaining frame 157 has a radius substantially coincides with the radius of the sixth lens L6, and has a circular inner peripheral surface 157a extending in the X axis direction. The sixth lens L6 is disposed to fit in the inner peripheral surface 157a and fixed by an adhesive or the like. In addition, an output surface L5d of the prism L5 is disposed on the X axis direction negative side of the inner peripheral surface 157a (refer to FIG. 13). The sixth lens L6 is disposed so that the surface thereof on the X axis direction negative side contacts with the output surface L5d, and is positioned in the X axis direction (second optical axis A2 direction).

The seventh lens retaining frame 158 is formed integrally with the sixth lens retaining frame 157 on the X axis direction positive side of the sixth lens retaining frame 157. The seventh lens retaining frame 158 includes sloped surfaces 158a having a portion of each of the side surfaces of an imaginary equilateral-triangular prism having the seventh lens L7 as the inscribed circle, and arc-shaped surfaces 158b connecting smoothly with each of the sloped surfaces around the second optical axis A2. The seventh lens L7 is disposed so that the outer peripheral surface thereof contacts with each of the sloped surfaces 158a, and fixed by an adhesive. In addition, the surface of the sixth lens L6 on the X axis direction positive side is disposed on the X axis direction negative side of the seventh lens L7 (refer to FIG. 13). The seventh lens L7 is disposed so that the surface thereof on the X axis direction negative side contacts with the surface of the sixth lens L6 on the X axis direction positive side, and is positioned in the X axis direction (second optical axis A2 direction).

On the end surface of the seventh lens retaining frame 158 on the X axis direction positive side, an opening member 159 which is a plate member having an opening at the center portion is fixed by a screw or the like. The opening member 159 is a member for blocking off unwanted light going toward unwanted directions, out of the light outputted from the second group frame unit 42 along the second optical axis A2. The opening member 159 has a circular opening disposed substantially at the center, and is attached to the seventh lens retaining frame 158 so that the center of the opening coincides with the second optical axis A2 (refer to FIG. 13). Furthermore, the edge of the opening of the opening member 159 supports the seventh lens L7 to the X axis direction negative side.

The support portion 151 is mainly formed by a first member 163 formed toward the Z axis direction positive side from the center position of the second group frame 150 in the X axis direction and having a surface facing the X axis direction positive side, a second member 164 extending to the X axis direction positive side at the end portion of the first member 163, a third member 165 having a surface facing the X axis direction positive side and formed on the Z axis direction negative side of the second group frame 150, and fixing portions 168a and 168b formed at the end portion on the X axis direction negative side.

The first member 163 includes an hole portion 163a for fitting and fixing the fourth group guide pole 73 (refer to FIG. 9) on the surface facing the X axis direction positive side.

The second member 164 includes an hole portion 164a at substantially the same position in the Y axis direction as the hole portion 163a on the surface facing the X axis direction positive side, for fitting and fixing the third group guide pole 71 (refer to FIG. 9). In addition, on the end portion of the second member 164 on the Z axis direction positive side, a fixing portion 164b is formed for fixing the second group frame unit 42 to the base 55, and a fixing portion 164c is formed for fixing the first group frame unit 41 to the second group frame unit 42. The fixing portion 164b is positioned with respect to the fixing portion 171a formed on the base 55, and is fixed by a screw or the like. The fixing portion 164c is positioned with respect to the fixing portion 145a formed on the stationary frame 52 of the first group frame unit 41, and is fixed by a screw or the like.

As described above, the first member 163 is formed toward the Z axis direction positive side from the center position of the second group frame 150 in the X axis direction. The second member is formed toward the X axis direction positive side at the end portion of the first member 163. For this reason, between the surface of the second group frame 150 on the Z axis direction positive side and the surface of the second member on the Z axis direction negative side, a concaved space 166 is secured on the X axis direction negative side with respect to the end surface of the second group frame 150 on the X axis direction positive side. A aperture actuator 202 protruding to the X axis direction negative side of a shutter unit 60 (which will be described later) can enter into this concaved space 166. This will be described later with reference to FIGS. 27 to 29.

The third member 165 is formed toward the Z axis direction negative side from near the end portion of the second group frame 150 on the Y axis direction negative side, and includes an opening portion 165a (refer to FIG. 11) for fitting and fixing the fourth group guide pole 72, and an opening portion 165b for fitting and fixing the third group guide pole 70 in the order from the Z axis direction positive side on the surface facing the X axis direction positive side. In addition, a fixing portion 165c for fixing the second group frame unit 42 to the base 55 and a fixing portion 165d for fixing the first group frame unit 41 to the second group frame unit 42 are formed on the end portion of the third member 165 on the Z axis direction negative side. The fixing portion 165c is positioned with respect to the fixing portion 171b formed on the base 55, and is fixed by a screw or the like. The fixing portion 165d is positioned with respect to the fixing portion 145e formed on the stationary frame 52 of the first group frame unit 41, and is fixed by a screw or the like.

As described above, the third member 165 is formed toward the Z axis direction negative side from near the end portion of the second group frame 150 on the Y axis direction negative side. For this reason, a concaved space 167 adjacent to the second group frame 150 on the Z axis direction negative side is secured on the Y axis direction positive side of the third member 165. A shutter actuator 203 protruding on the X axis direction negative side of a shutter unit 60 (described later) can enter into this concaved space 167. This will be described later with reference to FIGS. 27 to 29.

The fixing portion 168a is positioned and fixed with respect to a fixing portion provided on the rear side of the motor unit 32.

The fixing portion 168b is positioned with respect to the fixing portion 171c formed on the base 55, and fastened by a screw or the like.

4.3.3: Configuration of the Base

The configuration of the base 55 will be described with reference to FIG. 11.

The base 55 mainly includes a rear side 170 including the rear side of the lens barrel 31, and a side surface 171 extending to the Y axis direction positive side from the rear side 170.

On the rear side 170, a bearing portion 172 for rotatably supporting a center opening 180a of the ring gear 180 of the third group movement mechanism 57 (described later), guide pins 173a and 173b for guiding the translational movement of the rod unit 182 of the third group movement mechanism 57 (described later) to the X axis direction, a restricting portion 174 restricting the movement of the rod unit 182 to the X axis direction, and a driving shaft accommodating portion 175 accommodating the driving gear 53 are formed.

The bearing portion 172 is a cylindrical convex portion protruding to the Y axis direction positive side and is inserted into the center opening 180a provided in the rotation center of the ring gear 180, and supports the ring gear 180 to be rotatable.

The guide pins 173a and 173b are members protruding to the Y axis direction positive side and formed to have a predetermined space in both the X axis direction and the Z axis direction, and are inserted into guide grooves 183a and 183b respectively formed along the longitudinal direction of the rod unit 182, and guide the movement of the rod unit 182 to the X axis direction.

The restricting portion 174 is a longitudinal groove with a base and extends in the X axis direction. End portions 174a and 174b rising up to the Y axis direction positive side from the bottom of the groove of the restricting portion 174 are formed on the two ends thereof in the X axis direction.

The driving shaft accommodating portion 175 accommodates the driving gear 53 of the first group frame unit 41 and the fixing portion 145c rotatably supporting the driving gear 53.

Fixing portions 171a to 171c for fixing the second group frame unit 42 to the base 55 are formed on the side surface 171. The fixing portions 171a, 171b, and 171c are positioned with respect to the fixing portions 164b, 165c, and 168b of the second group frame unit 42 respectively, and are fixed by screws or the like.

4.3.4: Configuration of the Third Group Movement Mechanism

The configuration of the third group movement mechanism 57 will be described with reference to FIG. 11. The third group movement mechanism 57 is a mechanism for moving the third group frame unit 44 to the direction along the second optical axis A2, and is driven by receiving the driving from the motor unit 32 (refer to FIG. 9).

The third group movement mechanism 57 is mainly made up of the ring gear 180 for converting the rotational drive transmitted from the motor unit 32 via the driving gear 53 into a drive to the direction along the second optical axis A2, the rod unit 182 in which the translational movement thereof in the direction along the second optical axis A2 is possible integrally with the third group frame unit 44, and a ring gear pin 181 functionally coupling the ring gear 180 and the rod unit 182.

The ring gear 180 is a plate member in which teeth are formed in an arc on the outer periphery thereof to mesh with the driving gear 53, and rotates within a predetermined rotational angle range. The ring gear 180 includes a center opening 180a in the rotational center thereof, and is attached to the base 55 by fitting the center opening 180a to the bearing portion 172 of the base 55.

The ring gear pin 181 is a cylindrical member having a predetermined length in the Y axis direction, and the end portion thereof on the Y axis direction negative side is fixed to the ring gear 180 by caulking or the like.

The rod unit 182 is functionally coupled to the ring gear 180 by engaging with the ring gear pin 181, and includes the slider crank mechanism together with the ring gear 180.

Figure 14:
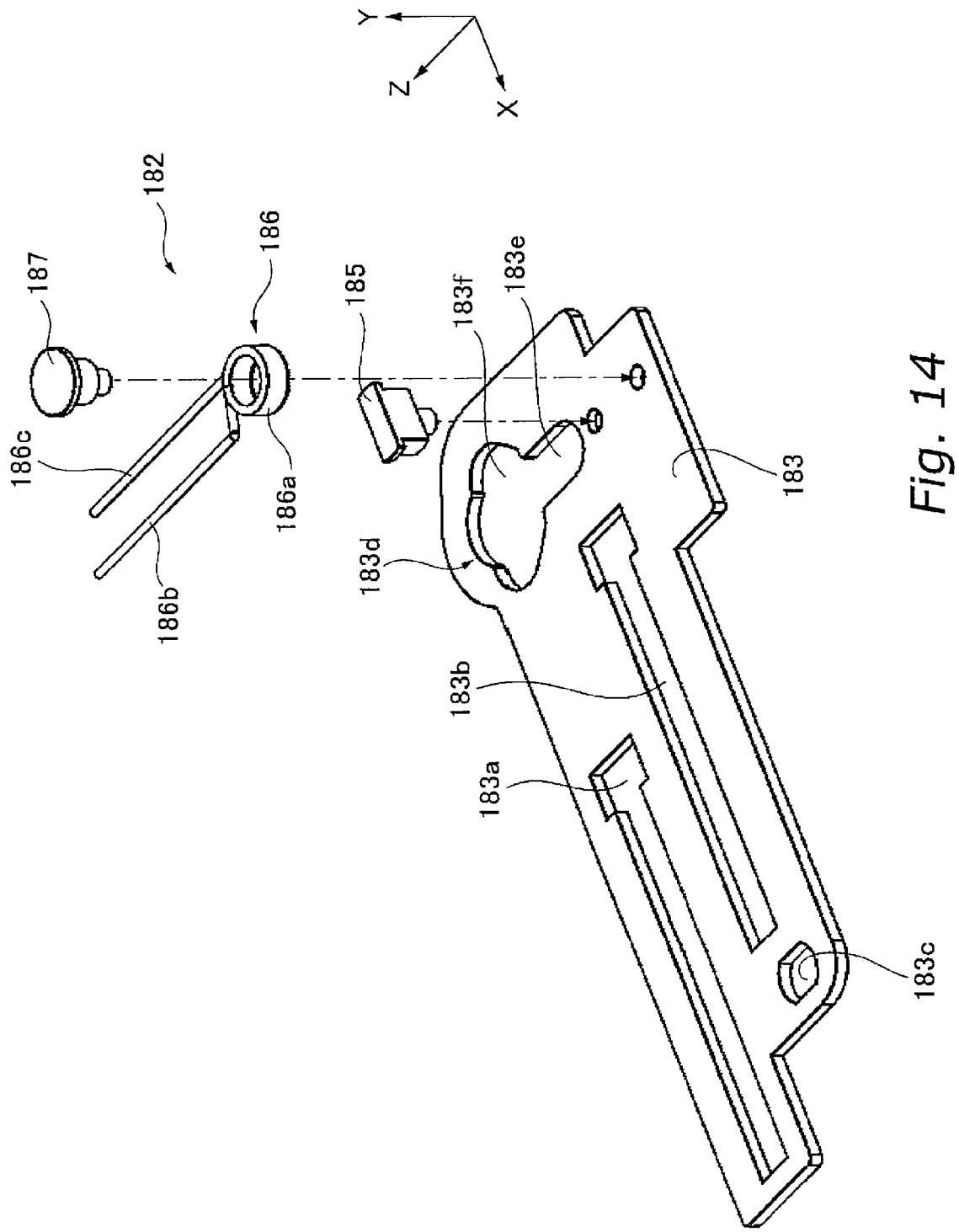
FIG. 14 is an exploded perspective view of the rod unit.

The configuration of the rod unit 182 will be described with reference to FIG. 14. FIG. 14 is an exploded perspective view of the rod unit 182.

As shown in FIG. 14, the rod unit 182 is mainly made up of a rod 183, a crimp spring 186 fixed to the rod 183, a spring pin 187 for fixing the crimp spring 186 to the rod 183, and a crimp spring restricting pin 185 restricting the crimp movement of the crimp spring 186. The elastic coupling mechanism is made up of the crimp spring 186, the spring pin 187, and the crimp spring restricting pin 185 elastically coupling the ring gear 180 and the rod unit 182.

The rod 183 is a plate member which is long in the X axis direction. Two guide grooves 183a and 183b extending in the longitudinal direction, a through-hole 183c formed on the X axis direction positive side of the guide groove 183b, and an engagement opening 183d formed on the X axis direction negative side of the guide grooves 183a and 183b are formed in the rod 183.

As described with reference to FIG. 11, guide pins 173a and 173b formed on the base 55 are inserted in the guide grooves 183a and 183b, respectively. The guide grooves 183a and 183b are formed to be spaced at the same distance in the Z axis direction as the distance between the guide pins 173a and 173b in the Z axis direction. As a result, the movement of the rod 183 is restricted only to a translational movement in the X axis direction.

A protrusion portion 65 of the third group frame unit 44 which will be described later is inserted from the Y axis direction positive side into the through-hole 183c. The protrusion portion 65 is inserted so that the end thereof protrudes out to the Y axis direction negative side of the rod 183.

The ring gear pin 181 is inserted from the Y axis direction negative side into the engagement opening 183d. The engagement opening 183d includes first engagement opening 183e extending in the Z axis direction and having a larger width in the X axis direction than the diameter of the ring gear pin 181, and a second engagement opening 183f formed to be continuous with the first engagement opening 183e on the Z axis direction positive side thereof and having a larger width in the X axis direction than the first engagement opening 183e.

The crimp spring 186 is a torsion coil spring or the like made up of a coil 186a and two arm portions 186b and 186c which extend from the coil 186a. Each of the arm portions 186b and 186c is formed to be able to support the load in the direction toward each other when the crimp spring 186 elastically deformed to involve the coil 186a.

The spring pin 187 is a member inserted into the coil 186a of the crimp spring 186 and having one end thereof fitted and fixed to an opening formed on the rod 183, and fixes the crimp spring 186 to the rod 183. The spring pin 187 is disposed on the Z axis direction negative side of the first engagement opening 183e.

The crimp spring restricting pin 185 is a member for maintaining the crimp spring 186 in a predetermined elastically deformed state, is disposed between the arm portions 186b and 186c, and receives the crimping forces in directions toward the other arm portion 186c, 186b respectively from each of the arm portions 186b and 186c. The crimp spring restricting pin 185 is disposed on the Z axis direction negative side of the first engagement opening 183e. In addition, the X axis direction width of the contact surface with the crimp spring 186 on the crimp spring restricting pin 185 is wider than the X axis direction width of the first engagement opening 183e.

Figure 15:
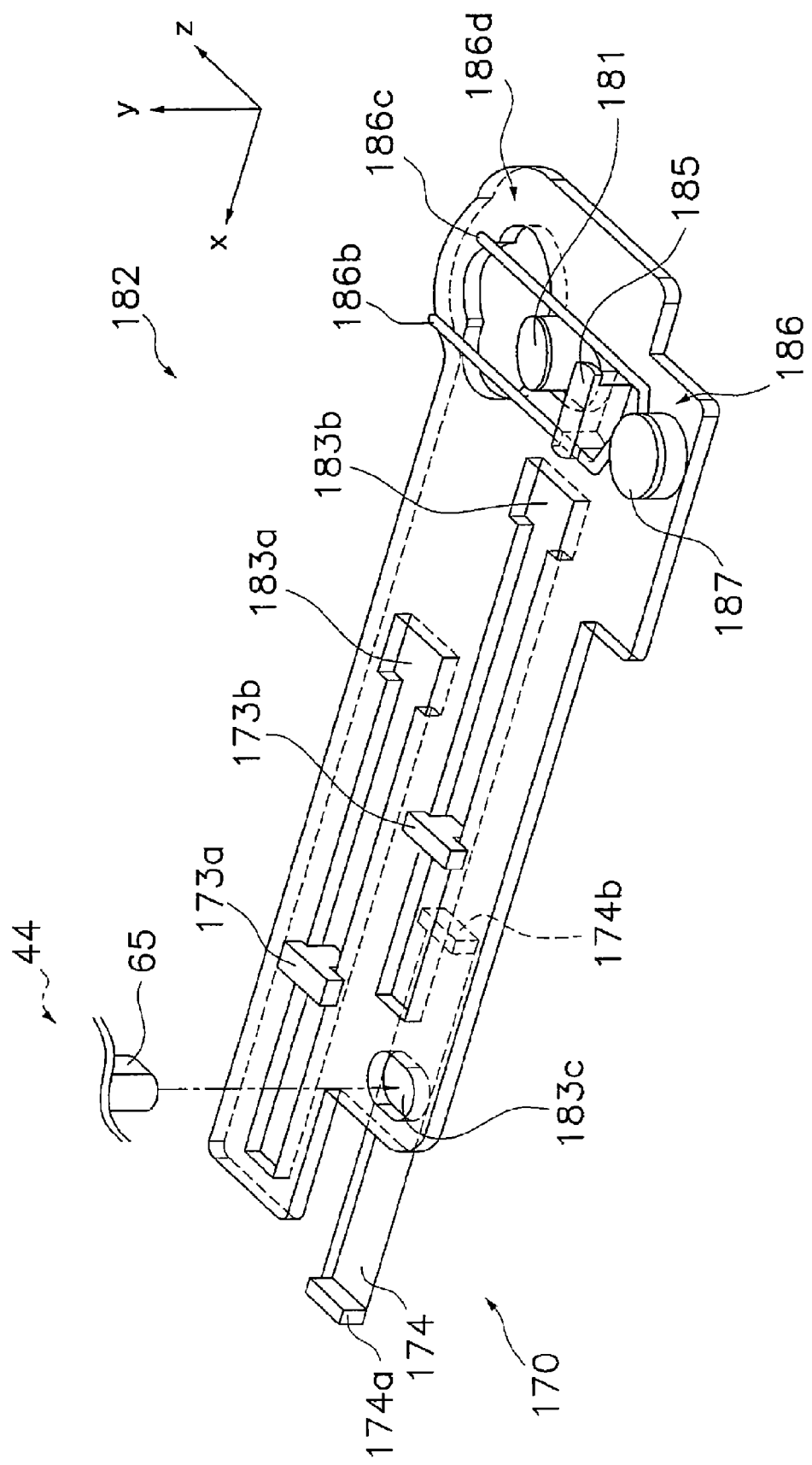
FIG. 15 is a perspective view of the assembly of the rod unit.

The assembling state of the third group movement mechanism 57 will be described with reference to FIG. 15. FIG. 15 is a perspective view showing mainly the assembling state of the rod unit 182.

As shown in FIG. 15, in the rod unit 182, the crimp spring 186 is fixed to the rod 183 by the spring pin 187. In an elastically deformed state, the crimp spring 186 is fixed via the crimp spring restricting pin 185 between each of the arm portions 186b and 186c. In this attached state, the arm portion 186b located on the X axis direction positive side contacts with the surface of the crimp spring restricting pin 185 on the X axis direction positive side, which a crimping force acts toward the X axis direction negative side with respect to the crimp spring restricting pin 185. On the other hand, the arm portion 186c located on the X axis direction negative side contacts with the surface of the crimp spring restricting pin 185 on the X axis direction negative side, and applies a crimping force toward the X axis direction positive side with respect to the crimp spring restricting pin 185.

The ring gear pin 181 fixed to the ring gear 180 (refer to FIG. 11) is inserted from the Y axis direction negative side into engagement opening 183d of the rod unit 182, in the middle in the X axis direction between the arm portions 186b and 186c of the crimp spring 186. As a result, if the ring gear 180 is driven to rotate and the X axis direction position of the ring gear pin 181 changes, the rod 183 is driven in the X axis direction while the opening edge of the engagement opening 183d slides against the outer periphery of the ring gear pin 181.

Each of the guide pins 173a and 173b formed on the base 55 (refer to FIG. 11) is inserted from the Y axis direction negative side into the guide grooves 183a and 183b which extend in the X axis direction of the rod 183. As a result, the rod 183 receiving the drive is in translational movement in the X axis direction.

The through-hole 183c of the rod 183 is located to be opposed to the Y axis direction positive side of the restricting portion 174 formed on the base 55. The protrusion portion 65 of the third group frame unit 44 which will be described later is inserted from the Y axis direction positive side into the through-hole 183c. The end of the protrusion portion 65 protrudes out to the Y axis direction negative side of the rod 183, and furthermore, is inserted into the restricting portion 174.

Figure 16:
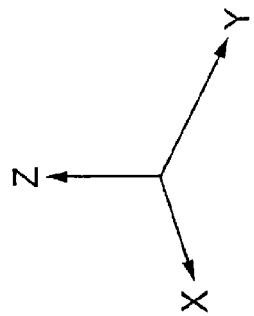
FIG. 16 is an perspective view showing the assembling state of the third group frame unit and the base unit.
Figure 16:
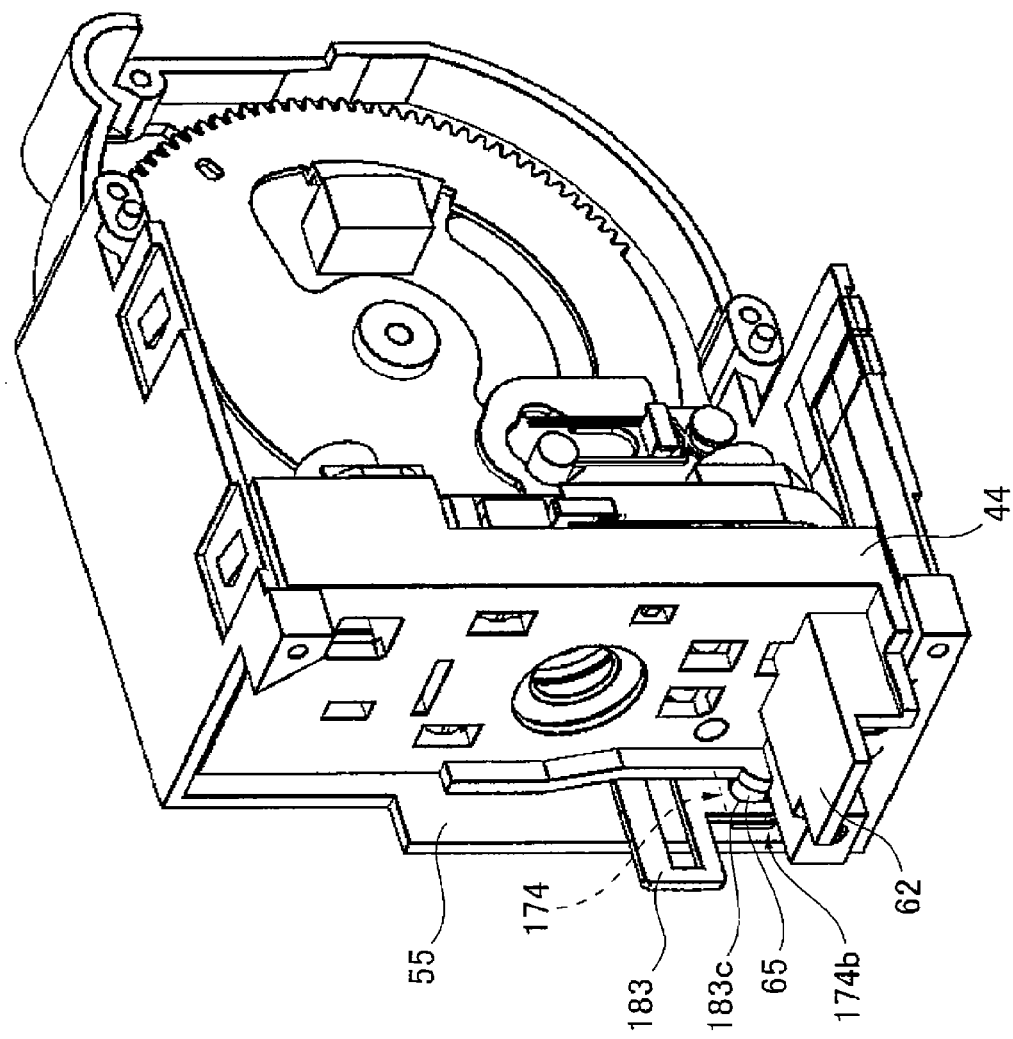

FIG. 16 shows the engagement state of the protrusion portion 65 of the third group frame unit 44, the rod 183, and the restricting portion 174. As shown in the figure, the protrusion portion 65 protruding on the Y axis direction negative side formed on the third group frame 62 of the third group frame unit 44 is inserted into the through-hole 183c formed on the rod 183, and furthermore, the end thereof is inserted into the restricting portion 174 of the base 55.

As a result, the rod 183 is movable all the way to the position at which the protrusion portion 65 contacts with the end portion 174a on the X axis direction positive side, and is movable all the way to the position at which the protrusion portion 65 contacts with the end portion 174b on the X axis direction negative side (refer to FIG. 11 or FIG. 15).

4.3.5: Operation of the Base Unit

The operation of the base unit 43, in particular, the operation of the third group movement mechanism 57 will be described with reference to FIGS. 17 to 22.

Figure 17:
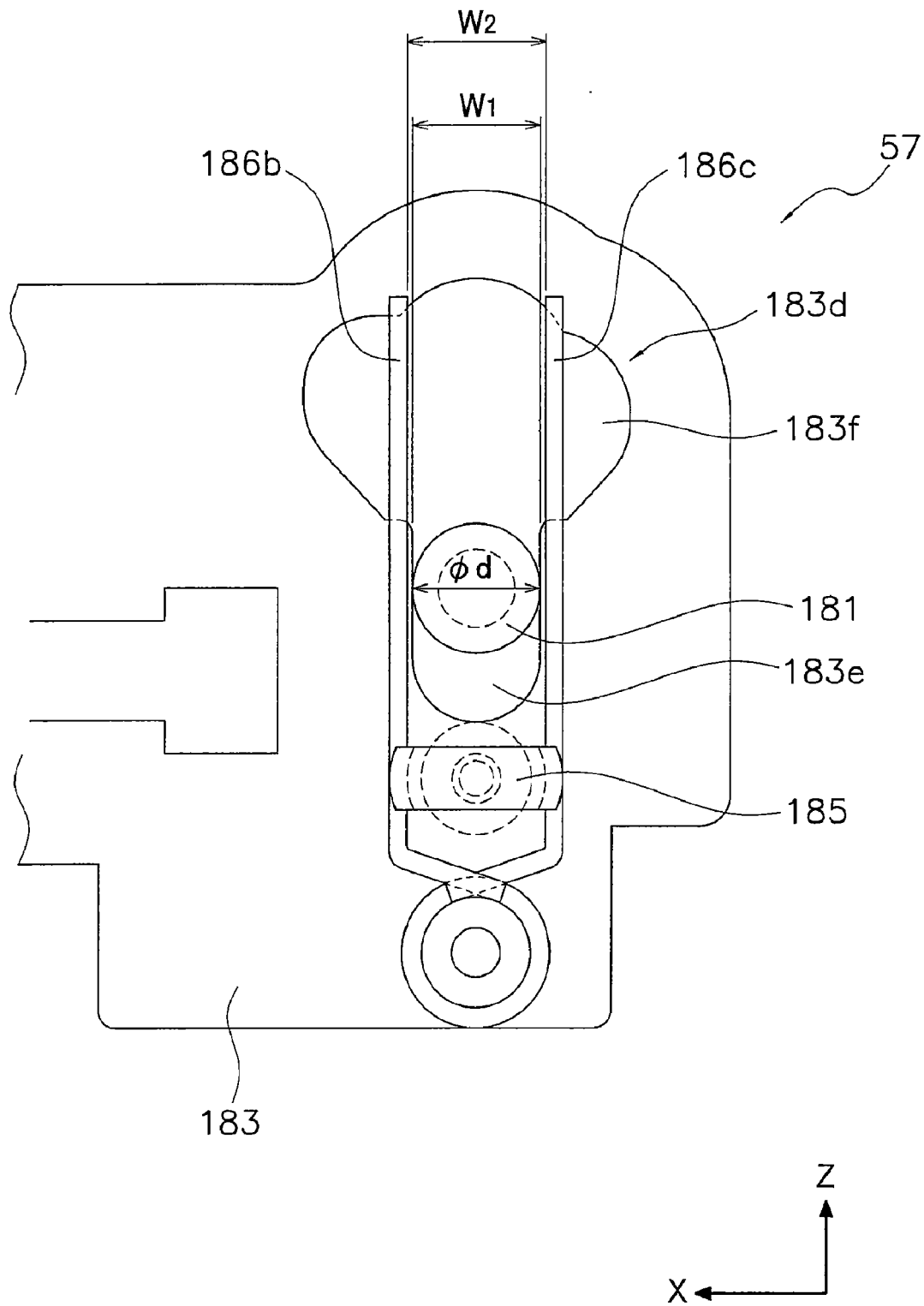
FIG. 17 is an illustration for describing the operation of the third group movement mechanism.

Out of the operations of the third group movement mechanism 57, the operation of the elastic coupling mechanism elastically coupling the ring gear 180 (refer to FIG. 11) and the rod 183 will be described with reference to FIG. 17. FIG. 17 shows the state where the ring gear pin 181 is inserted into the engagement opening 183d.

The X axis direction width W1 of the first engagement opening 183e of the engagement opening 183d is larger than the diameter d of the ring gear pin 181. Furthermore, the X axis direction width W2 of the contacting surfaces with the crimp spring 186 of the crimp spring restricting pin 185 is larger than the X axis direction width W1 of the first engagement opening 183e. Therefore, in the state where the ring gear pin 181 is inserted into the first engagement opening 183e, the arm portions 186b and 186c of the crimp spring 186 contact with the contacting surfaces on both ends in the X axis direction of the crimp spring restricting pin 185. Consequently, when the ring gear pin 181 is located in the first engagement opening 183e, the crimping force of the crimp spring 186 does not act on the ring gear pin 181.

On the other hand, when the ring gear pin 181 moves along the edge portion of the engagement opening 183d to the second engagement opening 183f having a width wider than the first engagement opening 183e in the X axis direction, the ring gear pin 181 contacts the edge portion of the second engagement opening 183f, and contacts the arm portion 186b or the arm portion 186c of the crimp spring 186. Consequently, when the ring gear pin 181 is located in the second engagement opening 183f, the crimping force of the crimp spring 186 acts on the ring gear pin 181.

More specifically, when the ring gear pin 181 is located on the X axis direction positive side of the second engagement opening 183f, the arm portion 186b on the X axis direction positive side is elastically deformed to the X axis direction positive side by the ring gear pin 181, and the arm portion 186b separates from the contacting surface of the crimp spring restricting pin 185 on the X axis direction positive side. For this reason, the crimping force of the crimp spring 186 acts on the contacting surface of the crimp spring restricting pin 185 on the X axis direction negative side from the arm portion 186c on the X axis direction negative side. As a result, the rod 183 receives a pressing force in the direction toward the X axis direction positive side, via the crimp spring restricting pin 185.

On the other hand, when the ring gear pin 181 is located on the X axis direction negative side of the second engagement opening 183f, the arm portion 186c on the X axis direction negative side is elastically deformed to the X axis direction negative side by the ring gear pin 181, and the arm portion 186c separates from the contacting surface of the crimp spring restricting pin 185 on the X axis direction negative side. For this reason, the crimping force of the crimp spring 186 acts on the contacting surface of the crimp spring restricting pin 185 on the X axis direction positive side from the arm portion 186b on the X axis direction positive side. As a result, the rod 183 receives a pressing force in the direction toward the X axis direction negative side, via the crimp spring restricting pin 185.

The operation of the ring gear 180 and the rod 183 coupled by the above described elastic coupling mechanism will be described with reference to FIGS. 18 to 22.

Figure 18:
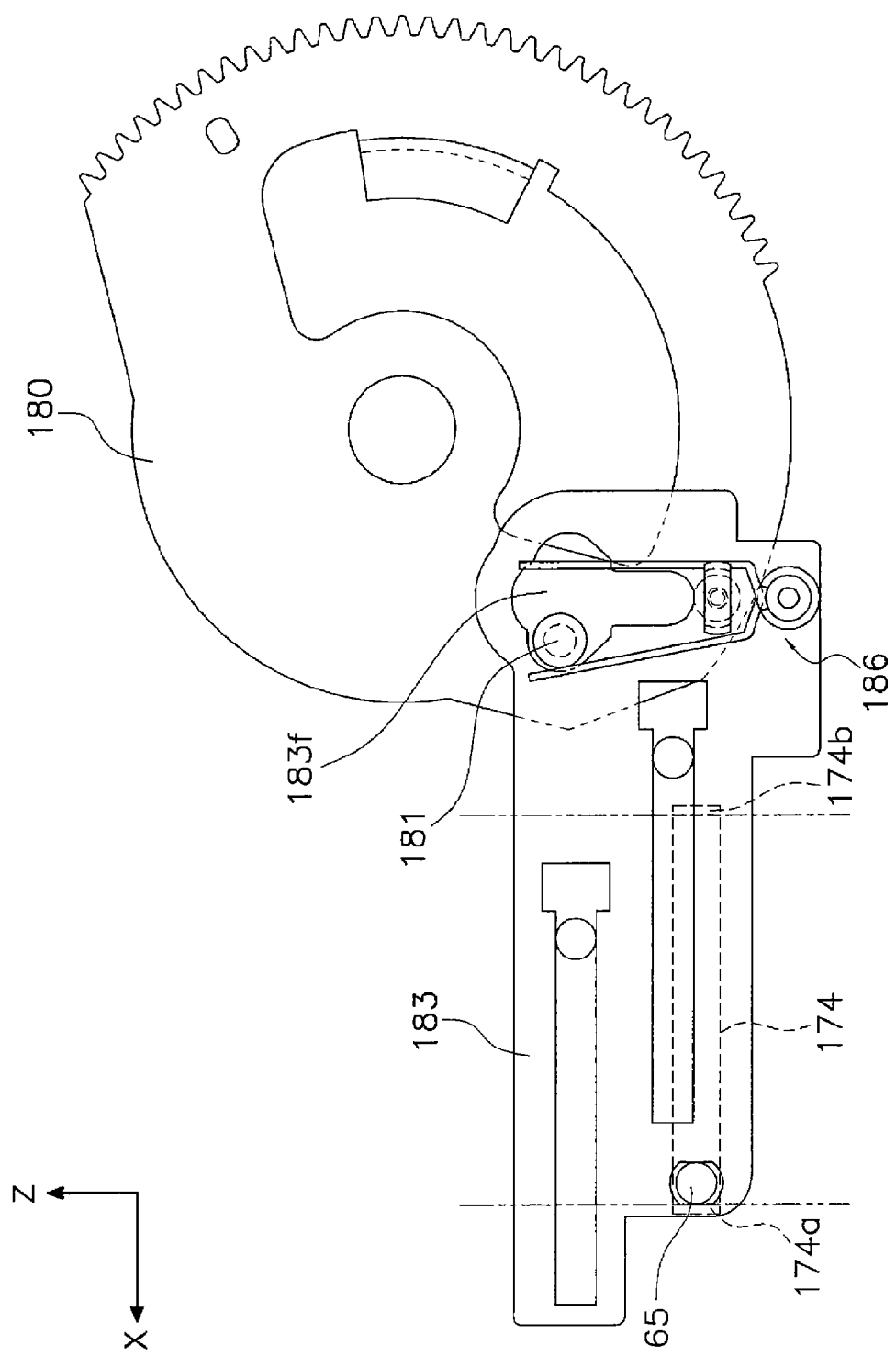
FIG. 18 is an illustration for describing the operation of the third group movement mechanism (wide angle end)
Figure 19:
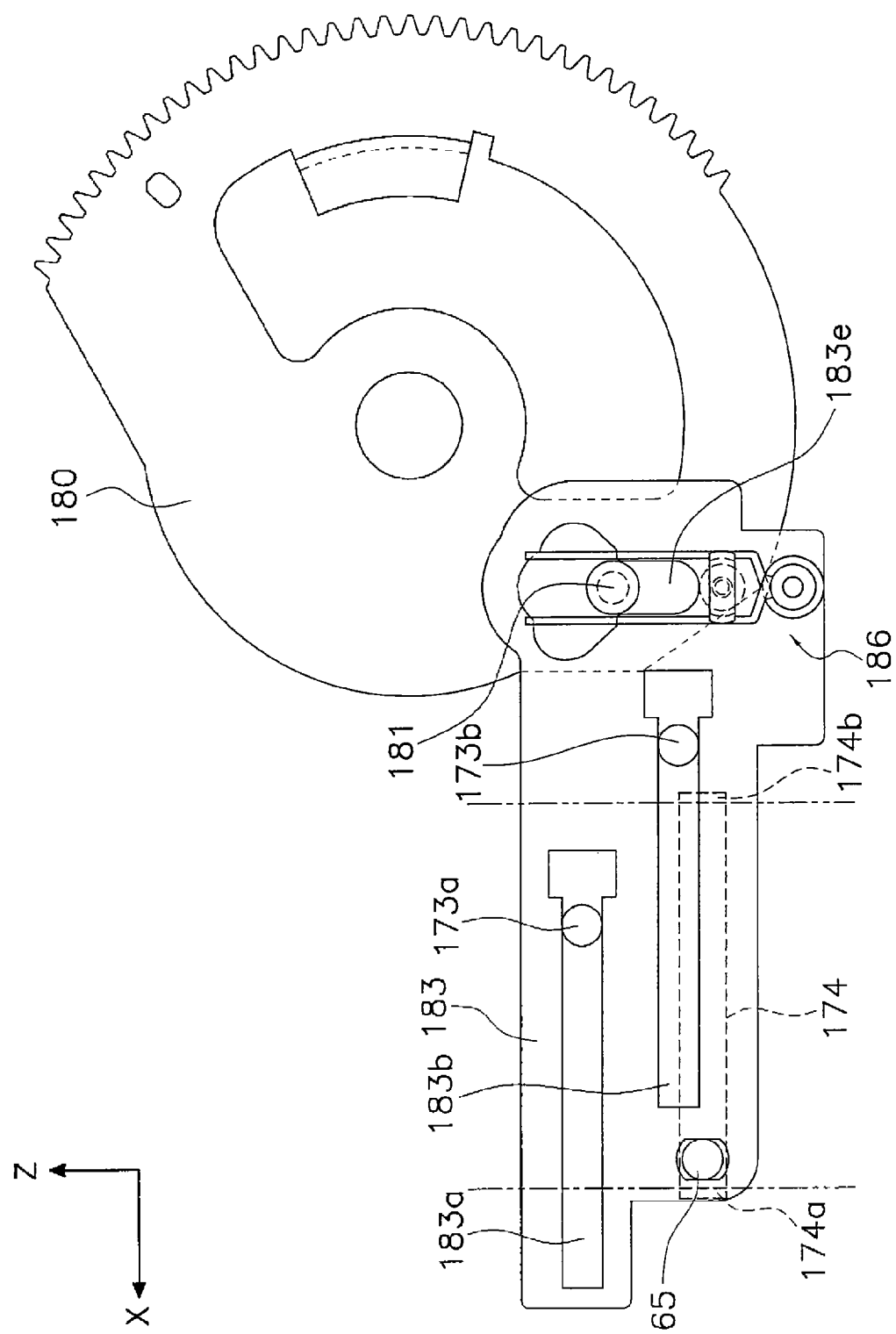
FIG. 19 is an illustration for describing the operation of the third group movement mechanism (wide angle side)
Figure 20:
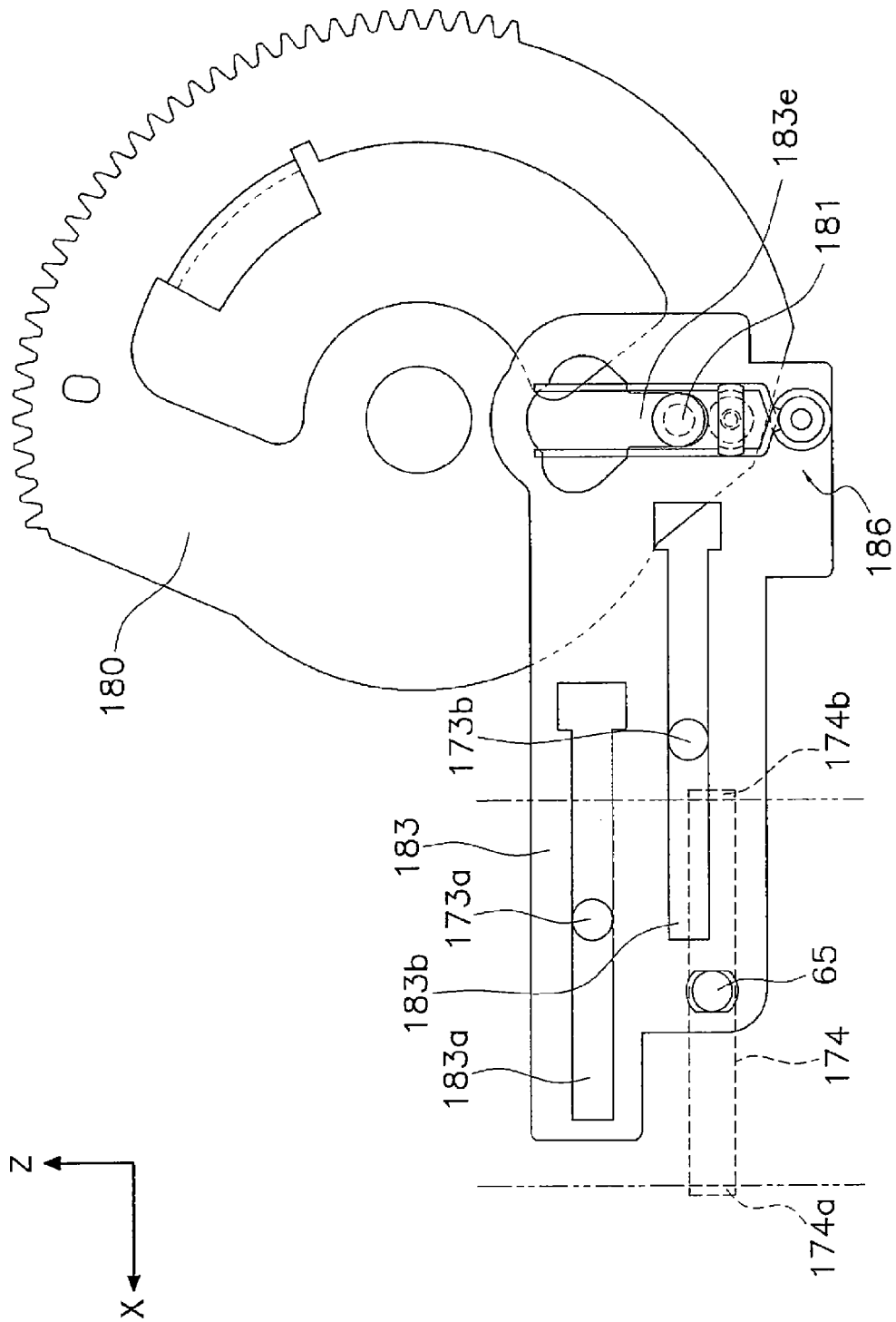
FIG. 20 is an illustration for describing the operation of the third group movement mechanism (normal position)
Figure 21:
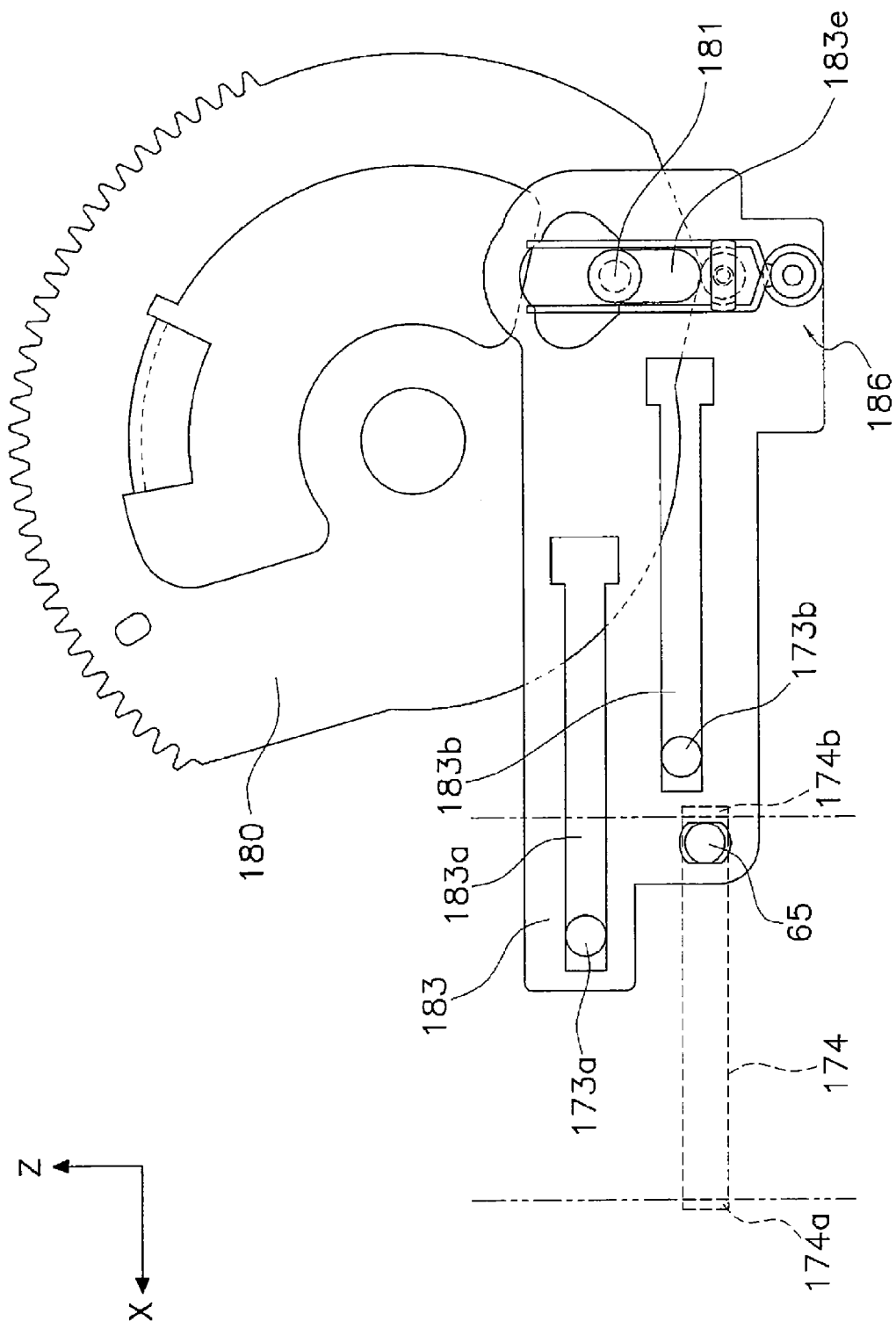
FIG. 21 is an illustration for describing the operation of the third group movement mechanism (telephoto side)
Figure 22:
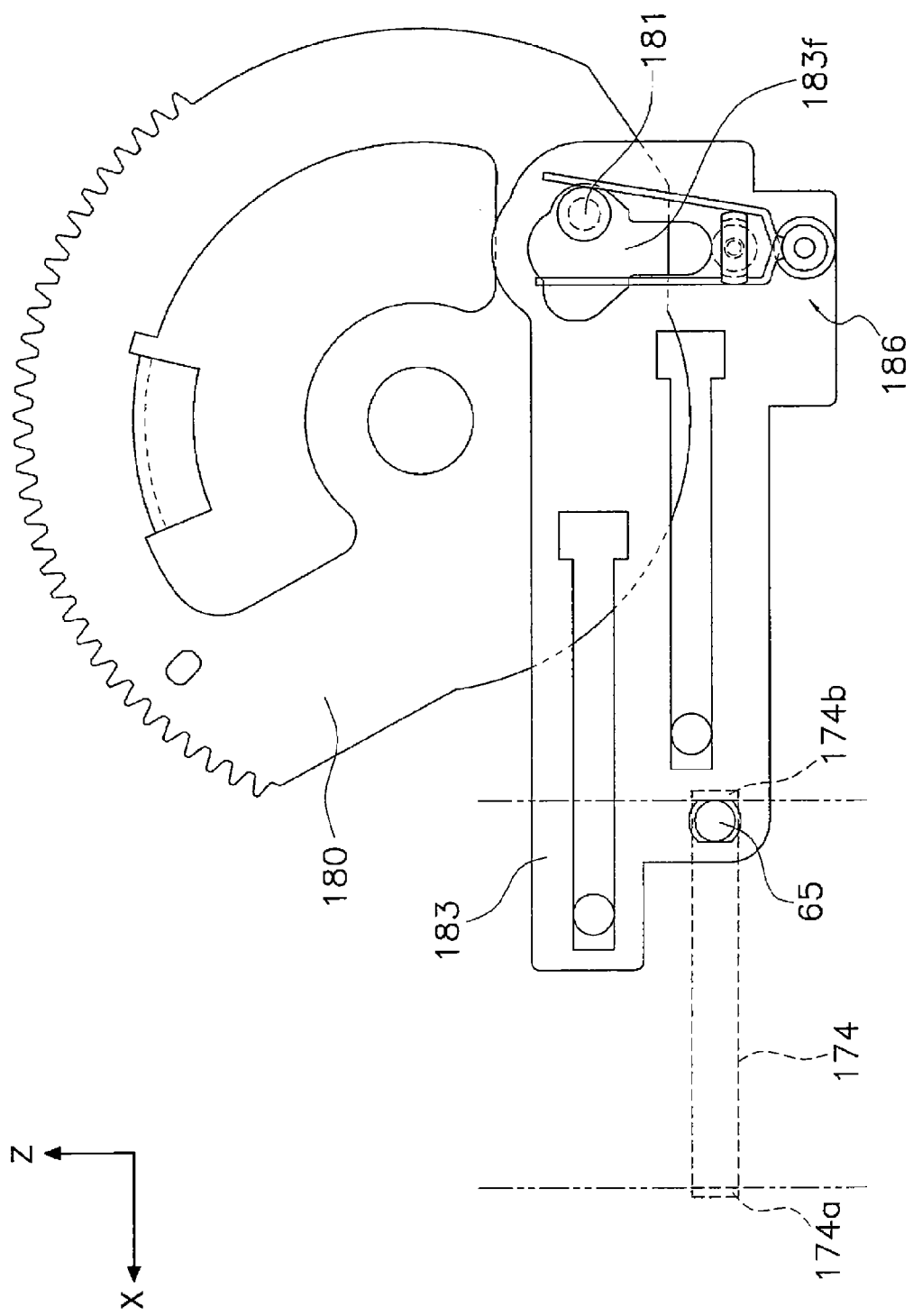
FIG. 22 is an illustration for describing the operation of the third group movement mechanism (telephoto end)

FIG. 18 shows rotational angle of the ring gear 180 when the optical system 35 is located at the wide angle end, and the operation of the elastic coupling mechanism and the operation of the rod 183 according to it. FIGS. 19 to 21 show the rotational angle of the ring gear 180 when the optical system 35 moves from the wide angle end to the telephoto end, and the operation of the elastic coupling mechanism and the operation of the rod 183 according to the rotational angle. In particular, FIG. 20 shows the rotational angle of the ring gear 180 when the optical system 35 is located in a normal position which is the middle position between the wide angle end and the telephoto end, and the operation of the elastic coupling mechanism and the operation of the rod 183 according to the rotational angle. FIG. 22 shows the rotational angle of the ring gear 180 when the optical system is located in the telephoto end, and the operation of the elastic coupling mechanism and the operation of the rod 183 according to the rotational angle.

In FIG. 18, the ring gear 180 is located at the end portion in the clockwise direction when viewed from the Y axis direction positive side. In this case, the ring gear pin 181 fixed to the ring gear 180 is located at the end portion on the positive side within the movable range to the X axis direction, and is engaged to the X axis direction positive side of the second engagement opening 183f of the rod 183. As described with reference to FIG. 17, when the ring gear pin 181 is located on the X axis direction positive side of the second engagement opening 183f, the crimp spring 186 presses the rod 183 to the X axis direction positive side. On the other hand, the protrusion portion 65 of the third group frame unit 44 inserted into the rod 183 and engaging with the restricting portion 174 of the base 55 is in contact with the end portion 174a on the X axis direction positive side of the restricting portion 174, and the movement to the X axis direction positive side is restricted. Consequently, when the optical system 35 is located at the wide angle end, movement of the rod 183 to the X axis direction positive side is restricted and the rod 183 is reliably fixed by the pressing to the X axis direction positive side.

Furthermore, in this embodiment, the state where the optical system 35 is located at the wide angle end is the same as the arrangement state (retracting state) of the optical system 35 when not using the imaging device 2. For this reason, when not using the imaging device 2, it is possible to reliably fix the rod 183.

In FIGS. 19 to 21, the ring gear 180 is driven to rotate in the counterclockwise direction from the end portion in the clockwise direction when viewed from the Y axis direction positive side. FIG. 19 shows the case which the ring gear 180 is located near the end portion in the clockwise direction when viewed from the Y axis direction positive side. FIG. 20 shows the case which the ring gear 180 is located in the center position in the movable range. FIG. 21 shows the case which the ring gear 180 is located near the end portion in the counterclockwise direction when viewed from the Y axis direction positive side.

In this case, the ring gear pin 181 fixed to the ring gear 180 engages with the first engagement opening 183e of the rod 183 and moves to the X axis direction negative side. As described with reference to FIG. 17, when the ring gear pin 181 is located at the first engagement opening 183e, the crimping force of the crimp spring 186 does not act on the ring gear pin 181. In this case, the ring gear 180 rotates in the counterclockwise direction while the ring gear pin 181 engages with the first engagement opening 183e of the rod 183, and as a result, the rod 183 is driven toward the X axis direction negative side. Since the rod 183 is driven while the guide grooves 183a and 183b engage with the guide pins 173a and 173b formed on the base 55, the rod 183 is in translational movement toward the X axis direction negative side. The protrusion portion 65 of the third group frame unit 44 fits in the rod 183. Therefore, the third group frame unit 44 moves toward the X axis direction negative side according to the movement of the rod 183.

In FIG. 22, the ring gear 180 is located on the end portion in the counterclockwise direction when viewed from the Y axis direction positive side. In this case, the ring gear pin 181 fixed to the ring gear 180 is located on the end portion on the negative side within the movable range to the X axis direction, and engages with the X axis direction negative side of the second engagement opening 183f of the rod 183. As described with reference to FIG. 17, when the ring gear pin 181 is located on the X axis direction negative side of the second engagement opening 183f, the crimp spring 186 presses the rod 183 to the X axis direction negative side. On the other hand, the protrusion portion 65 of the third group frame unit 44 inserted into the rod 183 and engages with the restricting portion 174 of the base 55 is in contact with the end portion 174b of the restricting portion 174 on the X axis direction negative side, and the movement thereof to the X axis direction negative side is restricted. Consequently, when the optical system 35 is located at the telephoto end, the movement of the rod 183 to the X axis direction negative side is restricted, and the rod 183 is reliably fixed to the X axis direction negative side by pressing.

4.4: Third Group Frame Unit

The detailed constitution of the third group frame unit 44 will be described through reference to FIG. 23.

Figure 23:
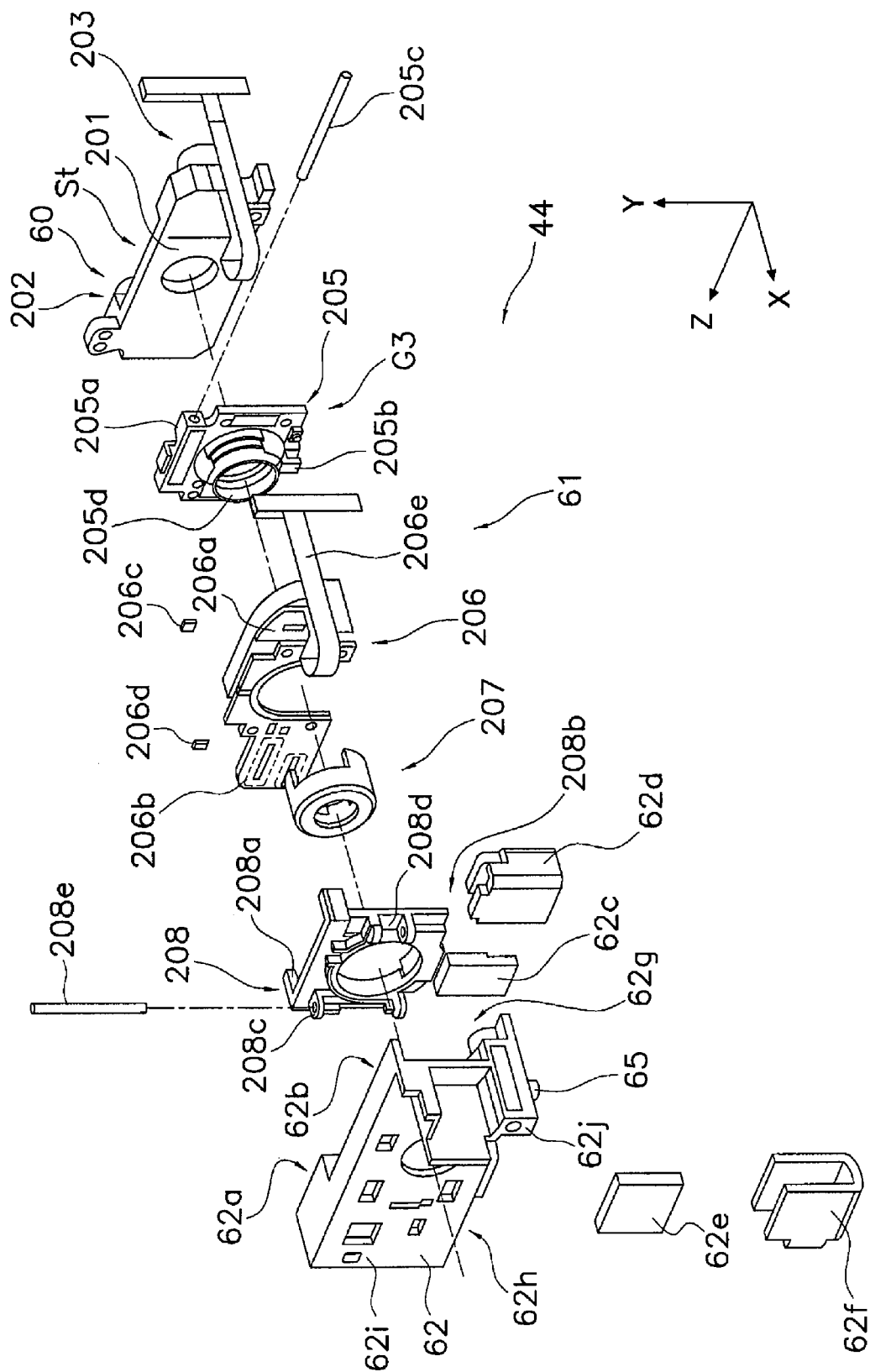
FIG. 23 is an exploded perspective view of the third group frame unit.

FIG. 23 is an exploded perspective view of the third group frame unit 44. The third group frame unit 44 is mainly constituted by a shutter unit 60 that is provided on the second optical axis A2 and is equipped with an exposure adjustment member St that performs shutter and diaphragm operation; the third lens group G3; an image blur correcting mechanism 61 that supports the third lens group G3 movably in the Y axis direction and the Z axis direction; and a third group frame 62 that supports the shutter unit 60 and the image blur correcting mechanism 61.

The details of the third lens group G3 were described through reference to FIGS. 5 to 8, and will therefore not be described again here.

The shutter unit 60 is mainly constituted by a main body 201 that is provided on the second optical axis A2 and is equipped with the exposure adjustment member St, which is a diaphragm or shutter for controlling the amount of exposure and the exposure time of a CCD 37 (see FIG. 9); a protruding diaphragm actuator 202 that is provided on the Z axis direction positive side of the main body 201 toward the X axis direction negative side; and a protruding shutter actuator 203 that is provided on the Z axis direction negative side of the main body 201 toward the X axis direction negative side. The diaphragm actuator 202 and the shutter actuator 203 are provided apart from each other in the Z axis direction with the second optical axis A2 interposed therebetween. The shutter unit 60 is fixed to the third group frame 62 with the image blur correcting mechanism 61 (described below) interposed therebetween.

The image blur correcting mechanism 61 is mainly constituted by a pitching movement frame 205 that supports the third lens group G3 and is capable of movement in the Z axis direction (pitching direction) and the Y axis direction (yawing direction) with respect to the third group frame 62; an electrical substrate 206 that is attached on the X axis direction positive side of the pitching movement frame 205; a cap 207 that is attached on the pitching movement frame 205 from the X axis direction positive side of the electrical substrate 206; and a yawing movement frame 208 that supports the pitching movement frame 205 movably in the Z axis direction and is capable of movement in the Y axis direction with respect to the third group frame 62.

In the pitching movement frame 205, a cylindrical portion 205d that supports the third lens group G3 is formed in the middle part, a bearing 205a is provided on the Y axis direction positive side, and a rotation stop 205b is provided on the Y axis direction negative side. A pitch shaft 205c that is parallel to the Z axis direction is inserted in the bearing 205a. The two ends of the pitch shaft 205c are supported by a fixing portion 208a of the yawing movement frame 208 (described below). The rotation stop 205b engages movably in the Z axis direction with an engagement portion 208b of the yawing movement frame 208 (described below). As a result, the pitching movement frame 205 is capable of sliding in a direction along the pitch shaft 205c with respect to the yawing movement frame 208.

The electrical substrate 206 is provided with a coil 206a that drives the third lens group G3 in the Z axis direction, a coil 206b that drives in the Y axis direction, a Hall element 206c that senses the position of the third lens group G3 in the Z axis direction, and a Hall element 206d that senses the position in the Y axis direction. The coils 206a and 206b are configured integrally with the electrical substrate 206 as a laminated coil, for example. An FPC 206e is attached to the electrical substrate 206 and transfers signals between the coil 206a and 206b and the Hall elements 206c, between 206c and a main substrate 23 (see FIG. 3).

The cap 207 is attached on the X axis direction positive side of the third lens group G3, and suppresses the generation of flare, ghost, etc. The cap 207 is attached so as to cover the cylindrical portion 205d of the pitching movement frame 205, with the electrical substrate 206 interposed therebetween.

The yawing movement frame 208 is a member having an opening in its middle for inserting the cap 207 and the cylindrical portion 205d supporting the third lens group G3. The fixing portion 208a that supports the two ends of the cylindrical portion 205d is formed on the Y axis direction positive side, and the engagement portion 208b that engages with the rotation stop 205b of the pitching movement frame 205 is formed on the Y axis direction negative side. As a result, the yawing movement frame 208 supports the pitching movement frame 205 slidably in the Z axis direction. Also, on the face of the yawing movement frame 208 on the X axis direction positive side, a bearing 208c is formed on the Z axis direction positive side, and a rotation stop 208d is formed on the Z axis direction negative side. A yaw shaft 208e that is parallel to the Y axis direction is inserted in the bearing 208c. The two ends of the yaw shaft 208e are supported by a fixing portion 62a of the third group frame 62 (described below). The rotation stop 208d engages movably in the Y axis direction with an engagement portion 62b of the third group frame 62 (described below). As a result, the yawing movement frame 208 is capable of sliding in a direction along the yaw shaft 208e with respect to the third group frame 62.

The third group frame 62 is a member disposed on the X axis direction positive side with respect to the yawing movement frame 208. On the face on the X axis direction negative side, the fixing portion 62a that supports the ends of the yaw shaft 208e is formed on the Z axis direction positive side, and the engagement portion 62b that engages with the rotation stop 208d of the yawing movement frame 208 is formed on the Z axis direction negative side. As a result, the third group frame 62 supports the yawing movement frame 208 movably in the Y axis direction.

A yoke 62d is press-fitted and fixed to a fitting portion 62g on the Z axis direction negative side of the third group frame 62. The yoke 62d is a member with an open box-shaped cross section perpendicular to the Y axis, and on the inside is fixed a magnet 62c that has undergone dipole magnetization in the Z axis direction. The yoke 62d is fixed so that the coil 206a of the electrical substrate 206 and the magnet 62c are opposite to each other in the X axis direction. As a result, a pitching direction electromagnetic actuator is constituted. Also, a yoke 62f is press-fitted and fixed to a fitting portion 62h on the Y axis direction negative side of the third group frame 62. The yoke 62f is a member with an open box-shaped cross section perpendicular to the Z axis, and on the inside is fixed a magnet 62e that has undergone tripole magnetization in the Y axis direction. The yoke 62f is fixed so that the coil 206b of the electrical substrate 206 and the magnet 62e are opposite to each other in the X axis direction. As a result, a yawing direction electromagnetic actuator is constituted.

Figure 24:
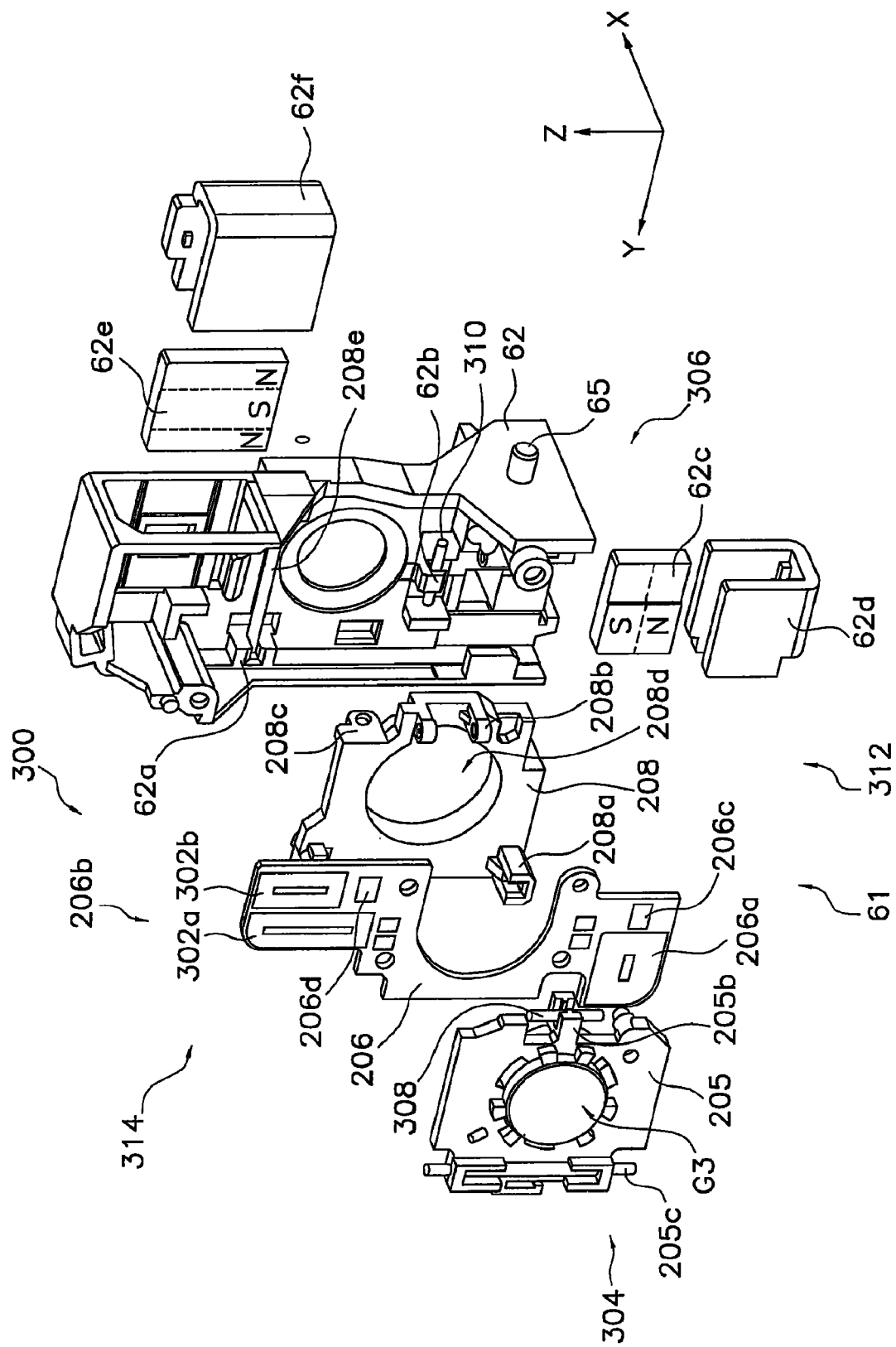
FIG. 24 is an exploded perspective view of an image blur correcting device.

An image blur correcting device 300 constituted by the third group frame 62 and the image blur correcting mechanism 61 will now be described in further detail through reference to FIG. 24. FIG. 24 is an exploded perspective view that the structure other than the shutter unit 60 of the third group frame unit 44 in FIG. 23 is viewed from a different direction.

The image blur correcting device 300 shown in FIG. 24 is mainly constituted by the pitching movement frame 205, the electrical substrate 206 fixed to the pitching movement frame 205, the yawing movement frame 208 that supports the pitching movement frame 205 movably in the Z axis direction, the third group frame 62 that supports the yawing movement frame 208 movably in the Y axis direction, a pitching direction electromagnetic actuator 312, and a yawing direction electromagnetic actuator 314.

The yawing direction electromagnetic actuator 314 is provided at a position opposite in the Z axis direction (the pitching direction), with the second optical axis A2 that passes through the third lens group G3 with respect to the pitching direction electromagnetic actuator 312 interposed therebetween.

The pitching movement frame 205 and the yawing movement frame 208 are linked via a pitching guide mechanism 304 that guides in the pitching direction. The yawing movement frame 208 and the third group frame 62 are linked via a yawing guide mechanism 306 that guides in the yawing direction.

The pitching guide mechanism 304 is mainly constituted by the bearing 205a and rotation stop 205b formed in the pitching movement frame 205, and the fixing portion 208a and engagement portion 208b formed in the yawing movement frame 208. The fixing portion 208a fixes the cylindrical portion 205d that is slidably inserted in the bearing 205a. The engagement portion 208b fixes an engagement shaft 308 that slidably engages with the rotation stop 205b.

The yawing guide mechanism 306 is mainly constituted by the bearing 208c and rotation stop 208d formed in the yawing movement frame 208, and the fixing portion 62a and engagement portion 62b formed in the third group frame 62. The third group frame 62 fixes the yaw shaft 208e slidably inserted in the bearing 208c. The engagement portion 62b fixes an engagement shaft 310 that slidably engages with the rotation stop 208d.

The pitching direction electromagnetic actuator 312, as described above, is constituted by the yoke 62d fixed to the third group frame 62, the magnet 62c fixed to the yoke 62d, and the coil 206a formed on the electrical substrate 206. The magnet 62c has undergone dipole magnetization in the Z axis direction so that the poles will be opposite the long sides of the coil 206a extending in the Y axis direction. The Hall element 206c for detecting the magnetic flux of the magnet 62c and detecting the Z axis direction position of the third lens group G3 is disposed on the Y axis direction negative side of the coil 206a.

The yawing direction electromagnetic actuator 314, as described above, is constituted by the yoke 62f fixed to the third group frame 62, the magnet 62e fixed to the yoke 62f, and the coil 206b formed on the electrical substrate 206. The coil 206b is constituted by two coils (a first coil 302a and a second coil 302b) that are aligned in the Y axis direction. The magnet 62e has undergone tripole magnetization in the Y axis direction so that the poles will be opposite to the long sides of the first coil 302a and the second coil 302b extending in the Z axis direction. That is, the magnet 62e has undergone tripole magnetization in the order of N pole, S pole, N pole (or S pole, N pole, S pole) in the Y axis direction, and the S pole (or N pole) in the middle is opposite to the long side of the first coil 302a on the Y axis direction negative side and the second coil 302b on the Y axis direction positive side.

The first coil 302a and second coil 302b have different lengths in the Z axis direction, and the length of the first coil 302a is formed longer than that of the second coil 302b in the Z axis direction. The ends of the first coil 302a and second coil 302b on the Z axis direction positive side are disposed at substantially the same positions in the Z axis direction. As a result, a region in which the coil 206b is not formed is present on the Z axis direction negative side of the shorter second coil 302b and on the Y axis direction negative side of the longer first coil 302a. In this region is disposed the Hall element 206d for detecting the magnetic flux of magnet 62e and sensing the position of the third lens group G3 in the Y axis direction.

With the above constitution, when current flows to the coil 206a of the electrical substrate 206, the magnet 62c and the yoke 62d generate an electromagnetic force along the pitching direction (Z axis direction). Similarly, when current flows to the coil 206b of the electrical substrate 206, the magnet 62e and the yoke 62f generate an electromagnetic force along the yawing direction (Y axis direction).

Two angular velocity sensors (not shown) for detecting blur in two independent directions are disposed in the digital camera 1. The control circuit of the main substrate 23 (see FIG. 3) acquires a detection signal from the angular velocity sensors, and controls the amount of power sent to the coils 206a and 206b according to the detection signal and drives the third lens group G3. Also, the control circuit further acquires a detection signal from the Hall elements 206c and 206d, and controls the position of the third lens group G3.

As above, with the image blur correcting mechanism 61, image blur correction can be performed by driving the third lens group G3 in two directions (the Y axis direction and Z axis direction) perpendicular to the second optical axis A2.

A protrusion portion 65 that protrudes to the Y axis direction negative side is formed on the Y axis direction negative side of the third group frame 62 (see FIG. 23). The protrusion portion 65 engages with a through-hole 183c of a rod 183 (see FIG. 14). As a result, the third group frame 62 receives drive from a rod unit 182 in the X axis direction.

In the third group frame 62, a fitting portion 62h and a fitting portion 62j are formed at the corner on the Y axis direction positive side and the Z axis direction positive side and at the corner on the Y axis direction negative side and the Z axis direction negative side, respectively. A third group guide pole 71 extending in the X axis direction from a master flange unit 46 (see FIG. 9) is inserted in the fitting portion 62h. A third group guide pole 70 extending in the X axis direction from the master flange unit 46 (see FIG. 9) is inserted in the fitting portion 62j. This makes it possible for the third group frame 62 to move in the X axis direction along the third group guide poles 70 and 71.

Furthermore, as described above, the image blur correcting mechanism 61 is fixed to the third group frame 62, and furthermore the shutter unit 60 is attached from the X axis direction negative side.

As a result of the above, the third group frame unit 44 as an integrated unit receives drive from the rod unit 182 in the X axis direction, is guided in the X axis direction by the third group guide poles 70 and 71, and moves in the X axis direction, that is, in a direction along the second optical axis A2.

Figure 25:
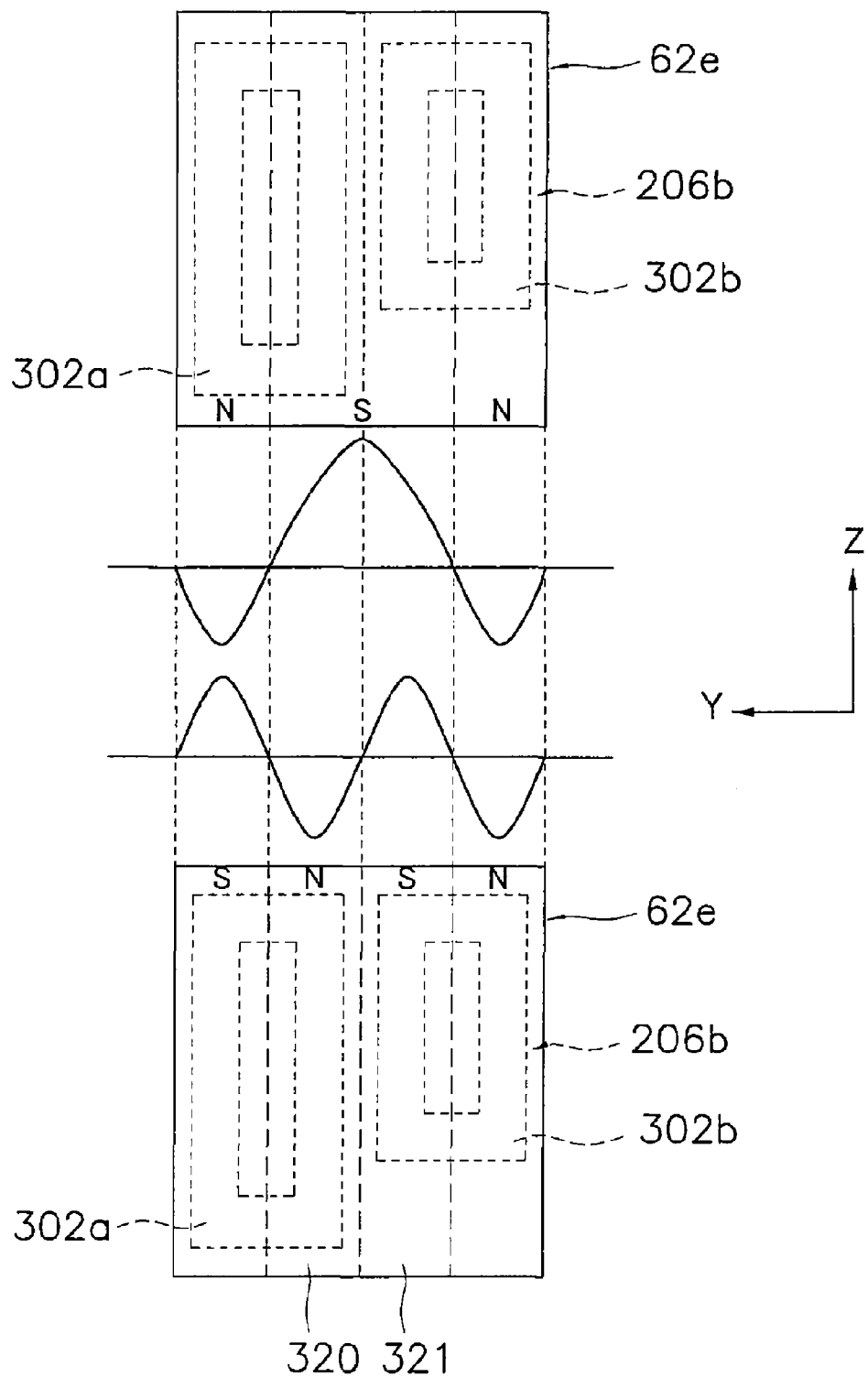
FIG. 25 is a diagram illustrating the relationship between the magnetization direction and the strength of the magnetic flux.

The magnet 62e was described as having undergone tripole magnetization in the Y axis direction, but may instead undergo quadrupole (or more) magnetization so that the poles are opposite the long side extending in the Z axis direction of the coil 206b. Tripole magnetization, however, is preferable. This will be described further through reference to FIG. 25. FIG. 25 is a diagram illustrating the strength of the magnetic flux (magnetic flux density) traversing the coil 206b when the magnet 62e has undergone tripole magnetization and quadrupole magnetization.

As shown in FIG. 25, when the magnet 62e has undergone tripole magnetization (that is, when it has been magnetized to an N pole, S pole, and N pole), the peak of the strength of the magnetic flux in the middle is higher than the peaks on both ends. In the case of quadrupole magnetization, on the other hand, the peaks of magnetic flux strength at the poles exhibit the same strength. The peak of magnetic flux strength in the middle in the case of tripole magnetization is higher than the peaks at the poles in the case of quadrupole magnetization. Accordingly, a greater electromagnetic force can be generated with tripole magnetization than with quadrupole magnetization.

Also, as shown in FIG. 25, in the case of quadrupole magnetization, the two poles of each end are disposed so as to be opposite to the first coil 302a or the second coil 302b. However, movement of the coil 206b in the Y axis direction may cause one of the first coil 302a or the second coil 302b to end up being opposite to a pole that was not originally intended to be opposite. More specifically, when the coil 206b moves to the Y axis direction positive side, the second coil 302b on the Y axis direction negative side may end up being opposite to the N pole 320 on the Y axis direction positive side, and when the coil 206b moves to the Y axis direction negative side, the first coil 302a on the Y axis direction positive side may end up being opposite to the S pole 321 on the Y axis direction negative side. To prevent this, the first coil 302a and the second coil 302b must be kept as far apart as possible in the Y axis direction, and this increases the overall size of the coil 206b in the Y axis direction.

On the other hand, this problem is not encountered with tripole magnetization. It is therefore possible to reduce the overall size of the coil 206b in the Y axis direction.

The magnetizations shown in FIGS. 24 and 25 are examples, and the arrangement of the S and N poles may be switched around.

4.5: Fourth Group Frame Unit

The detailed configuration of a fourth group frame unit 45 will be described through reference to FIG. 26.

Figure 26:
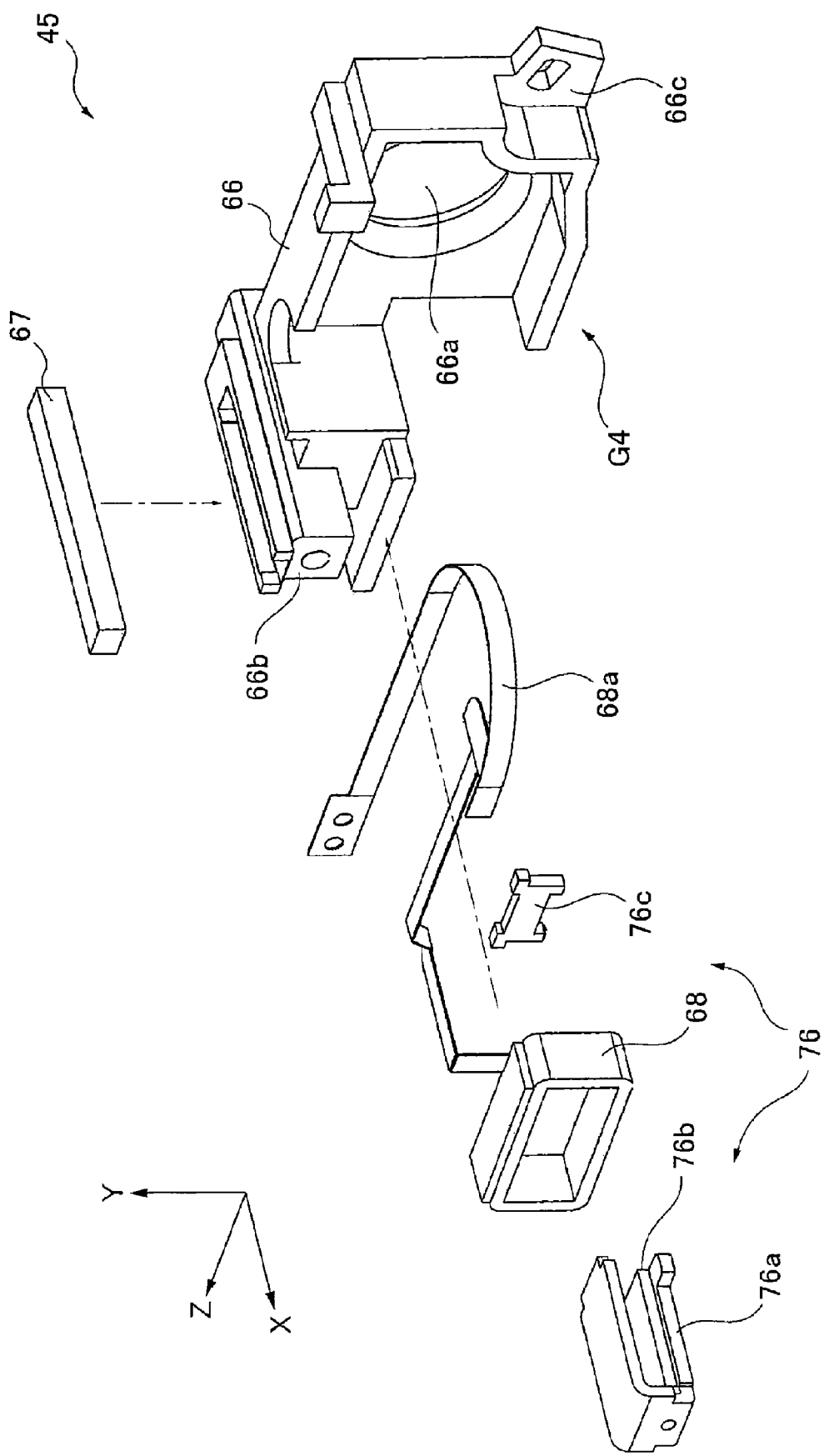
FIG. 26 is an exploded perspective view of a fourth group frame unit.

FIG. 26 is an exploded perspective view of the fourth group frame unit 45. The fourth group frame unit 45 supports a fourth lens group G4, performs focusing by moving along the second optical axis A2, and corrects deviation in the focusing state that occurs when there is a change in the imaging magnification caused by movement of a first lens group G1 and a third lens group G3.

The fourth group frame unit 45 is mainly constituted by the fourth lens group G4, a fourth group frame 66 that supports the fourth lens group G4, and a sensor magnet 67 and coil 68 that are fixed to the fourth group frame 66.

The details of the fourth lens group G4 were described through reference to FIGS. 5 to 8, and will therefore not be described again here.

The fourth group frame 66 has an opening 66a that supports the fourth lens group G4. The fourth lens group G4 is fixed in the opening 66a by bonding or crimping.

In the fourth group frame 66, a bearing portion 66b and a bearing portion 66c are formed at the corner on the Y axis direction positive side and the Z axis direction positive side and at the corner on the Y axis direction negative side and the Z axis direction negative side, respectively. The bearing portion 66b is a long cylindrical bearing in the X axis direction, and a fourth group guide pole 73 extending from the master flange unit 46 (see FIG. 9) along the X axis direction is inserted in the bearing portion 66b. A fourth group guide pole 72 extending from the master flange unit 46 (see FIG. 9) along the X axis direction is inserted in the bearing portion 66c. This allows the fourth group frame 66 to move in the X axis direction along the fourth group guide poles 73 and 72.

The sensor magnet 67 is fixed to the fourth group frame 66 so as to allow the lengthwise direction be positioned along the cylindrical bearing portion 66b. The sensor magnet 67 has undergone multi-pole magnetization in the X axis direction. The sensor magnet 67 is disposed opposite to an MR sensor 77 (see FIG. 9) of the master flange unit 46 and opposite to the Y axis direction. As a result, when the sensor magnet 67 moves along with the fourth group frame 66 in the X axis direction, the MR sensor 77 detects a change in the surrounding magnetic field. As a result, the position of the fourth group frame unit 45 is detected.

Also, the coil 68 is adhesively fixed on the X axis direction positive side of the fourth group frame 66. An FPC 68a is connected to the coil 68. The FPC 68a is electrically connected to the coil 68 and the main substrate 23 (see FIG. 3).

Part of a main yoke 76a, whose cross section perpendicular to the Z axis is an open box shape and which is fixed to the master flange unit 46 (described below), passes through the coil 68. A magnet 76b is fixed to the other part of the main yoke 76a. The open end of the main yoke 76a on the X axis direction negative side is blocked off by a side yoke 76c in a state of passing through the coil 68. A voice coil type linear motor is constituted by the coil 68 and a magnetic member 76 made up by the above-mentioned main yoke 76a, magnet 76b, and side yoke 76c. As a result, when current flows to the coil 68, a drive force in the X axis direction is generated in the coil 68, and the coil 68 and the fourth group frame unit 45 that fixes the coil 68 are driven in the X axis direction.

As a result of the above, the fourth group frame unit 45 receives the drive in the X axis direction by the voice coil type linear motor, is guided in the X axis direction by the fourth group guide poles 73 and 72, and moves in the X axis direction, that is, in a direction along the second optical axis A2.

The various components of this voice coil type linear motor are disposed shifted to the Z axis direction positive side with respect to the fourth lens group G4. Therefore, the various components of the linear motor end up being arranged opposite to the yawing direction electromagnetic actuator 314 (see FIG. 24) and the X axis direction (the direction along the second optical axis A2). Accordingly, it is possible to prevent the size of the linear motor in the Z axis direction from being a restriction on the size of the imaging device 2 in the Z axis direction. Specifically, since the size of the yawing direction electromagnetic actuator 314 in the Z axis direction is larger than that of the pitching direction electromagnetic actuator 312, if the linear motor is disposed on the Z axis direction positive side with respect to the fourth lens group G4, the linear motor can be prevented from protruding from the Z axis direction positive side beyond the yawing direction electromagnetic actuator 314.

The case described here was one of driving the fourth group frame unit 45 by a linear motor, but the fourth group frame unit 45 may be driven by another motor instead, such as a stepping motor.

4.6: Master Flange Unit

The detailed constitution of the master flange unit 46 will be described through reference to FIG. 27.

Figure 27:
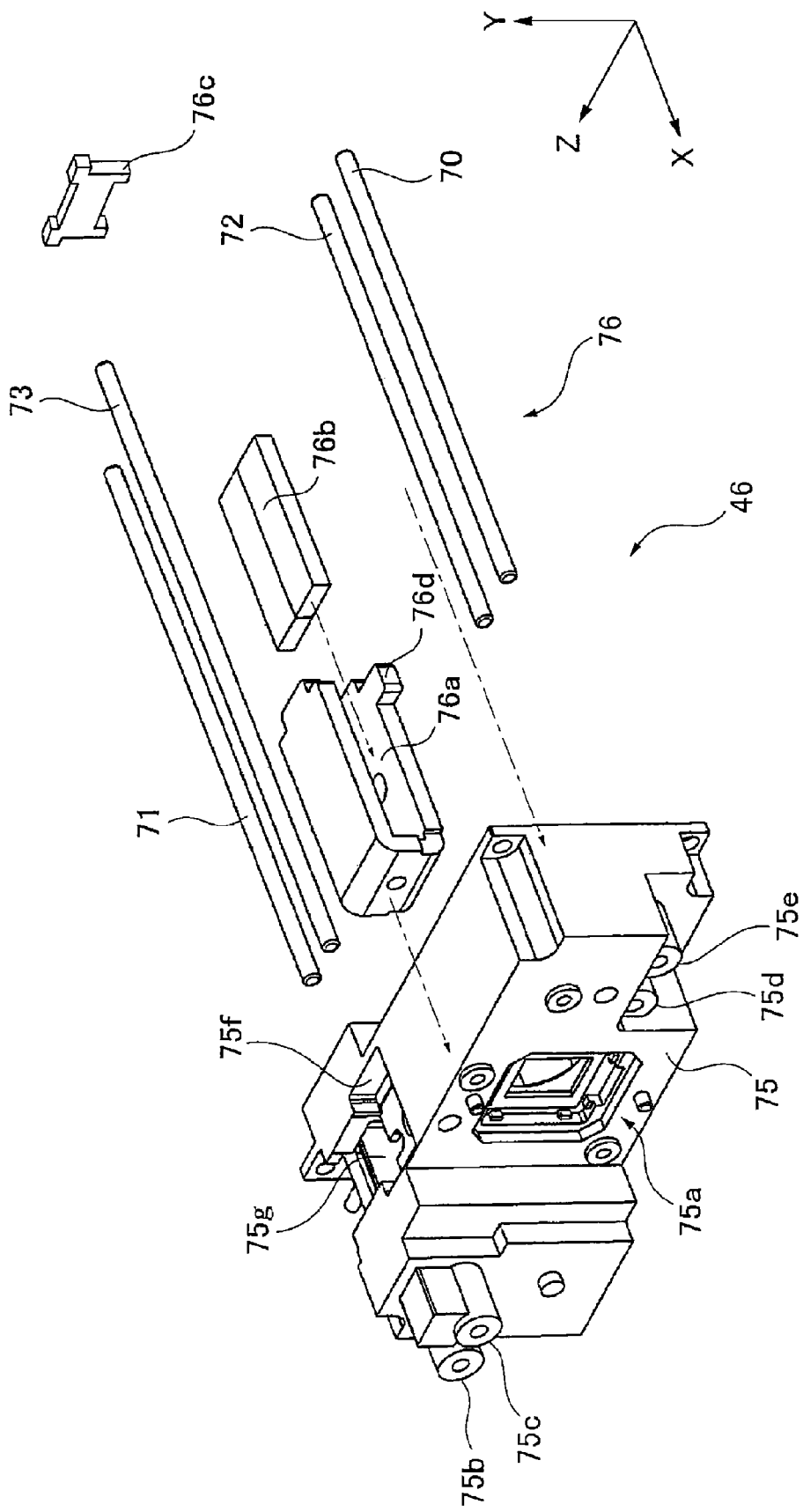
FIG. 27 is an exploded perspective view of a master flange unit.

FIG. 27 is an exploded perspective view of the master flange unit 46. The master flange unit 46 is a member that constitutes the housing of a lens barrel 31 along with a base unit 43, and is fixed by screws or the like in the X axis direction of a base 55.

The magnetic member 76, which constitutes a magnet circuit along with the coil 68 of the fourth group frame unit 45, is fixed to the master flange unit 46. Specifically, the magnetic member 76 is fixed by press-fitting, a press-fitting protrusion 76d of the main yoke 76a constituting the magnetic member 76 into a fitting portion (not shown) of the master flange unit 46. The magnet 76b is fixed by adhesive bonding or the like to the inner face on the Y axis direction negative side of the main yoke 76a. The coil 68 of the fourth group frame unit 45 passes through the main yoke 76a, and the side yoke 76c is fixed to the open end of the main yoke 76a on the X axis direction negative side in a state in which the coil 68 passes through.

A fitting portion 75f for attaching the MR sensor 77 (see FIG. 9) is formed on the face of the master flange unit 46 on the Y axis direction positive side. Part of the fitting portion 75f has a penetration portion 75g that passes through the inside of the master flange unit 46. The MR sensor 77 is fixed to this fitting portion 75f, and is opposite in the Y axis direction and the sensor magnet 67 (see FIG. 26) of the fourth group frame unit 45 located on the inside of the master flange unit 46, via the penetration portion 75g. An FPC (not shown) is connected to the MR sensor 77, and the MR sensor 77 is electrically connected to the main substrate 23 (see FIG. 3) via the FPC.

Cylindrical guide pole supports 75b and 75c that are adjacent in the Z axis direction are formed at the corner of the master flange unit 46 on the Y axis direction positive side and the Z axis direction positive side. The guide pole support 75b located on the Z axis direction positive side supports the end of the third group guide pole 71 on the X axis direction positive side. The guide pole support 75c located on the Z axis direction negative side supports the end of the fourth group guide pole 73 on the X axis direction positive side. Also, cylindrical guide pole supports 75d and 75e that are adjacent in the Z axis direction are formed at the corner of the master flange unit 46 on the Y axis direction negative side and the Z axis direction negative side. The guide pole support 75d located on the Z axis direction negative side supports the end of the fourth group guide pole 72 on the X axis direction positive side. The guide pole support 75e located on the Z axis direction negative side supports the end of the fourth group guide pole 70 on the X axis direction positive side. The ends of the guide poles 70 to 73 to the X axis direction negative side are fixed to the second group frame unit 42.

4.7: Operation of Lens Barrel

Figure 28A:
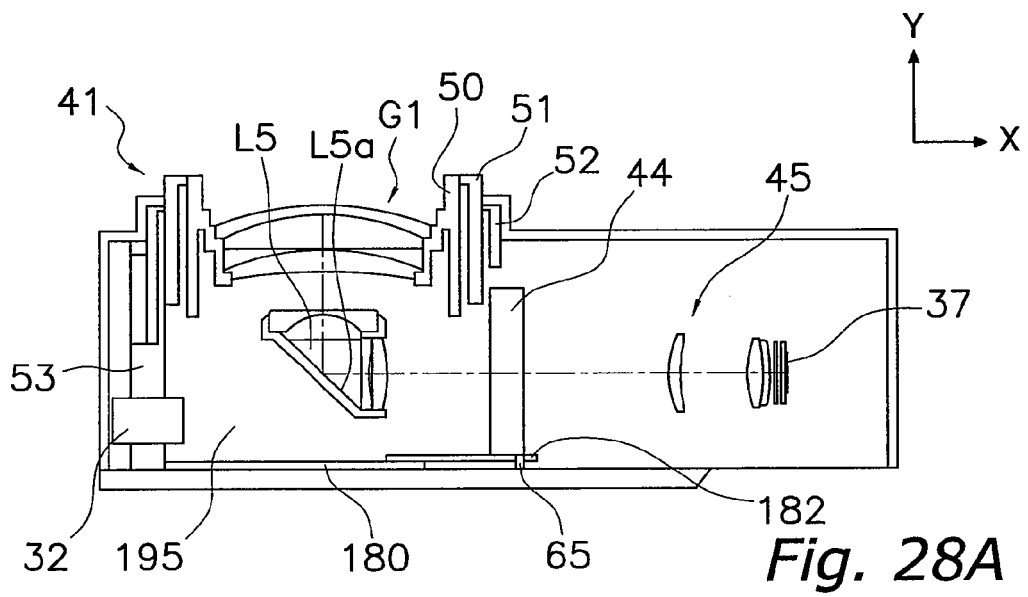
FIGS. 28A to 28C are diagrams illustrating the operation of a lens barrel.
Figure 28B:
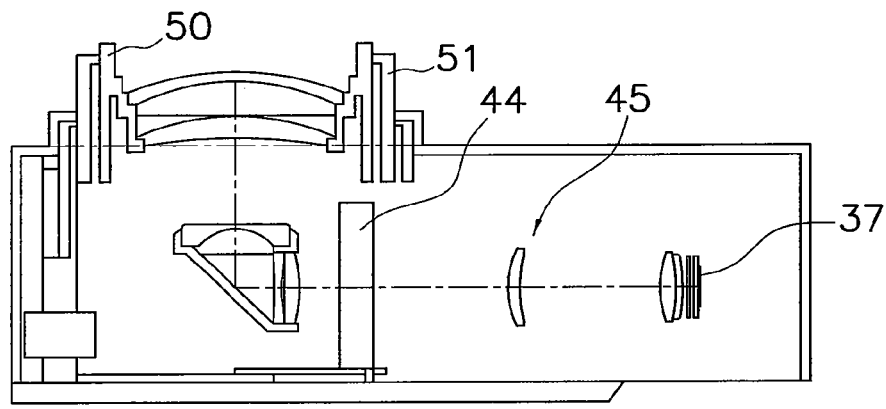
Figure 28C:
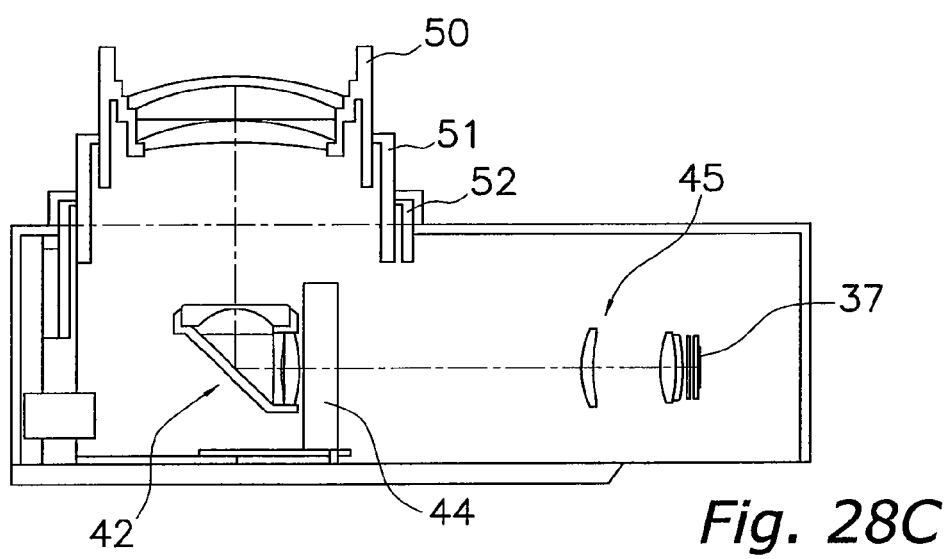

The operation of the various components of the lens barrel 31 will be described through reference to FIGS. 28A to 28C. FIGS. 28A to 28C are cross sections of the lens barrel 31 in a plane including the first optical axis A1 and the second optical axis A2. In FIGS. 28A to 28C, to facilitate description, members not located in the plane including the first optical axis A1 and the second optical axis A2 are also shown. Also, the main configuration necessary for this description is shown to facilitate description. FIG. 28A shows that when an optical system 35 is located on the wide angle side, FIG. 28B shows that when the optical system 35 is located at an intermediate position between the wide angle end and the telephoto end, and FIG. 28C shows that when the optical system 35 is located at the telephone end.

The operation of the various components will now be described for when the optical system 35 is zoomed from the wide angle side to the telephoto side.

First, when a motor unit 32 is operated, a driving gear 53 is driven. The driving gear 53 meshes with a driving frame 51 of a first group frame unit 41 and with a ring gear 180 of the base unit 43. The rotational drive of the driving gear 53 rotationally drives the driving frame 51 and the ring gear 180.

When the driving frame 51 is rotationally driven, the first group frame unit 41 constituted as above is operated, and the first lens group G1 supported thereby moves to the Y axis direction positive side.

When the ring gear 180 is rotationally driven, this drive is converted to translational motion to the X axis direction negative side of the rod unit 182. The protrusion portion 65 of the third group frame unit 44 engages with the rod unit 182.

Accordingly, the third group frame unit 44 moves translationally to the X axis direction negative side along with the rod unit 182.

As shown in FIG. 28A, when the optical system 35 is located on the wide angle side, part of the third group frame unit 44 is disposed opposite in the Y axis direction and part of the first group frame unit 41 on the X axis direction positive side. More specifically, part of the third group frame unit 44 is disposed opposite in the Y axis direction and part of a stationary frame 52 on the X axis direction positive side.

Also, as shown in FIG. 28B, when the optical system 35 moves to the telephoto side, a first group frame 50 and the driving frame 51 move to the Y axis direction positive side, and the third group frame unit 44 goes into from the X axis direction positive side to the space created by this movement.

Furthermore, as shown in FIG. 28C, when the optical system 35 is located at the telephoto end, the third group frame unit 44 moves to the location closest to the second group frame unit 42 within the movable range to the X axis direction.

Figure 29:
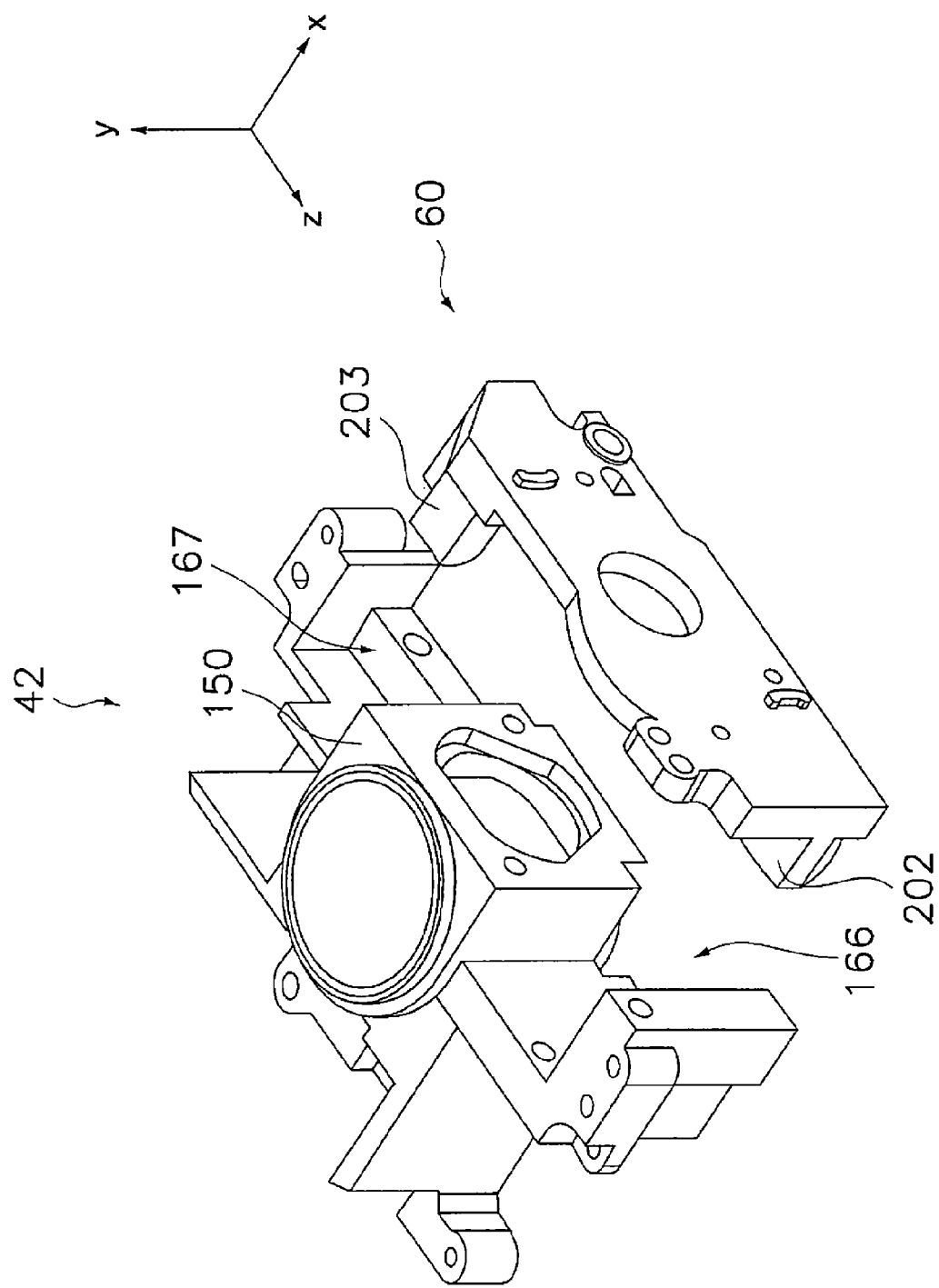
FIG. 29 is a diagram illustrating the relationship between the second group frame unit position and the third group frame unit position.
Figure 30:
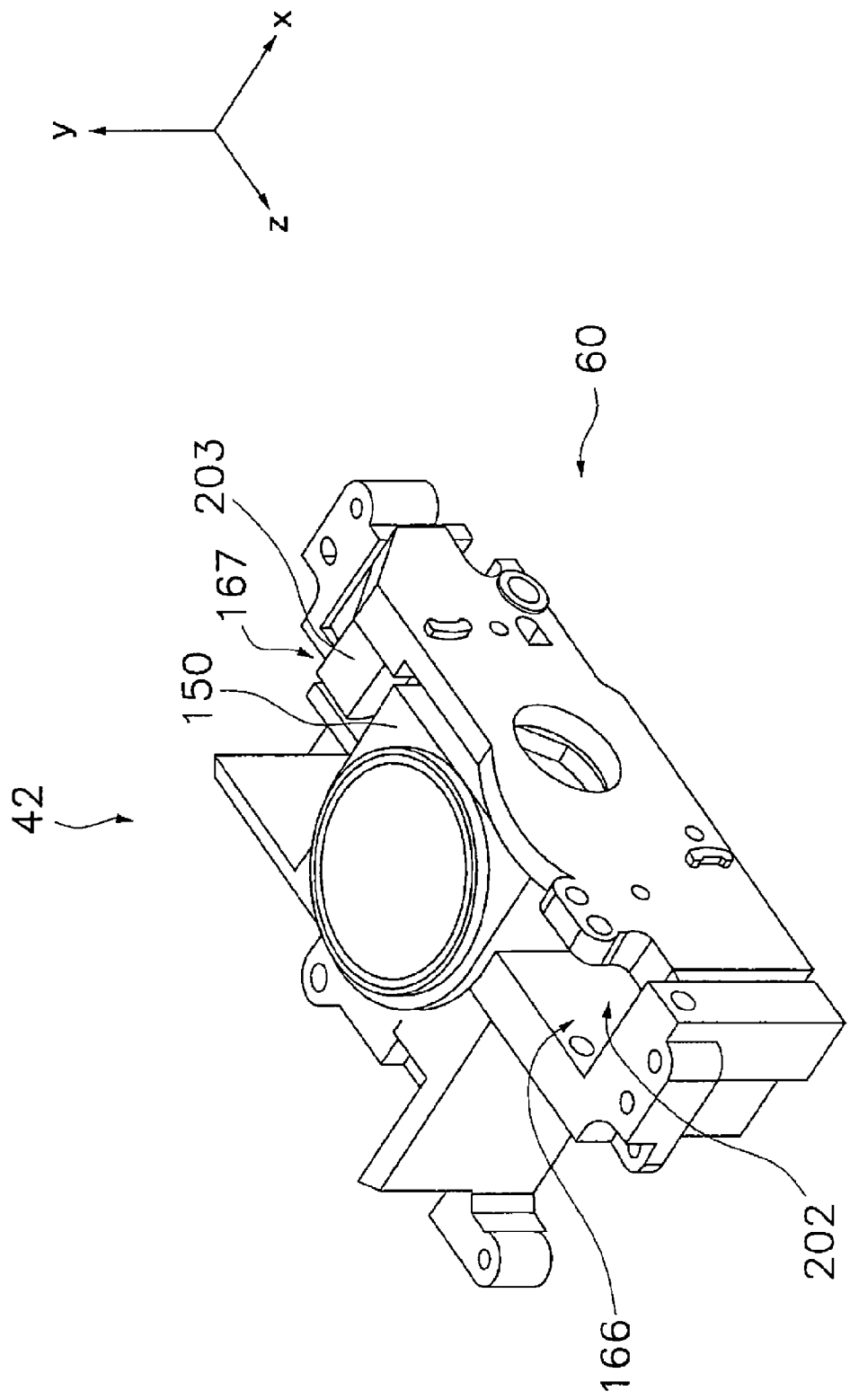
FIG. 30 is a diagram illustrating the relationship between the second group frame unit position and the third group frame unit position.
Figure 31:
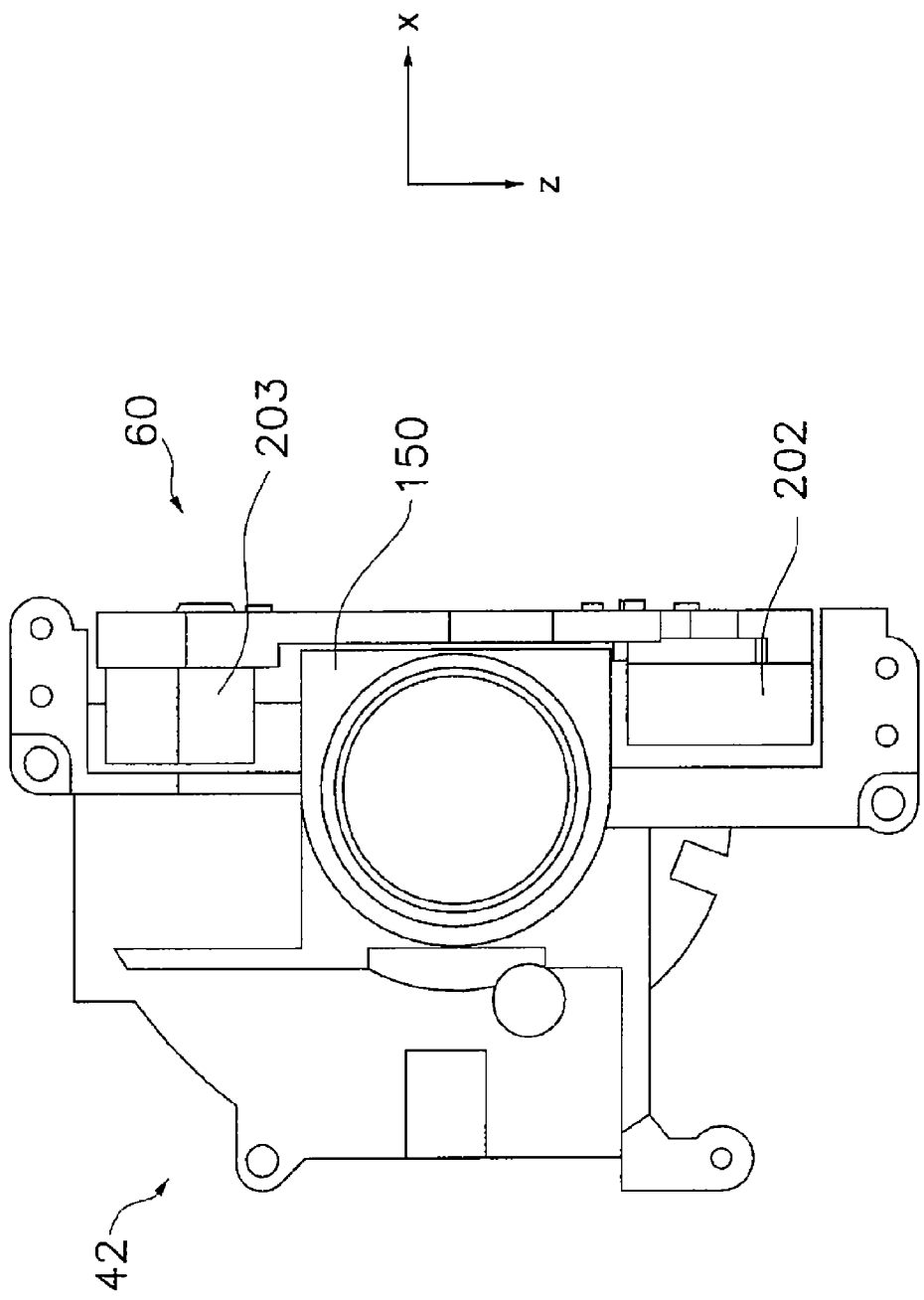
FIG. 31 is a diagram illustrating the relationship between the second group frame unit position and the third group frame unit position.

The positional relationship between the second group frame unit 42 and the third group frame unit 44 will now be described through reference to FIGS. 29 to 31. FIG. 29 is an perspective view of the positional relationship between the shutter unit 60 of the third group frame unit 44 and the second group frame unit 42 when the optical system 35 is located at the wide angle end. FIG. 30 is an perspective view of the positional relationship between the shutter unit 60 of the third group frame unit 44 and the second group frame unit 42 when the optical system is located at the telephoto end. FIG. 31 is a plan view from the Y axis direction positive side, illustrating the positional relationship between the shutter unit 60 of the third group frame unit 44 and the second group frame unit 42 when the optical system is located at the telephoto end.

As shown in FIG. 29, a concaved space 166 and a concaved space 167 are formed in the second group frame unit 42, toward the X axis direction positive side, that is, the third group frame unit 44 side. The concaved space 166 and concaved space 167 are formed at locations opposite in the X axis direction with respect to the diaphragm actuator 202 and the shutter actuator 203, respectively, which are provided protruding from the third group frame unit 44 to the X axis direction negative side. Accordingly, as shown in FIG. 30, when the optical system 35 moves to the telephoto side and the shutter unit 60 moves to the location closest to the second group frame unit 42 side, the diaphragm actuator 202 mates to the concaved space 166, and the shutter actuator 203 mates to the concaved space 167.

Also, as shown in FIG. 31, the diaphragm actuator 202 and the shutter actuator 203 are provided apart from each other in the Z axis direction, with the second optical axis A2 interposed therebetween, and this spacing is greater than the width of the second group frame 150 in the Z axis direction. Therefore, when the shutter unit 60 moves to the location closest to the second group frame unit 42 side, the second group frame 150 mates to the intermediate portion between the diaphragm actuator 202 and the shutter actuator 203 in the Z axis direction.

Since the second group frame unit 42 and the third group frame unit 44 are constituted as above, it is possible to increase the movable range of the third lens group G3 in the X axis direction. Specifically, it is possible to increase the maximum distance between the third lens group G3 and the CCD 37 in the X axis direction while forming the lens barrel 31 more compactly in the X axis direction.

As described above, the first group frame unit 41 and the third group frame unit 44 work together, so that the optical system 35 makes the imaging magnification to the CCD 37 be changed (see FIGS. 28A to 28C). The fourth group frame unit 45 corrects deviation in the focusing state that occurs when there is a change in this imaging magnification. Correction is performed by driving the fourth group frame unit 45 in the X axis direction by the voice coil type linear motor constituted by the magnetic member 76 of the master flange unit 46 and the coil 68 of the fourth group frame unit 45 (see FIG. 26).

As shown in FIGS. 28A to 28C, the motor unit 32 is disposed using a space 195 formed on the Y axis direction negative side of the first group frame unit 41, on the X axis direction negative side of the second group frame unit 42. As a result, no members constituting the optical system 35 are disposed, the space that does not affect the optical system 35 can be utilized effectively to dispose the members that constitute the imaging device 2, and space utilization efficiency can be improved.

5: Advantageous Effects 5.1

The imaging device 2 has the telescoping first group frame unit 41, which can be telescoped and deployed in stages in the first optical axis A1 direction. Furthermore, a bending optical system is employed as the optical system 35. Therefore, the optical path length from the first lens group G1 to the CCD 37 can be extended while the imaging device 2 can have a more compact configuration, so a high-magnification zoom lens system can be configured.

5.2

With the imaging device 2, the relative locations between the first lens group G1 and the third lens group G3 on the optical path are varied with respect to the CCD 37. Therefore, a zoom lens system with better optical performance can be configured.

5.3

The driving frame 51 is rotationally driven around the first optical axis A1 by a zoom motor 36, and therefore moves in a direction along the first optical axis A1 with respect to the second group frame unit equipped with a prism L5. Furthermore, the first group frame 50 is moved by the drive of the driving frame 51 in a direction along the first optical axis A1 with respect to the driving frame 51. With the imaging device 2, the drive force from the zoom motor 36 is transmitted through the driving frame 51 to the first group frame 50. Therefore, there is no need for a special motor to drive the first group frame 50, and the imaging device 2 can have a simpler configuration.

5.4

The stationary frame 52 of the first group frame unit 41 is fixed directly to the second group frame unit 42 that fixes the prism L5. The stationary frame 52 supports the first group frame 50 and the driving frame 51 movably in the direction of the first optical axis A1. Therefore, the positioning of the first lens group G1 with respect to the prism L5, particularly, positioning in a direction perpendicular to the first optical axis A1 can be carried out with higher precision.

5.5

With the imaging device 2, the driving frame 51 is disposed on the inner peripheral side of the stationary frame 52, and the first group frame 50 is disposed on the inner peripheral side of the driving frame 51. The driving frame 51 is capable of moving in the first optical axis A1 direction while engaging cam pins 111*a* to 111*c* with cam grooves 128*a* to 128*c* of the stationary frame 52. The first group frame 50 is capable of moving in the first optical axis A1 direction while engaging cam pins 104*a* to 104*c* with the cam grooves 128*a* to 128*c* of the driving frame 51, and engaging end portions 107*a* and 107b with straight-movement grooves 129a and 129b. In particular, the end portions 107a and 107b are moved straight ahead while engaged with the straight-movement grooves 129a and 129b, which prevents the first group frame 50 from rotating around the first optical axis A1. Therefore, with the imaging device 2, there is no need to provide a straight-movement frame for allowing the first group frame 50 to move straight ahead, so the imaging device 2 can have a simpler configuration.

5.6

With the stationary frame 52, extensions 126a and 126b are provided only on the X axis direction negative side of a cylindrical portion 125. Therefore, as described in FIGS. 28A to 28C, the third group frame unit 44 is able to move in the X axis direction without interfering with the stationary frame 52.

5.7

The imaging device 2 is equipped with a third group movement mechanism 57 for moving the third group frame unit 44 that supports the third lens group G3 in the direction along the second optical axis A2. The first group frame unit 41 and the third group movement mechanism 57 are functionally linked via the driving gear 53 driven by the zoom motor 36. Therefore, there is no need for a mechanism to drive the first group frame unit 41 and the third group movement mechanism 57, so the imaging device 2 can have a simpler configuration. This also helps make the imaging device 2 quieter. Furthermore, since the ring gear 112 of the driving frame 51 of the first group frame unit 41 and the ring gear 180 of the third group movement mechanism 57 are both driven while meshing to the driving gear 53, the operation of the first group frame unit 41 and the third group movement mechanism 57 can be linked easily.

5.8

The third group movement mechanism 57 is equipped with the ring gear 180 and a ring gear pin 181 that convert the rotational drive from the zoom motor 36 into drive in a direction along the second optical axis A2, and the rod unit 182 that engages to the ring gear pin 181 and moves in a direction along the second optical axis A2. Therefore, the first group frame unit 41 that moves the first lens group G1 in a direction along the first optical axis A1 and the third group movement mechanism 57 that moves the third lens group G3 in a direction along the second optical axis A2 can be driven by the same drive component.

5.9

With the imaging device 2, an elastic linking mechanism that elastically links the ring gear 180 and the rod 183 is constituted by a compression spring 186, a spring pin 187, and a compression spring restrictor pin 185. The elastic linking mechanism pushes the rod 183 toward the X axis direction positive side when the rod 183 is to be located at the end on the X axis direction positive side. Also, it pushes the rod 183 toward the X axis direction negative side when the rod 183 is to be located at the end on the X axis direction negative side. This makes it possible to prevent backlash in the rod 183 and in the third group frame unit 44 that moves integrally with the rod 183. In particular, backlash of the third group frame unit 44 in the non-usage (retracted) state of the image pickup device can be prevented when, for example, the optical system is located at the wide angle end or the telephoto end.

5.10

The third group guide poles 70 and 71 that guide the movement of the third group frame unit 44 in the X axis direction are fixed at one end to the second group frame unit 42 equipped with the second lens group G2. Therefore, the positioning of the third group frame unit 44 with respect to the second group frame unit 42, particularly, positioning in a direction perpendicular to the second optical axis A2, can be carried out with higher precision.

5.11

As shown in FIGS. 28A to 28C, part of the motor unit 32 is disposed in a space on the opposite side from the third group frame unit 44, with the reflecting surface L5a of the prism L5 interposed therebetween. Therefore, no members constituting the optical system 35 are disposed, the space that does not affect the optical system 35 can be utilized effectively to dispose the members that constitute the imaging device 2, and space utilization efficiency can be improved.

5.12

The diaphragm actuator 202 and the shutter actuator 203 are formed protruding to the second group frame unit 42 side on the shutter unit 60. The second group frame 150 of the second group frame unit 42 mates to the intermediate portion between the diaphragm actuator 202 and the shutter actuator 203 in the Z axis direction when the shutter unit 60 and the second group frame unit 42 are close. As a result, the size of the imaging device 2 can be reduced in a direction along the second optical axis.

5.13

With the second group frame unit 42, an opening member 159 is fixed to the second group frame 150, so that a sixth lens L6 and a seventh lens L7 are supported on the X axis direction negative side. The opening member 159 blocks any unnecessary light passing in unnecessary directions out of the light emitted from the seventh lens L7, and supports the sixth lens L6 and the seventh lens L7 on the X axis direction negative side. Therefore, the constituent members of the imaging device 2 can be reduced, which serves to lower costs.

5.14

Because the digital camera 1 is equipped with the imaging device 2, the above-mentioned effects of the imaging device 2 can be realized.

5.15

With the digital camera 1, when an image is captured so that the up and down in the vertical direction of the subject coincide with the up and down in the short-side direction of the captured subject image, the direction along the second optical axis A2 substantially coincides with the horizontal direction. Therefore, with the digital camera 1, in an ordinary image capture state in which an image is captured so that the up and down in the vertical direction of the subject coincide with the up and down in the short-side direction of the captured subject image, it is possible to capture an image by matching the lengthwise direction of the digital camera 1 to the horizontal direction. Also, the size in the vertical direction in an ordinary image capture state can be shorter than a digital camera with which an image is captured by matching the short-side direction of the digital camera to the horizontal direction in an ordinary image capture state.

5.16

With the digital camera 1, the direction along the second optical axis A2 is substantially parallel to the lengthwise direction of the image display unit 18. The lengthwise direction of the image display unit 18 is substantially parallel to the lengthwise direction of the outer case 11. Therefore, in an ordinary image capture state in which an image is captured by matching the lengthwise direction of the image display unit 18 to the substantially horizontal direction, it is possible to capture an image by matching the lengthwise direction of the outer case 11 to the substantially horizontal direction. Also, the size of the image display unit 18 in the short-side direction can be shorter than a digital camera with which the direction along the second optical axis A2 is substantially parallel to the short-side direction of the image display unit 18.

5.17

With the digital camera 1, the grip portion 12 is formed on the X axis direction positive side. Therefore, it is possible to ensure enough distance in the X axis direction between the grip portion 12 and the first group frame unit 41 disposed on the X axis direction negative side of the digital camera 1. This makes it possible to prevent the user's finger from touching the first lens group G1 during capturing image.

5.18

With the digital camera 1, during capturing image, the first group frame unit 41 protrudes from the outer case 11 to the subject side (Y axis direction positive side). This makes it possible to prevent the user's finger from touching the first lens group G1 during capturing image.

5.19

The digital camera 1 is equipped with the image blur correcting mechanism 61. Therefore, higher quality images can be captured.

5.20

Z axial direction width (Wz) of the imaging device 2 is formed greater than its Y axial direction width (Wy). Therefore, the digital camera 1 can be formed thinner in the direction along the first optical axis A1.

5.21

With the image blur correcting device 300, the pitching direction electromagnetic actuator 312 and the yawing direction electromagnetic actuator 314 are provided at locations substantially opposite each other in the Z axis direction (pitching direction), with the second optical axis A2 interposed therebetween. Therefore, compared to a conventional image blur correcting device, the size can be smaller in the Y axis direction (yawing direction) perpendicular to the Z axis direction (pitching direction). Furthermore, the Y axis direction size (thickness) of the digital camera 1 equipped with the image blur correcting device 300 is not subject to as much restriction by the size of the image blur correcting device 300, there is greater latitude in design related to the layout of the constituent elements or the like of the digital camera 1, or the size in the Y axis direction can be reduced.

5.22

With the image blur correcting device 300, the yawing direction electromagnetic actuator 314 has a plurality of coils (the first coil 302a and the second coil 302b) aligned in the Y axis direction (yawing direction). Therefore, compared to when the electromagnetic actuator consists of a single coil, the Z axis direction size of the coil 206b can be shortened while the same drive force can be obtained. Additionally, shortening the Z axis direction size of the coil 206b allows the Z axis direction size of the electrical substrate 206 to which the coil 206b is fixed to be shortened as well, and the resonance frequency can be higher. It is therefore possible to provide a image blur correcting device 300 that is easier to control.

In particular, when the yawing direction electromagnetic actuator 314 has two coils aligned in the Y axis direction, and the magnet 62e has undergone tripole magnetization, it is possible to obtain a high magnetic force in the intermediate portion of the magnet 62e, and a higher drive force can also be obtained.

5.23

With the image blur correcting device 300, it is possible to prevent the size of the image blur correcting device 300 (the size in the Z axis direction or the Y axis direction) from being increased by disposing the Hall element 206d. That is, the Hall element 206d is disposed overlapping an imaginary rectangular region surrounding the coil 206b, and the size of the image blur correcting device 300 can be prevented from being increased by the effect of the size of the Hall element 206d in the Z axis direction or the Y axis direction.

5.24

The image blur correcting device 300 has a structure in which the pitching movement frame 205, the yaw movement frame 206, and the third group frame 62 overlap, and the pitching movement frame 205 is supported so as to be capable of relative movement in the pitching direction and the yawing direction with respect to the third group frame 62.

5.24

Because the digital camera 1 is equipped with the image blur correcting device 300, the above-mentioned effects of the image blur correcting device 300 can be realized.

5.25

Because the digital camera 1 is equipped with the image blur correcting device 300, and the yawing direction coincides with the direction along the first optical axis A1, the size of the digital camera can be smaller in the direction along the first optical axis A1. That is, the digital camera 1 can be made thinner.

5.26

With the digital camera 1, the linear motor that drives the fourth lens group G4 is disposed at a location opposite to the yawing direction electromagnetic actuator 314 of the image blur correcting device 300 in the direction along the second optical axis A2. Therefore, this prevents the size of the digital camera 1 in the Z axis direction or the Y axis direction from being affected by the linear motor, which centers around the fourth lens group G4, protruding in the radial direction of the second optical axis A2.

6: Other

Embodiments of the present invention were described above, but the present invention is not limited to the above embodiments, and various modifications are possible without departing from the gist of the invention.

6.1

The appearance and configuration of the digital camera 1 and the main body 3 described through reference to FIGS. 1 to 3 in the above embodiments are not limited to those described.

For instance, the members that make up the digital camera 1, and their configuration, are not limited to those given above.

Figure 32A:
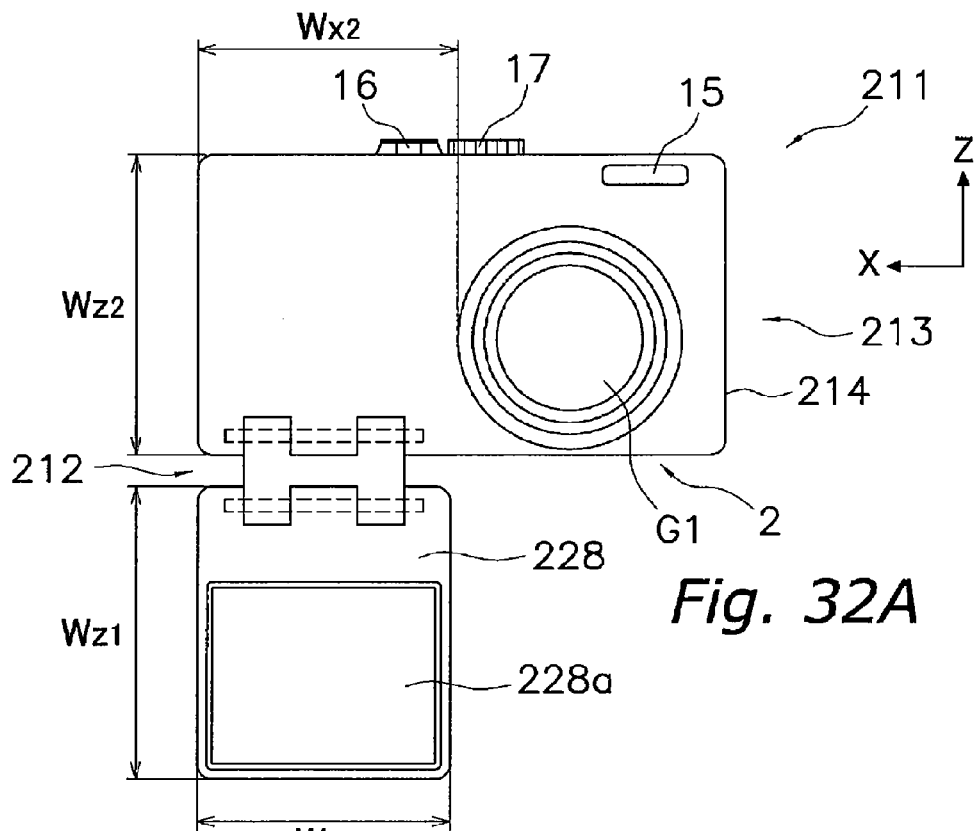
FIG. 32A is a front view and FIGS. 32B and 32C are perspective diagrams illustrating the external appearance and configuration of a digital camera as a modification example.
Figure 32B:
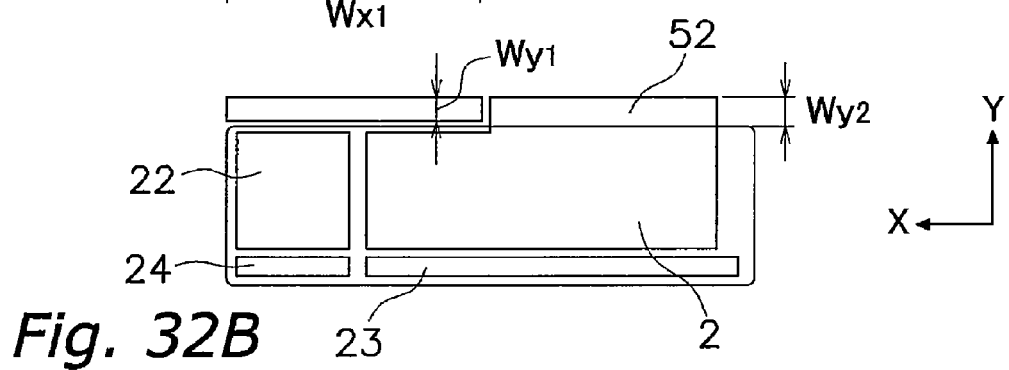
Figure 32C:
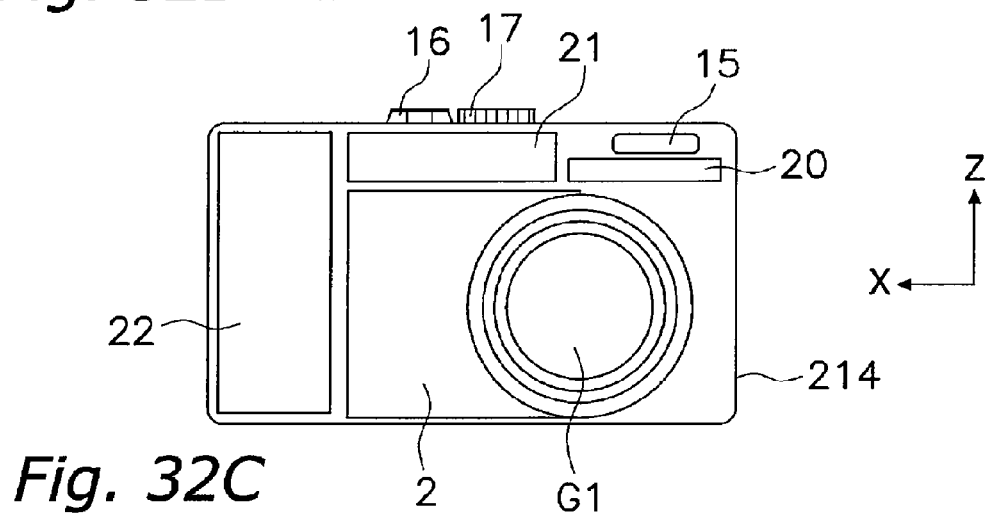
Figure 33:
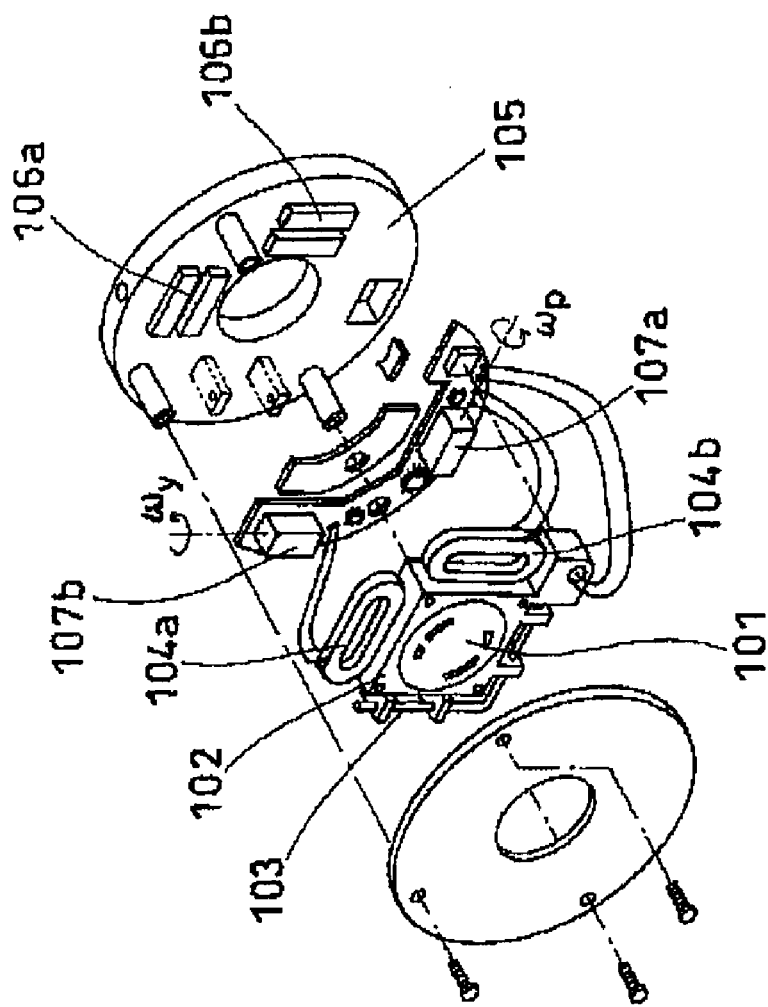
FIG. 33 is an exploded perspective view of an image blur correcting device in prior art.

Also, for example, the appearance and configuration of the digital camera may be as shown in FIGS. 32A to 32C. In FIGS. 32A to 32C, those components that are the same as the ones described in FIGS. 1 to 3 are numbered the same and will not be described again.

FIG. 32A shows the appearance of a digital camera 211 on the Y axis direction positive side. The digital camera 211 includes the above-mentioned imaging device 2, a main body 213 having an outer case 214 that is cuboid in form, and an image display portion 228 that is linked by a linking mechanism 212 to the outer case 214.

The image display portion 228 is attached by the linking mechanism 212 so as to be capable of rotating around a shaft extending in the X axis direction, and can be folded away to the Y axis direction positive side and the Y axis direction negative side of the outer case 214. A liquid crystal portion 228a for displaying images is disposed on the side of the image display portion 228 that is facing the Y axis direction negative side when the image display portion 228 has been folded to the Y axis direction negative side of the outer case 214. In other words, the liquid crystal portion 228a is disposed on the side of the image display portion 228 that faces the Y axis direction positive side when the image display portion 228 has been folded to the Y axis direction positive side. As a result, when the digital camera 211 is not in use, the image display portion 228 can be folded to the Y axis direction negative side of the outer case 214, so that the liquid crystal portion 228a is protected when the digital camera 211 is not in use. When the digital camera 211 is in use, the image display portion 228 can be folded to the Y axis direction positive side of the outer case 214, so that captured images can be viewed on the liquid crystal portion 228a that faces the Y axis direction positive side in this state.

The Z axis direction size Wz1 of the image display portion 228 is substantially the same as the Z axis direction size Wz2 of the outer case 214, and the X axis direction size Wx1 is substantially the same as the X axis direction size Wx2 from the end on the X axis direction positive side of the imaging device 2 protruding from the outer case 214 to the Y axis direction positive side, to the end on the outer case 214 on the X axis direction positive side. Therefore, when the image display portion 228 is folded to the Y axis direction positive side of the outer case 214, the image display portion 228 does not protrude in either the X axis direction or the Z axis direction of the outer case 214.

FIG. 32B is a see-through diagram that shows the image display portion 228 when it has been folded to the Y axis direction positive side of the outer case 214, and also shows the members disposed on the X axis direction negative side in the interior of the outer case 214.

As shown in FIG. 32B, the Y axis direction size Wy1 of the image display portion 228 is substantially the same as the Y axis direction size Wy2 of the stationary frame 52 of the imaging device 2 protruding from the outer case 214. Therefore, when the image display portion 228 has been folded to the Y axis direction positive side of the outer case 214, the Y axis direction locations substantially coincide between the face of the image display portion 228 on the Y axis direction positive side and the end of the stationary frame 52 on the Y axis direction positive side. Also, just as shown in FIG. 3b, the imaging device 2, the main substrate 23, a battery 22 and an a memory card 24 are disposed inside the outer case 214.

FIG. 32C is a see-through diagram of the members disposed on the Y axis direction positive side in the interior of the outer case 214. Just as shown in FIG. 3a, the flash lamp 15, the main condenser 20, the sub-substrate 21, the imaging device 2, and the battery 22 are disposed in the outer case 214.

6.2
The configuration of the optical system 35 is not limited to that described above. For instance, the lens groups G1 to G5 may be realized by other lens combinations.

6.3
The configuration of the first group frame unit 41 is not limited to that described above. For instance, the cam pins or cam grooves formed in the first group frame 50, the driving frame 51, and the stationary frame 52 may be realized by other configurations, as long as they operate the same function.

6.4
The configuration of the second group frame unit 42 is not limited to that described above. For instance, the second group frame 150 may have another structure as long as it is able to support the second lens group G2.

6.5
The image blur correcting device 300 can also be applied to something other than the digital camera 1 described above.

For example, the image blur correcting device 300 can be applied to a digital camera that does not have a bending optical system. In this case, the image blur correcting device 300 drives a correction lens in a direction perpendicular to the optical axis of a lens that obtains the light flux incident from the subject side. Since the image blur correcting device 300 is smaller in any one of two directions perpendicular to the optical axis, a digital camera equipped with the image blur correcting device 300 can be smaller in these same directions.

Also, for example, the image blur correcting device 300 can be applied to a digital camera that does not have a multistage lens barrel though has a bending optical system.

INDUSTRIAL APPLICABILITY

With the present invention, it is possible to provide an image blur correcting device that can made smaller the size in any one of direction perpendicular to the incident optical axis, and a camera equipped with this device. Therefore, the image blur correcting device and camera pertaining to the present invention are useful in fields in which it is necessary to reduce the size in any one of direction perpendicular to the incident optical axis.

The invention claimed is:
1. An image blur correcting device, comprising:
a correction lens frame for supporting a correction lens that performs image blur correction;
first guide component for guiding the correction lens frame in a first direction perpendicular to the optical axis of light incident on the correction lens;
second guide component for guiding the correction lens frame in a second direction intersecting with the optical axis and with the first direction;
first drive component for driving the correction lens frame in the first direction; and
second drive component for driving the correction lens frame in the second direction,
wherein the first drive component and the second drive component are provided substantially opposed in the first direction and with the optical axis interposed therebetween.
2. The image blur correcting device according to claim 1,
wherein the second drive component has a second magnet magnetized in the second direction, and a second coil opposite to the second magnet and relative position thereof in the second direction is substantially fixed with respect to the correction lens frame, and
the second coil is constituted by a plurality of coils aligned in the second direction.
3. The image blur correcting device according to claim 2,
wherein the second coil is constituted by two coils aligned in the second direction, and
the second magnet has undergone at least tripole magnetization in the second direction.
4. The image blur correcting device according to claim 2,
further comprising second position detection component for detecting the position of the correction lens frame in the second direction,
wherein the second coil has two coils adjacent in the second direction and has different lengths in the first direction, and
the second position detection component is provided at a position opposite to the longer of the two coils in the second direction, and opposite to the shorter coil in the first direction.
5. The image blur correcting device according to claim 1, further comprising:

a first support frame for supporting the correction lens frame movably in the first direction via the first guide component; and a second support frame for supporting the first support frame movably in the second direction via the second guide component.

6. A camera, comprising:

a first lens group that obtains a light flux incident along a first optical axis;

bending component for bending the light flux incident along the first optical axis, in the direction along a second optical axis that intersects the first optical axis;

a second lens group that includes a correction lens for correcting image blur, and that obtains light flux bent by the bending component;

the image blur correcting device according to claim 1;

imaging component for receiving the light flux that has passed through the second lens group;

a lens barrel in which the first lens group, the bending component, the second lens group, the image blur correcting device, and the imaging component are disposed; and a casing for supporting the lens barrel.

7. The camera according to claim 6, wherein the second direction is substantially parallel to a direction along the first optical axis.

8. The camera according to claim 6, further comprising at least one lens group that supports the first lens group and that relatively moves the bending component and the first lens group in a direction along the first optical axis.

9. The camera according to claim 6, further comprising third drive component for supporting at least some of the lenses of the second lens group and moving the lenses in a direction along the second optical axis, wherein the third drive component is disposed at a position opposite the second drive component in a direction along the second optical axis.

10. The camera according to claim 1, wherein the first drive component has a first coil for generating driving force, the second drive component has a second coil disposed parallel to the first coil for generating driving force.

* * * * *